US012628734B2

(12) United States Patent
Yang et al.

(10) Patent No.: US 12,628,734 B2
(45) Date of Patent: May 19, 2026

(54) POWER SUPPLY APPARATUS FOR A RIDING MOWER

(71) Applicant: Nanjing Chervon Industry Co., Ltd., Nanjing (CN)

(72) Inventors: Dezhong Yang, Nanjing (CN); Zhongyan Hou, Nanjing (CN); Jicun Cai, Nanjing (CN); Zhen Wang, Nanjing (CN); Qian Liu, Nanjing (CN); Fan Gao, Nanjing (CN); Xi Chen, Nanjing (CN); Fangjie Nie, Nanjing (CN); Toshinari Yamaoka, Nanjing (CN); Cheng Dai, Nanjing (CN); Rong Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 988 days.

(21) Appl. No.: 17/838,482

(22) Filed: Jun. 13, 2022

(65) Prior Publication Data

US 2022/0304226 A1    Sep. 29, 2022

Related U.S. Application Data

(63) Continuation-in-part of application No. 17/695,231, filed on Mar. 15, 2022, now Pat. No. 11,812,689, (Continued)

(30) Foreign Application Priority Data

Oct. 29, 2019    (CN) .......................... 201911034246.X
Oct. 29, 2019    (CN) .......................... 201911034247.4

(Continued)

(51) Int. Cl.
A01D 34/78        (2006.01)
A01D 34/00        (2006.01)
(Continued)

(52) U.S. Cl.
CPC ........... *A01D 34/78* (2013.01); *A01D 34/006* (2013.01); *A01D 34/66* (2013.01); *A01D 67/04* (2013.01);
(Continued)

(58) Field of Classification Search
CPC ...... A01D 34/66; A01D 34/78; A01D 34/006; A01D 67/04; A01D 2101/00; A01D 69/02
See application file for complete search history.

(56) References Cited

U.S. PATENT DOCUMENTS 8,543,295 B2    9/2013  Bryant et al.
10,058,031 B1 *  8/2018  Brown ................. B60K 7/0007
(Continued)

FOREIGN PATENT DOCUMENTS

CN        102092279 A      6/2011
CN        203126834 U      8/2013
(Continued)

OTHER PUBLICATIONS

Office Action from Canadian application No. 3,166,334, dated Apr. 4, 2024, 6 pp.
(Continued)

*Primary Examiner* — Adam J Behrens
(74) *Attorney, Agent, or Firm* — Greenberg Traurig, LLP

(57)        ABSTRACT

A riding mower includes a seat for a user to sit on, a main frame configured to support the seat, a power output assembly configured to mow vegetation, a traveling assembly configured to enable the riding mower to travel, an operating assembly configured to be operated by the user, a control module configured to control the riding mower, and a power supply apparatus configured to supply power to the riding mower. At least a portion of the control module is disposed on the lower side of the seat, and the control module comprises a drive control board for controlling the power
(Continued)

output assembly and the traveling assembly, a fuse, and a power supply management module.

17 Claims, 37 Drawing Sheets

Related U.S. Application Data which is a continuation of application No. PCT/CN2020/124287, filed on Oct. 28, 2020, and a continuation of application No. PCT/CN2020/071419, filed on Jan. 10, 2020.

(30)     Foreign Application Priority Data

| Oct. 29, 2019 | (CN) | ......................... 201911034248.9 |
|---|---|---|
| Dec. 31, 2019 | (CN) | ......................... 201911401855.4 |
| Jul. 24, 2020 | (CN) | ......................... 202010719948.8 |

(51) Int. Cl.

| *A01D 34/66* | (2006.01) |
|---|---|
| *A01D 67/04* | (2006.01) |
| *A01D 69/02* | (2006.01) |
| *A01D 101/00* | (2006.01) |

(52) U.S. Cl.
CPC .......... *A01D 69/02* (2013.01); *A01D 2101/00* (2013.01)

(56)     References Cited

U.S. PATENT DOCUMENTS

| 10,694,673 | B2 * | 6/2020 | Berglund | ............. A01D 43/077 |
|---|---|---|---|---|
| 2003/0080704 | A1 | 5/2003 | Wakitani | |
| 2011/0127093 | A1 * | 6/2011 | Koga | ................... B62D 11/003 |
| | | | | 180/6.24 |
| 2012/0136539 | A1 | 5/2012 | Bryant et al. | |
| 2015/0007541 | A1 * | 1/2015 | Albinger | .............. A01D 34/001 |
| | | | | 56/10.2 A |
| 2016/0183451 | A1 * | 6/2016 | Conrad | .................. A01D 34/66 |
| | | | | 56/10.2 R |
| 2019/0178219 | A1 | 6/2019 | Koenen | |
| 2019/0291779 | A1 * | 9/2019 | Zeiler | ...................... H01Q 1/27 |
| 2019/0320583 | A1 * | 10/2019 | Asahara | ............. A01D 43/0636 |

FOREIGN PATENT DOCUMENTS

| CN | 103350725 | A | 10/2013 |
|---|---|---|---|
| CN | 103813918 | A | 5/2014 |
| CN | 203646075 | U | 6/2014 |
| CN | 104228586 | A | 12/2014 |
| CN | 104553886 | A | 4/2015 |
| CN | 204942342 | U | 1/2016 |
| CN | 108528271 | A | 9/2018 |
| CN | 109552283 | A | 4/2019 |
| CN | 208759495 | U | 4/2019 |
| CN | 110059095 | A | 7/2019 |
| CN | 110116730 | A | 8/2019 |
| CN | 110268858 | A | 9/2019 |
| CN | 209710730 | U | 12/2019 |
| CN | 209710732 | U | 12/2019 |
| JP | 2011188780 | A | 9/2011 |
| JP | 2012011823 | A | 1/2012 |
| JP | 2014045637 | A | 3/2014 |
| WO | 2019/238043 | A1 | 12/2019 |

OTHER PUBLICATIONS

EPO, extended European search report issued on European patent application No. 20908666.9, dated Dec. 6, 2022, 8 pages.
EPO, extended European search report issued on European patent application No. 20882832.7, dated Oct. 7, 2022, 7 pages.
U.S. Patent and Trademark Office, Non-Final Office Action issued in U.S. Appl. No. 17/695,231, filed Apr. 3, 2021, 7 pgs.
ISA/CN, Written Opinion issued on PCT application No. PCT/CN2020/124287, dated Jan. 27, 2021, 4 pages.
ISA/CN, International Search Report issued on PCT application No. PCT/CN2020/124287, dated Jan. 27, 2021, 4 pages.
ISA/CN, English translation of International Search Report issued on PCT application No. PCT/CN2020/124287, dated Jan. 27, 2021, 2 pages.
ISA/CN, English translation of Written Opinion issued on PCT application No. PCT/CN2020/124287, dated Jan. 27, 2021, 6 pages.
ISA/CN, English translation of International Search Report issued on PCT application No. PCT/CN2020/071419, dated Sep. 27, 2020, 3 pages.
ISA/CN, International Search Report issued on PCT application No. PCT/CN2020/071419, dated Sep. 27, 2020, 5 pages.
ISA/CN, Written Opinion issued on PCT application No. PCT/CN2020/071419, dated Sep. 27, 2020, 4 pages.
ISA/CN, English translation of Written Opinion issued on PCT application No. PCT/CN2020/071419, dated Sep. 27, 2020, 3 pages.
U.S. Patent and Trademark Office, Final Office Action issued in U.S. Appl. No. 17/695,231, filed Sep. 23, 2022, 7 pgs.

* cited by examiner

Front     Right

Left     Rear

Rear

Left —————— Right

Front

123L

31

244a
244b
244s 211d
215a
211b
215s
211c
F

31s

POWER SUPPLY APPARATUS FOR A RIDING MOWER

RELATED APPLICATION INFORMATION

The present disclosure is a continuation-in-part of U.S. application Ser. No. 17/695,231, filed Mar. 15, 2022, which is a U.S. national stage application of International Application No. PCT/CN2020/124287, filed on Oct. 28, 2020, claiming the benefit of Chinese Patent Application No. 201911034247.4, filed on Oct. 29, 2019, Chinese Patent Application No. 201911034246.X, filed on Oct. 29, 2019, Chinese Patent Application No. 201911034248.9, filed on Oct. 29, 2019, and Chinese Patent Application No. 202010719948.8, filed on Jul. 24, 2020, all of which are incorporated herein by reference in their entirety. The present disclosure is also a continuation of International Application No. PCT/CN2020/071419, filed on Jan. 10, 2020, claiming the benefit of Chinese Patent Application No. 201911401855.4, filed on Dec. 31, 2019, all of which are incorporated herein by reference in their entirety.

BACKGROUND

As a garden tool, a mower is widely applied to fields including mowing a lawn and vegetation. A riding mower in the related art is a small engineering machine that can be driven by one person. Generally, special functions of the riding mower determine the special structure of the riding mower. Due to the specific working environment and relatively complicated working terrain, the riding mower in the related art causes a user to encounter relatively great ups and downs during operation. As for riding mowers, under the premise of satisfying various performance requirements, functional requirements, and safety requirements, how to provide a riding mower with a simple structure, high structural strength and good stability becomes an urgent problem to be solved at present.

SUMMARY

A riding mower is provided. The riding mower includes a seat, a main frame, a mowing element, a traveling assembly, and an operating assembly. The seat is for a user to sit on. The main frame extends in the direction of a first straight line and is configured to carry the seat. The mowing element is configured to mow vegetation. The traveling assembly is configured to enable the riding mower to travel. The operating assembly is configured to be operated by the user to control the riding mower to travel and output power. The traveling assembly includes a first traveling wheel, a second traveling wheel, a first drive assembly, and a second drive assembly. The first drive assembly and the second drive assembly are configured to drive the second traveling wheel to rotate. The first drive assembly and the second drive assembly are connected to the main frame by a connector and are disposed symmetrically about a symmetry plane parallel to the direction of the first straight line. The traveling assembly further includes a connection plate disposed in the direction of a line perpendicular to the direction of the first straight line and perpendicular to the symmetry plane. The connection plate connects the first drive assembly and the second drive assembly and enables the first drive assembly and the second drive assembly to be connected into a whole.

In one example, the first drive assembly and the second drive assembly each include a gearbox. The connection plate is connected to the gearbox.

In one example, when the connection plate is connected to the first drive assembly and the second drive assembly, an accommodation space that separates at least part of the upper space of the main frame from at least part of the lower space of the main frame and that is located on the lower side of the main frame is formed. The first drive assembly and the second drive assembly are disposed in the accommodation portion.

In one example, the connection plate includes a first connection plate and a second connection plate.

The first connection plate is disposed on the upper side of the first drive assembly and on the upper side of the second drive assembly.

The second connection plate is disposed on the lower side of the first drive assembly and on the lower side of the second drive assembly.

In one example, an accommodation space is formed between the first connection plate and the second connection plate. The first drive assembly and the second drive assembly are disposed in the accommodation space.

In one example, the first connection plate and the second connection plate are disposed in parallel in an up and down direction perpendicular to the first straight line.

In one example, the first connection plate and the second connection plate are staggered in a straight-line direction perpendicular to the first straight line.

In one example, the riding mower further includes a control circuit configured to control the first drive assembly and the second drive assembly and connected by a connection line.

In one example, the connection line is disposed in the accommodation space.

In one example, the connection line is disposed on the rear side of the first drive assembly in the accommodation space and on the rear side of the second drive assembly in the accommodation space.

A riding mower is provided. The riding mower includes a seat, a main frame, a mowing element, a traveling assembly, and an operating assembly. The seat is for a user to sit on. The main frame is configured to carry the seat. The mowing element is configured to mow vegetation. The traveling assembly is configured to enable the riding mower to travel. The operating assembly is configured to be operated by the user to control the riding mower to travel. The riding mower further includes a power supply apparatus. The power supply apparatus is disposed on the rear end of the main frame. The power supply apparatus includes a battery pack able to provide energy and a battery compartment configured to accommodate the battery pack. The battery compartment includes a main compartment configured to accommodate the battery pack and a compartment cover configured to at least partially enclose the main compartment. The compartment cover includes a first cover and a second cover. The first cover includes a body and a grid spreading around the body.

In one example, the first cover and the second cover are detachably connected to each other.

In one example, the second cover is a transparent member.

In one example, a second reinforcing rib is disposed on the side of the second cover facing the main compartment.

In one example, a first reinforcing rib is disposed on the side of the first cover facing the main compartment. The first cover is disposed on the side facing the main compartment. The second cover is disposed on the side of the first cover facing away from the main compartment. The second cover at least partially covers the first cover.

In one example, the grid is formed by through holes extending through the first cover.

In one example, the body is Y-shaped. The grid connects the body and the edge of the first cover.

In one example, the riding mower further includes a support base. The power supply apparatus is connected to the main frame by a group of support bases.

In one example, the support base includes a support portion configured to support the power supply apparatus, a first connection portion configured to connect the power supply apparatus, and a second connection portion configured to connect the main frame.

In one example, a buffer is disposed between the power supply apparatus and the main frame.

A riding mower is provided. The riding mower includes a seat, a main frame, a mowing element, a traveling assembly, and an operating assembly. The seat is for a user to sit on. The main frame is configured to carry the seat. The mowing element is configured to mow vegetation. The traveling assembly is configured to enable the riding mower to travel. The operating assembly is configured to be operated by the user to control the riding mower to travel and output power. The riding mower further includes a power supply apparatus disposed on the rear end of the main frame. The power supply apparatus includes a battery pack able to provide energy and a battery compartment configured to accommodate the battery pack. The battery compartment includes a main compartment configured to accommodate the battery pack and a compartment cover configured to at least partially enclose the main compartment. The compartment cover is provided with a fastener locked to the main compartment. The main compartment is formed with a matching stop portion. The fastener includes a locking portion. The side of the locking portion facing the stop portion includes a first edge and a second edge. An included angle between the first edge and the second edge is greater than or equal to 60° and less than or equal to 90°.

In one example, the included angle between the first edge and the second edge is 90°.

In one example, the main compartment is formed with a through hole for the locking portion to extend through. The stop portion extends along the through hole.

In one example, the stop portion is formed with a channel for the locking portion to go through and a protrusion matching the locking portion.

In one example, the compartment cover is formed with an accommodation recess configured to accommodate the fastener.

In one example, the fastener further includes a pivot portion and an operating portion. The pivot portion is for the fastener to rotate around. The pivot portion is connected to the accommodation recess by a group of connection structures. The operating portion is disposed between the pivot portion and the locking portion.

In one example, the riding mower further includes an elastic member disposed between the fastener and the compartment cover.

In one example, the locking portion has a first position and a second position that are relative to the stop portion.

When the locking portion is at the first position, a locking hook abuts the stop portion and is able to hook the stop portion. When the locking portion is at the second position, the locking hook is disengaged from the stop portion.

In one example, the compartment cover is connected to the main compartment by a first connector and a second connector. The first connector is disposed on an end of the compartment cover and on an end of the main compartment.

The compartment cover is able to rotate around the first connector and relative to the main compartment. The second connector is connected to the middle of the compartment cover and the middle of the main compartment. The second connection portion is configured to support the compartment cover to make the compartment cover opened or closed relative to the main compartment.

In one example, the second connector includes a first connection end and a second connection end. The first connection end is disposed on the compartment cover. The second connection end is disposed on the main compartment. A gas spring able to support the compartment cover to make the compartment cover opened or closed relative to the main compartment is disposed between the first connection end and the second connection end.

A riding mower is provided. The riding mower includes a main frame, a mowing element, a traveling assembly, and an operating assembly. The mowing element is configured to mow vegetation. The traveling assembly is configured to enable the riding mower to travel. The operating assembly is configured to be operated by the user to control the riding mower to travel and output power. The traveling assembly includes a first traveling wheel, a second traveling wheel, a first drive assembly, and a second drive assembly. The first drive assembly and the second drive assembly are configured to drive the second traveling wheel to rotate. The first drive assembly and the second drive assembly each include a drive motor, a gear mechanism, an output shaft, and a gearbox. The drive motor is configured to output a driving force. The gear mechanism is connected to the drive motor. The output shaft is configured to connect the gear mechanism and the second traveling wheel and is able to drive the second traveling wheel to rotate. The gearbox is configured to accommodate the gear mechanism and the output shaft. The gear mechanism includes a transmission gear connected to the output shaft. The output shaft is further connected to the gearbox by a first connection assembly. The first connection assembly includes a first bearing and a retainer. The first bearing is distributed in the axial direction of the output shaft. The retainer is disposed between the first bearing and the transmission gear.

In one example, the retainer and the first bearing are sleeved on the output shaft. The riding mower further includes a second bearing configured to secure the output shaft and disposed on the end of the output shaft facing the second traveling wheel.

In one example, the retainer is a ring disposed around the output shaft. The ring is provided with thrust rollers able to rotate freely on the ring.

In one example, the first connection assembly further includes a first gasket and a second gasket. The first gasket and the second gasket are disposed between the first bearing and the retainer.

In one example, when the second gasket abuts the retainer, the thrust rollers are able to rotate relative to the second gasket.

In one example, the output shaft is formed with a protrusion portion. The protrusion portion is disposed between the transmission gear and the second traveling wheel and adjacent to the transmission gear.

In one example, the protrusion portion is disposed around the output shaft. The diameter of the protrusion portion is greater than the diameter of the output shaft.

In one example, the gearbox is formed with an accommodation recess. The protrusion portion is disposed in the accommodation recess.

In one example, the riding mower further includes a sleeve disposed on the side of the protrusion portion facing away from the transmission gear.

In one example, the riding mower further includes a third gasket disposed between the protrusion portion and the sleeve.

A riding mower is provided. The riding mower includes a seat, a main frame, a power output assembly, a traveling assembly, an operating assembly, a control module, and a power supply apparatus. The seat is for a user to sit on. The main frame extends in the direction of a first straight line and is configured to carry the seat. The power output assembly is configured to mow vegetation. The traveling assembly is configured to enable the riding mower to travel. The operating assembly is configured to be operated by the user to control the riding mower to travel and output power. The control module is configured to control the riding mower. The power supply apparatus is configured to supply power to the riding mower. The main frame extends basically in a first plane. The first straight line is in the first place. The main frame is basically symmetrical about the first straight line. The first plane further includes a second straight line perpendicular to the first straight line. The main frame is basically symmetrical about the second straight line. On a second plane extending through the second straight line and perpendicular to the first plane, the seat is disposed on the main frame and at least partially extends through the second plane. The first straight line and the second straight line have an intersection. The control module is at least partially disposed in the range of the intersection.

In one example, the operating assembly includes a first operating element and a second operating element. The first operating element is disposed on two sides of the seat. The second operating element is disposed on the front side of the main frame and is located on the left side of the main frame.

In one example, the riding mower further includes a grass catcher. The power supply apparatus is disposed on the rear side of the main frame. The grass catcher is at least partially disposed on the upper side of the power supply apparatus.

In one example, the riding mower further includes a group of connection rods connected to the main frame. The connection rods are configured to support the grass catcher.

In one example, the riding mower includes a grass catching mode and a grass discharging mode. When the riding mower is in the grass catching mode, the grass catcher is disposed on the upper side of the power supply apparatus. When the riding mower is in the grass discharging mode, the grass catcher is detached from the connection rods. The connection rods are connected to a sunshade configured to shade from the sun.

In one example, the connection rods are disposed between the seat and the power supply apparatus.

In one example, the traveling assembly includes a first traveling wheel and a second traveling wheel. The first traveling wheel is disposed on the front side of the main frame. The second traveling wheel is disposed on the rear side of the main frame. The power output assembly is disposed between the first traveling wheel and the second traveling wheel and is at least partially located on the lower side of the main frame. The power supply apparatus is disposed on the rear side of the second traveling wheel and is located on the upper side of the main frame.

In one example, the control module includes a drive control board, a power supply management module, and a fuse. The drive control board is at least partially disposed at the intersection between the first straight line and the second straight line. The power supply management module is at least partially disposed between the seat and the power supply apparatus. The fuse is disposed between the drive control board and the power supply management module.

In one example, the drive control board, the fuse, and the power supply management module are basically arranged in the direction of the first straight line.

In one example, the control module further includes a junction box disposed on the upper side of the drive control board.

A riding mower is provided. The riding mower includes a seat, a main frame, a mowing element, a traveling assembly, an operating assembly, and a power supply apparatus. The seat is for a user to sit on. The main frame is configured to carry the seat. The mowing element is configured to mow vegetation. The traveling assembly is configured to enable the riding mower to travel. The operating assembly is configured to be operated by the user to control the riding mower to travel and output power. The power supply apparatus is configured to supply power to the riding mower. The main frame is disposed in a first plane and extends in the direction of a first straight line. When being mounted, the power supply apparatus is located in an extension plane of the main frame. The main frame is provided with an anti-collision rod disposed around the power supply apparatus and located on an outer side of the main frame.

In one example, the anti-collision rod is connected to the rear side of the main frame and is basically semicircular.

In one example, the cross section of the anti-collision rod is circular.

In one example, the main frame includes a first rod, a second rod, and a third rod. The first rod and the second rod are parallel to each other. The third rod is disposed on the front end of the first rod and on the front end of the second rod. The first rod, the second rod, and the third rod are securely connected or integrally formed.

In one example, the third rod is formed with or is connected to a connection hole configured to connect the traveling assembly. The junction between the third rod and the first rod and the junction between the third rod and the first rod are each provided with a reinforcing portion.

In one example, the anti-collision rod is connected to the first rod and the second rod.

In one example, the riding mower further includes a first connection plate and a second connection plate that connect the first rod and the second rod. The first connection plate is parallel to or intersects the second connection plate.

In one example, the first connection plate extends in a plane and is formed with a pedal portion configured for being pressed down.

In one example, in a projection plane perpendicular to the up and down direction, a projection of the main frame in the up and down direction in the projection plane is basically rectangular.

In one example, the cross section of the main frame is rectangular.

A riding mower is provided. The riding mower includes a seat, a main frame, a power output assembly, a traveling assembly, and an operating assembly. The seat is for a user to sit on. The main frame is configured to carry the seat. The power output assembly is connected to the main frame and includes a mowing element and a first motor. The mowing element is configured to output power to implement the mowing function. The first motor is configured to drive the mowing element to output power. The traveling assembly is at least able to drive the electric riding mower to travel in the direction of a first straight line on the ground. The traveling assembly includes a second motor configured to drive the traveling assembly. The operating assembly is configured to be operated by the user to control the riding mower to travel and output power. The riding mower further includes a parking system enabling the riding mower to switch between a parking state and a non-parking state. When the parking system is locked, the riding mower is in the parking state. When the parking system is not locked or is unlocked, the riding mower is in the non-parking state. The riding mower further includes a rotation stop system linked to the parking system. When the parking system enters a locked state from an unlocked state, the rotation stop system is triggered and controls the second motor to stop rotation.

In one example, the parking system includes a pedal assembly, a base, a ratchet, and a first elastic member. The pedal assembly is configured to be operated by the user to implement a switch between the parking state and the non-parking state. The base is configured to be mounted with the pedal assembly. The ratchet is securely connected to the pedal assembly. The first elastic member connects the pedal assembly and the base.

In one example, the pedal assembly includes a pedal, a first rotatable member, and a pedal arm. The pedal is for the user to press down. The first rotatable member connects the pedal assembly and is rotatable around a central axis synchronously. Two ends of the pedal arm are securely connected to the pedal and the first rotatable member respectively.

In one example, the rotation stop system includes a triggering member, a contact member, and a rotation stop switch. The triggering member is formed with or connected to a triggering portion. The contact member matches the triggering portion. The rotation stop switch matches the contact member and, when being triggered by the contact member, controls the second motor to stop rotation.

In one example, the triggering member and the first rotatable member are configured to rotate synchronously.

In one example, the triggering member includes a first section and a second section. The triggering portion is disposed on the second section.

In one example, the base is provided with a slide rail extending through the base. The triggering member is connected to the first rotatable member by a fastening piece. The triggering member is disposed on one side of the base. The first rotatable member is disposed on another side of the base.

In one example, the slide rail includes a first slide rail and a second slide rail that are disposed in different rotation radii.

In one example, the length of the first slide rail is smaller than the length of the second slide rail.

In one example the rotation stop switch is configured to control the second motor to stop rotation when the rotation stop switch is held in a triggered state.

In the present application, the arrangement in which connection plate is disposed between the first drive assembly and the second drive assembly helps enhance the structural strength of the entire traveling assembly, enabling the riding mower to adapt to more complicated working conditions.

DETAILED DESCRIPTION

Figure 1:
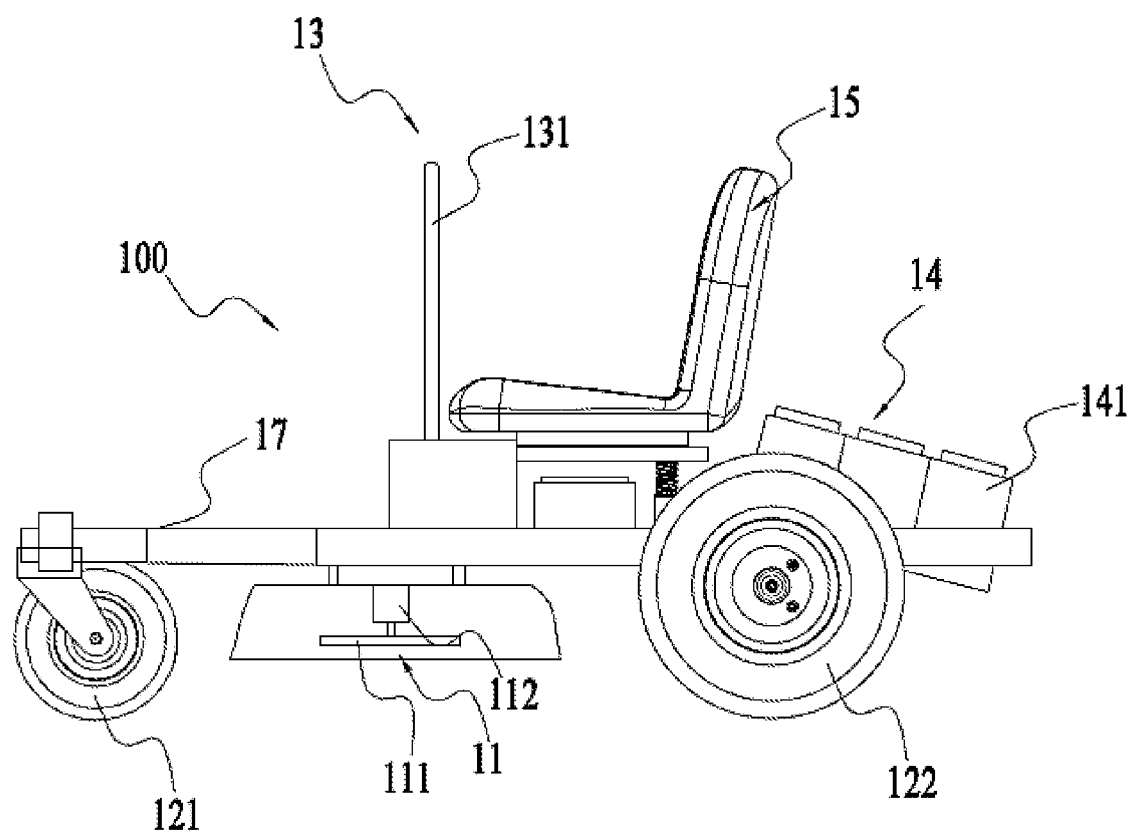
FIG. 1 is an external view of a riding lawn mower from a perspective.
Figure 2:
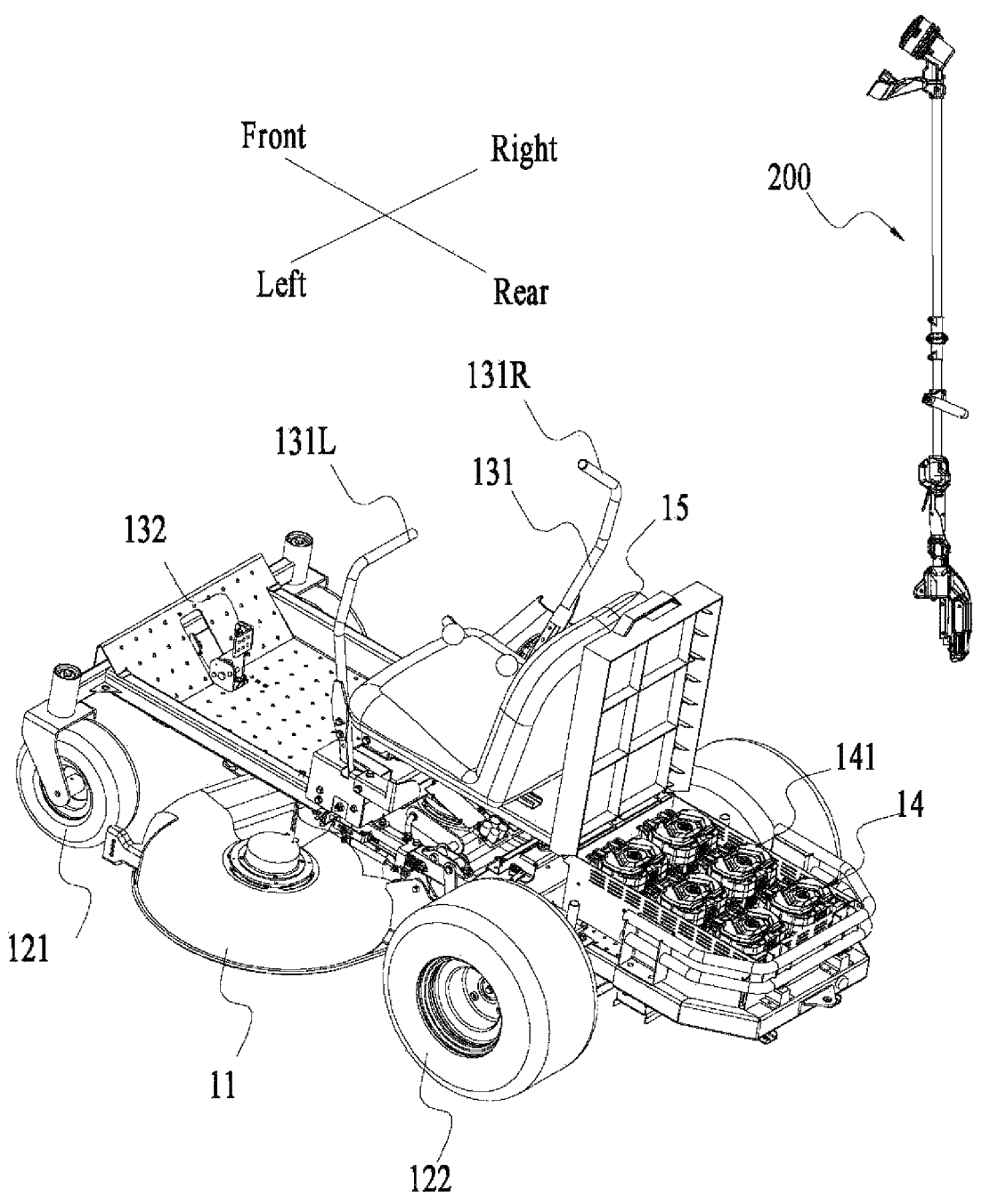
FIG. 2 is an external view of the riding lawn mower from another perspective.

Those skilled in the art should understand that, in the disclosure of this application, the terms "up", "down", "front", "rear", "left", "right" and the like indicate the orientation or positional relationship based on the orientation or positional relationship shown in the drawings, which are only for the convenience of describing the present application, and do not indicate or imply that the device or element referred to must have a specific orientation, or be constructed and operated in a specific orientation, and therefore the above terms should not be understood as a limitation of the present application.

Referring to FIG. 1, a riding lawn mower 100 includes: a power output assembly 11, a walking assembly 12, an operating component 13, a power supply assembly 14, a seat 15, a chassis 16, and a lighting assembly 17.

The chassis 16 is configured to carry the seat 15, and the chassis 16 at least partially extends in a front and rear direction; the seat 15 is for an operator to sit on, and the seat 15 is mounted on the chassis 16.

For the convenience of description, the direction in which the operator sits on the seat is defined as the front or the front side of the riding lawn mower, and the direction opposite to the front is defined as the rear or rear side of the riding lawn mower, and the operator's left hand direction is defined as the left or left side of the riding lawn mower 100, and the operator's right hand direction is defined as the right or right side of the riding lawn mower 100.

The power output assembly 11 includes an output member for outputting power to achieve certain mechanical function. For example, in this example, the output member may be a mowing element 111 for achieving a mowing function, and the power output assembly 11 is also connected to the chassis 16. The power output assembly 11 also includes a cutting motor 112 for driving the mowing element 111 to rotate at a high speed and a cutting control module 113 for controlling the cutting motor 112. The power output assembly 11 may include more than one mowing element 111, and correspondingly, the number of cutting motors 112 may correspond to the number of mowing elements 111. The cutting motors 112 are controlled by the cutting control module 113. In some specific examples, the cutting control module 113 includes a control chip, such as MCU, ARM, and so on.

In order to obtain a better mowing effect, optionally, the power output assembly 11 may include two mowing elements 111, and correspondingly, two cutting motors 112, namely a left cutting motor 112L and a right cutting motor 112R. Optionally, the two cutting motors 112 are respectively controlled by two cutting control modules 113, and the two cutting control modules 113 are a left cutting control module 113L and a right cutting control module 113R, respectively. That is, the power output assembly 11 includes two cutting control modules 113 and cutting two motors 112. Alternatively, the power output assembly 11 may include only one cutting control module 113, which controls two cutting motors 112 at the same time.

The walking assembly 12 is configured to enable the riding lawn mower 100 to walk on the lawn. The walking assembly 12 may include first walking wheels 121 and second walking wheels 122, the number of the first walking wheels 121 is two, and the number of the second walking wheels 122 is also two, including a left drive wheel 122L and a right drive wheel 122R. The walking assembly 12 may also include walking motors 123 for driving the second walking wheels 122, and the number of walking motors 123 is also two, namely a left walking motor 123L and a right walking motor 123R, respectively. In this way, when the two walking motors 123 drive the corresponding second walking wheels 122 to rotate at different speeds, a speed difference is generated between the two second walking wheels 122, so as to steer the riding lawn mower 100. The walking assembly 12 includes two walking control modules 124, the two walking control modules 124 are a left walking control module 124L and a right walking control module 124R, respectively, which are used to control the left walking motor 123L and the right walking motor 123R, respectively. In some specific examples, the walking control module 124 includes a control chip, such as MCU, ARM, and so on.

The power supply assembly 14 is configured to provide electric power for the riding lawn mower 100. Optionally, the power supply assembly 14 is configured to at least supply power to the cutting motors 112 and the walking motors 123, and the power supply assembly 14 may also supply power to other electronic components in the riding lawn mower 100, such as the cutting control module 113 and the walking control module 124.

In some examples, the power supply assembly 14 is provided on the rear side of the seat 15 on the chassis 16. In some examples, the power supply assembly 14 includes a plurality of battery packs 141 capable of supplying power to the power tool 200. The battery packs 141 are configured to be pluggably mounted to the riding lawn mower 100 by the user. The installation and removal of the battery packs 141 by plugging and unplugging makes the operation more convenient and also the placement of the battery packs 141 more accurate. Optionally, the battery pack 141 includes a plurality of battery cells connected in series, in parallel, or in a combination of series and parallel. A plurality of battery cells are coupled in a battery casing to form a whole, and the battery cell may be a lithium battery cell. The power tool 100 may be a gardening tool such as a string trimmer, a hedge trimmer, a blower, a chain saw, etc., and may also be a torque output tool such as an electric drill, an electric hammer, etc., and may also be a sawing tool such as an electric circular saw, a jig saw, and a reciprocating saw, etc., and may also be a grinding tool such as an angle grinder, a sanding machine, etc. In some other examples, the battery pack 141 may also be configured to power a hand-push power tool, such as a hand-push lawn mower, a hand-push snow blower, and so on. In this way, the battery pack 141 applied to the riding lawn mower of the present application can be unplugged by the user to be applied to the above power tools. In other words, the user can also borrow the battery pack 141 in these power tools to power the riding lawn mower 100, thereby improving the versatility of the riding lawn mower 100 and reducing the usage cost. The power supply assembly 14 includes a battery compartment 144 for placing the battery packs 141. The number of battery compartment 144 may be one, which stores multiple battery packs 141, or may be multiple, for example, the same as the number of battery packs 141, wherein each battery compartment 144 stores one battery pack 141.

The power supply assembly 14 further includes a power supply management module 142 for controlling the operation of the power supply assembly 14. In this example, the power supply management module 142 is configured to control the safe discharge of the plurality of battery packs 141, so that the riding lawn mower 100 can operate normally. In some specific examples, the power supply management module 142 includes a control chip, such as MCU, ARM, and so on.

The riding lawn mower 100 further includes a walking control module 124 for controlling the walking process of the riding lawn mower 100. The walking control module 124 is at least used to control the walking motors 123 of the walking assembly 12 to control the walking process of the riding lawn mower 100. The walking control module 124 can control the walking motors 123 to start.

The operating component 13 is operable by the user, and the user sends control instructions through the operating component 13 to control the operation of the riding lawn mower 100. The operating component 13 can be operated by the user to set the target speed, travel direction, etc. of the riding lawn mower 100. In other words, the operating component 13 can be operated by the user to set the target operating state of the riding lawn mower 100. The operating component 13 includes an operating mechanism 131 and an operation sensing module 132 enabled to sense changes in the state of the operating mechanism.

In some specific examples, the operating mechanism 131 includes at least one operating lever, and the operation sensing module 132 includes at least one position sensor. The operating lever may be arranged on either sides or a periphery of the seat 15. Different positions of the operating lever correspond to different target states of the riding lawn mower. By pushing the operating lever to the target positions, the user controls the riding lawn mower 100 to reach the target states corresponding to the target positions reached by the operating lever, including the traveling direction, traveling speed, parking, braking, deceleration, etc. In a specific example, the operating levers include a left operating lever 131L and a right operating lever 131R, and the walking motors 123 include the left walking motor 123L and the right walking motor 123R. The left operating lever and the right operating lever are used to respectively control the left walking motor 123L and the right walking motor 123R, so as to respectively control the two second walking wheels 122. The position sensor is configured to detect the position of the operating lever. When the operating lever is in different positions, the position sensor outputs detected signals representing different positions.

The operating mechanism 131 may further include at least one switch triggerable to change its state so as to set the riding lawn mower 100 in different target states. The operation sensing module 132 includes a switch state detection assembly, and the switch state detection assembly is configured to detect the state of at least one switch. For example, a seat switch arranged under the seat 15 can sense the user sitting on the seat or leaving the seat; a start switch can start the riding lawn mower 100 when the user presses this switch; a key switch start or stop the walking motor 123 when the user inserts the key and rotates to the on position or the off position. The switch state detection assembly can detect the different states of each switch and send the detected information to the required module.

The operating mechanism of the operating component 13 may also include a combination of one or more operating mechanisms such as a pedal, a switch, a handle, and a steering wheel, for example, the manual operating lever, combined with a foot brake pedal, a speed pedal and a steering wheel is configured for the user to operate the riding lawn mower 100. The operating component 13 may also be a control panel, which includes a plurality of buttons, and different buttons correspond to different control commands. The user inputs different control commands through the switch to control the walking motor 123 of the walking assembly 12. Refer to the communication system of the riding lawn mower 100 according to an example shown in FIG. 3A, the riding lawn mower 100 further includes a bus module 18, and the bus module 18 is connected with a variety of modules, for example, the bus module 18 is at least connected with the cutting control module 113, the walking control module 124, the operation sensing module 132, the power supply management module 142 in order to transmit data between the cutting control module 113, the walking control module 124, the operation sensing module 132, and the power supply management module 142. The cutting control module 113, the walking control module 124, the operation sensing module 132, and the power supply management module 142 can all send data to the bus module 18 and receive data through the bus module 18. When sending data, these modules cannot send data at the same time. At most one device can send data at any time. Each device may obtain the bus control right to send data by competing for the busy line B/F, and the module that obtains the bus control right realize occupation and release of the bus through a "busy bus" signal and an "idle bus" signal. When receiving data, all modules can receive information from the bus module 18, and determine of the information is related to themselves, if yes, then perform corresponding processing, if not, continue the original work. Optionally, the riding lawn mower 100 further includes a lighting assembly for illuminating functions; a lighting control module 172 for controlling the operation of the illuminating light 171, and the lighting control module 172 is connected to the bus module 18. The lighting control module 172 controls the illuminating light 171 to turn on upon receiving a signal that requires lighting.

In an example, the user expects the riding lawn mower 100 to go straight forward at a maximum speed. In a specific implementation, the user operates the operating mechanism 131 to a certain state and issues a command to go straight forward at the maximum speed; the operation sensing module 132 detects command to go straight forward at the maximum speed, which corresponds to the current state of the operating lever of the operating mechanism 131, and sends detected information including the position of the operating lever to the bus module 18; the bus module 18 broadcasts the information to all modules connected to the bus module 18; the walking control module 124, the cutting control module 113, the operation sensing module 132 and the power supply management module 142 receive the information including the position of the operating lever through the bus, and determine the data is related to themselves. At this time, the cutting control module 113 controls the cutting motor to stop working; and according to the acquired signal of the operation sensing module 132, the two walking control modules 124 obtain the rotational speed and the rotational direction of the two walking motors 123 corresponding to the signal through calculation or lookup table. Both walking motors 123 run at the maximum forward rotational speed, so that the riding lawn mower 100 moves straight forward in accordance with the target state set by the operating mechanism.

Similarly, the user controls the riding lawn mower 100 by operating the operating mechanism 131, including controlling the mowing speed, traveling direction and speed of the riding lawn mower 100.

Figure 3A:
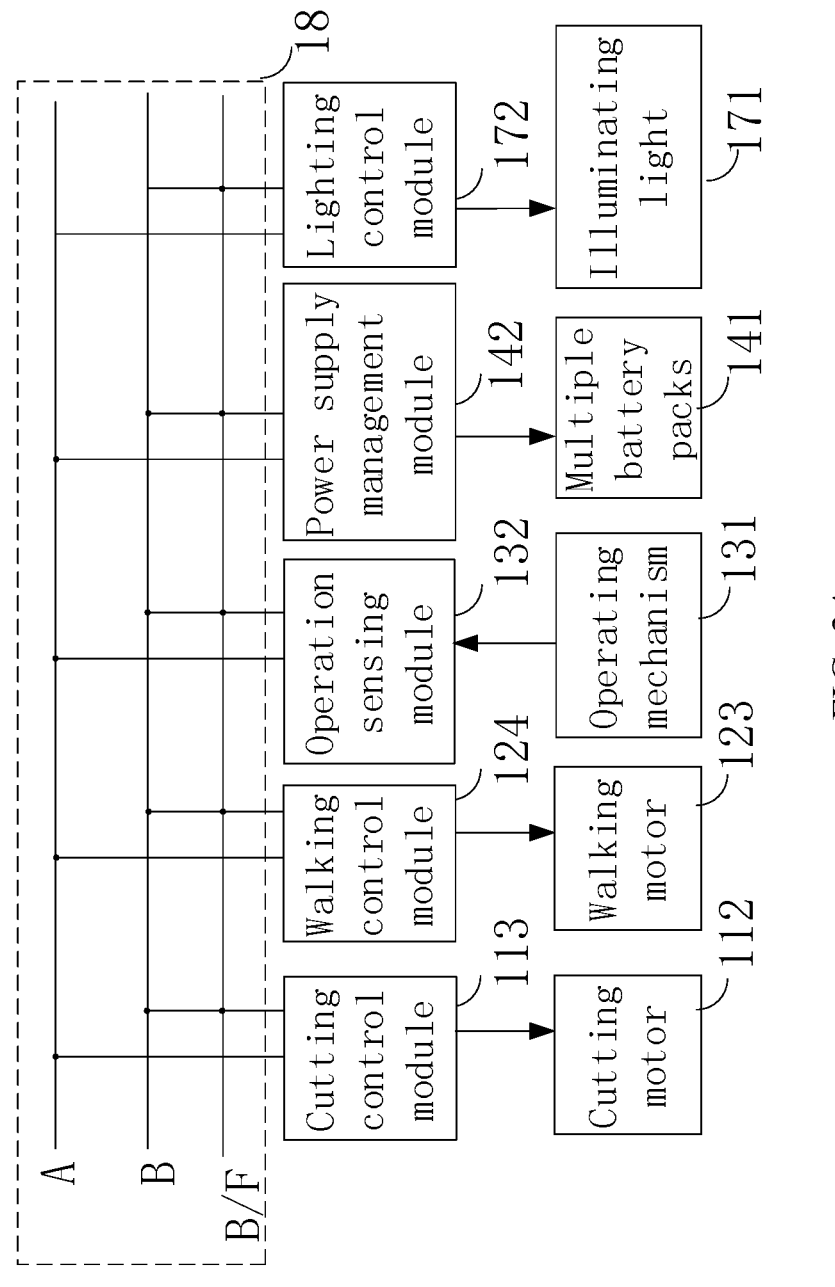
FIG. 3A is a communication system of the riding lawn mower according to an example.
Figure 3B:
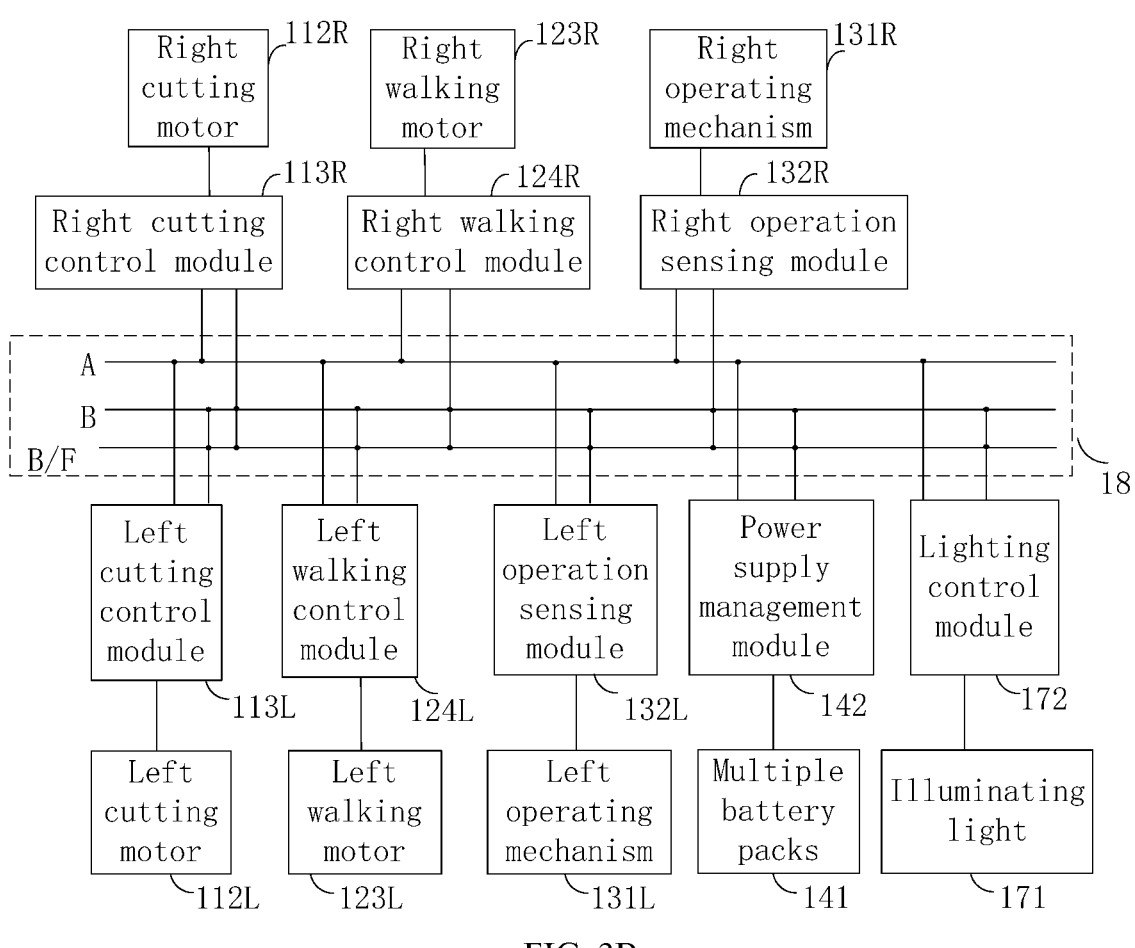
FIG. 3B is a communication system of the riding lawn mower according to another example.

Referring to a communication system of the riding lawn mower 100 according to another example as shown in FIG. 3B, which is different from the communication system of the riding lawn mower shown in FIG. 3A in that: there are two cutting control modules 113, namely a left cutting control module 113L and a right cutting control module 112R, which are respectively configured to control a left cutting motor 112L and a right cutting motor 112R; there are two walking control modules 124, namely a left walking control module 124L and a right walking control module 124R, which are respectively configured to control a left walking motor 123L and a right walking motor 123R; there are two operating mechanisms 131 and two operation sensing modules 132: a left operating mechanism 131L configured to control a left walking motor 123L, and a right operating mechanism 131R configured to control a right walking motor 123R, a left operation sensing module 132L configured to sense the state of the left operating mechanism 131L, and a right operation sensing module 132R configured to sense the state of the right operating mechanism 131R.

In an example, when braking is needed, if the left walking motor 123L has a braking abnormality, the left walking control module 124L sends a signal to the bus module 18, and other modules can receive information on the braking abnormality of the left walking motor 123L from the bus module 18. After receiving the braking abnormality signal, the right walking control module 124R still controls the right walking motor 123R to brake normally. Optionally, when any one of the walking motors has a braking abnormality, the parking mode is automatically triggered, and the riding lawn mower 100 enters the parking mode. This can ensure that the riding lawn mower 100 is parked and stopped when there is a braking abnormality, thereby reducing the occurrence of safety accidents.

Figure 4:
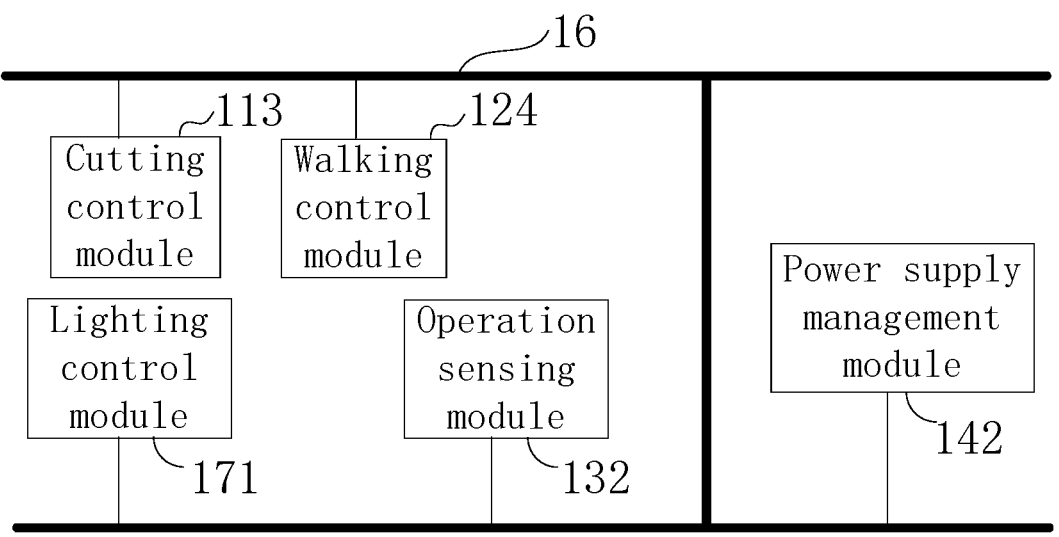
FIG. 4 is a schematic diagram of a connection of negative terminals of various modules of the riding lawn mower according to an example.

Referring to FIG. 4, in an example, the chassis 16 is made of a metallic material, the negative terminals of at least the cutting control module 113, the walking control module 124, and the power supply management module 142 are connected with the chassis 16. The negative terminals of other modules may also be connected to the chassis, including the lighting control module 172 and the operation sensing module 132. In this way, the chassis 16 could be used as the negative terminal of the electric control system of the riding lawn mower 100, which reduces the wiring and cost, and facilitates assembly.

Figure 5:
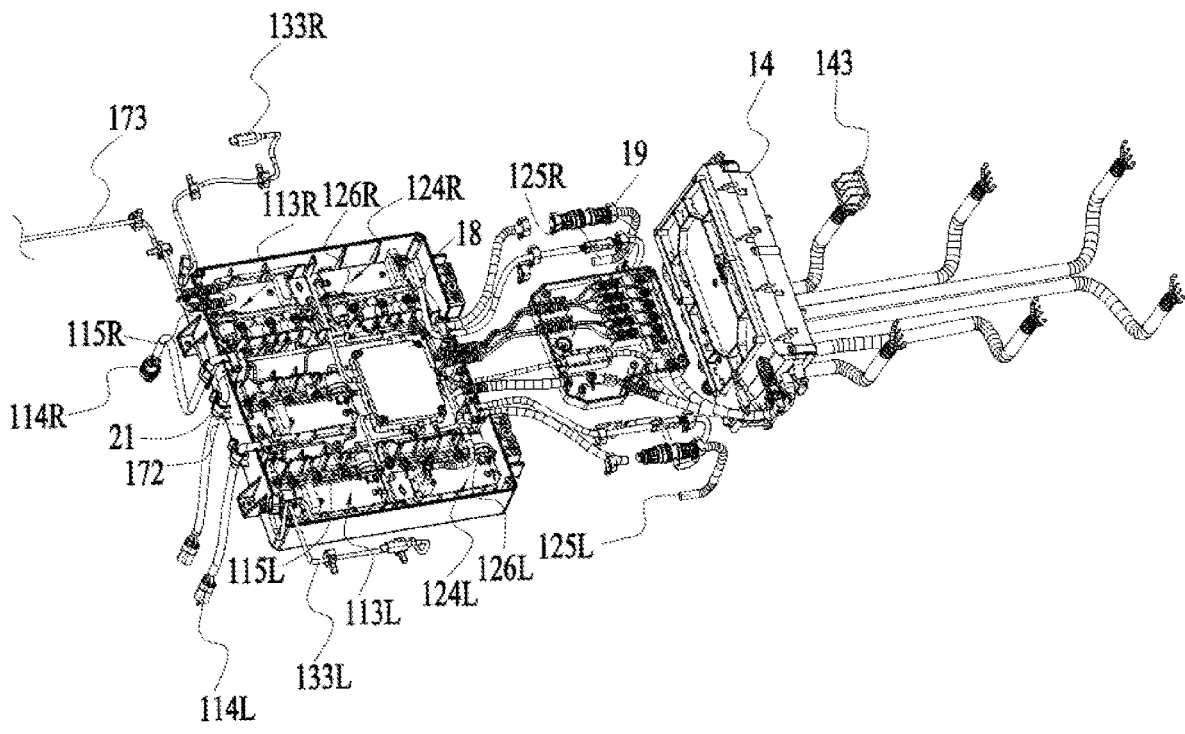
FIG. 5 is a structural diagram of an electric control system of an example of the riding lawn mower from a perspective.

Referring to FIG. 5, according to an example of the riding lawn mower 100, the electric control system includes the left cutting control module 113L, the right cutting control module 113R, the left walking control module 124L, the right walking motor control module 124R, the bus module 18, the power supply management module 142, the left operation sensing module, the right operation sensing module, and a power supply positive junction box 25. Optionally, the lighting control module 172 is also included.

The left cutting control module 113L is configured to control the left cutting motor 112L. The right cutting control module 113R is configured to control the right cutting motor 112R. The left walking control module 124L is configured to control the left walking motor 123L. The right walking control module 124R is configured to control the right walking motor 123R.

The power supply management module 142 is configured to coordinate and control the discharge process of at least one battery pack 141. The electric energy discharged by the at least one battery pack 141 is distributed to other modules through the power supply positive junction box 25, for example, the left cutting control module 113L, the right cutting control module 113R, the left walking control module 124L, the right walking motor control module 124R, the bus module 18 and so on.

The bus module 18 is in commutation connection with the left cutting control module 113L, the right cutting control module 113R, the left walking control module 124L, the right walking control module 124R, the power supply management module 142, the left operation sensing module (not shown), and the right operation sensing module (not shown), the power supply positive junction box 25 and the lighting control module 172.

The riding lawn mower 100 includes at least one circuit board 19 for installing the cutting control module 113, the walking control module 124, and the power supply management module 142, and optionally, the operation sensing module, the bus module 18 and the illuminating light 171. The circuit board 19 is provided with electronic components, and the electronic components include a controller, a hardware circuit that cooperates with the controller, and the like.

Optionally, the riding lawn mower 100 includes a plurality of circuit boards 19 for respectively installing the cutting control module 113, the walking control module 124, the operation sensing module 132, the power supply management module 142, and the bus module 18. Each of the circuit boards is arranged separately. The advantage is that the above-mentioned modules are separately arranged on different circuit boards, which is convenient for installation and disassembly, facilitates independent maintenance, and reduces maintenance costs.

As an optional solution, the left cutting control module 113L, right cutting control module 113R, left walking control module 124L, right walking control module 124R, bus module 18, power supply management module 24, left operation sensing module 132L, right operation sensing module Both the 132R and the lighting control module 27 include a circuit board, and each module is separately arranged on a plurality of different circuit boards, that is, each module is separately arranged on a circuit board. In this way, each module is self-contained, easy to install and maintain separately, and reduce maintenance costs.

Optionally, the left cutting control module 113L, the right cutting control module 113R, the left walking control module 124L, the right walking control module 124R, the bus module 18, the power supply management module 142, the left operation sensing module 132L, the right operation sensing module 132R, and the lighting control module 172 are all provided with an interface group. The interface group is provided with multiple interfaces.

Figure 6:
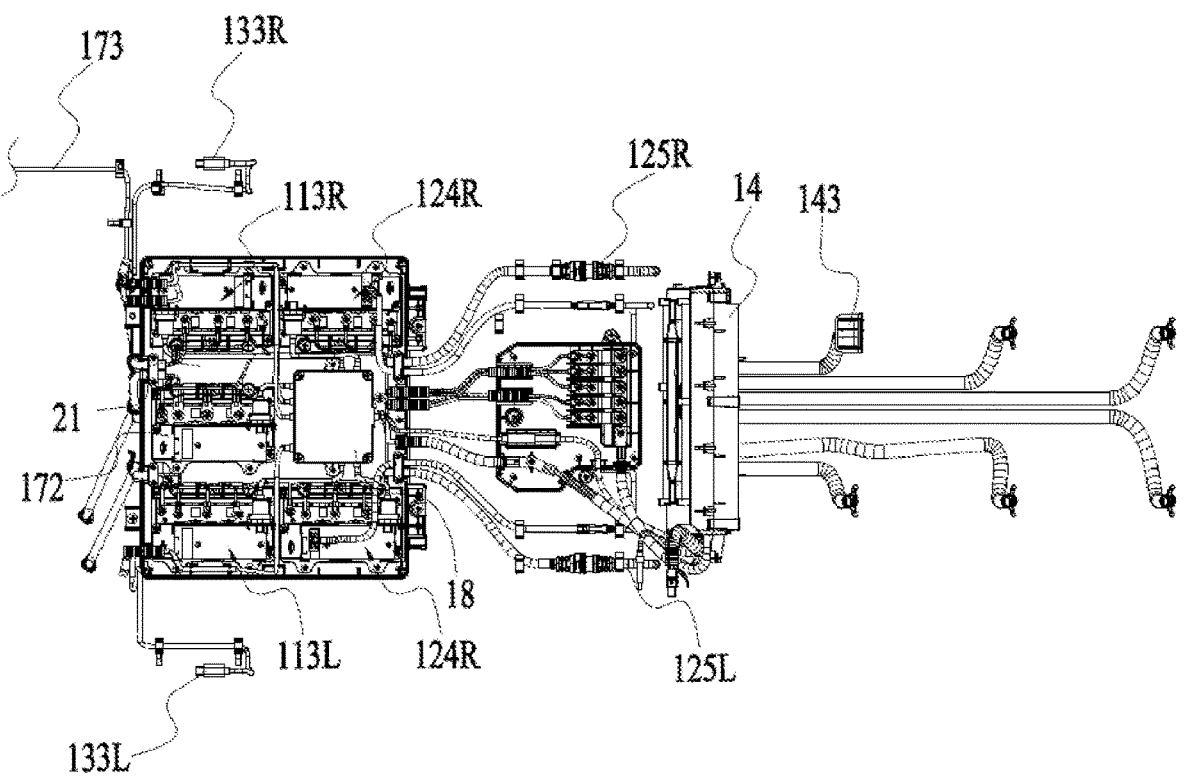
FIG. 6 is a structural diagram of the electric control system of the example of the riding lawn mower from another perspective.
Figure 7:
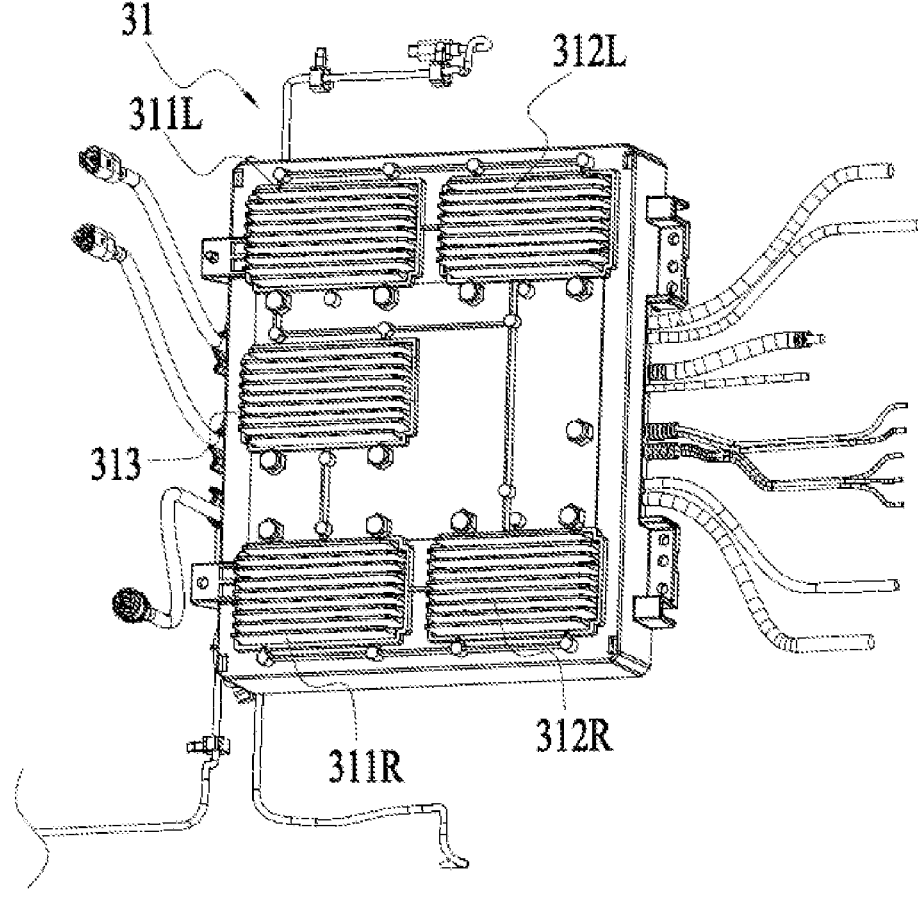
FIG. 7 is a first heat sink of the riding lawn mower.
Figure 8:
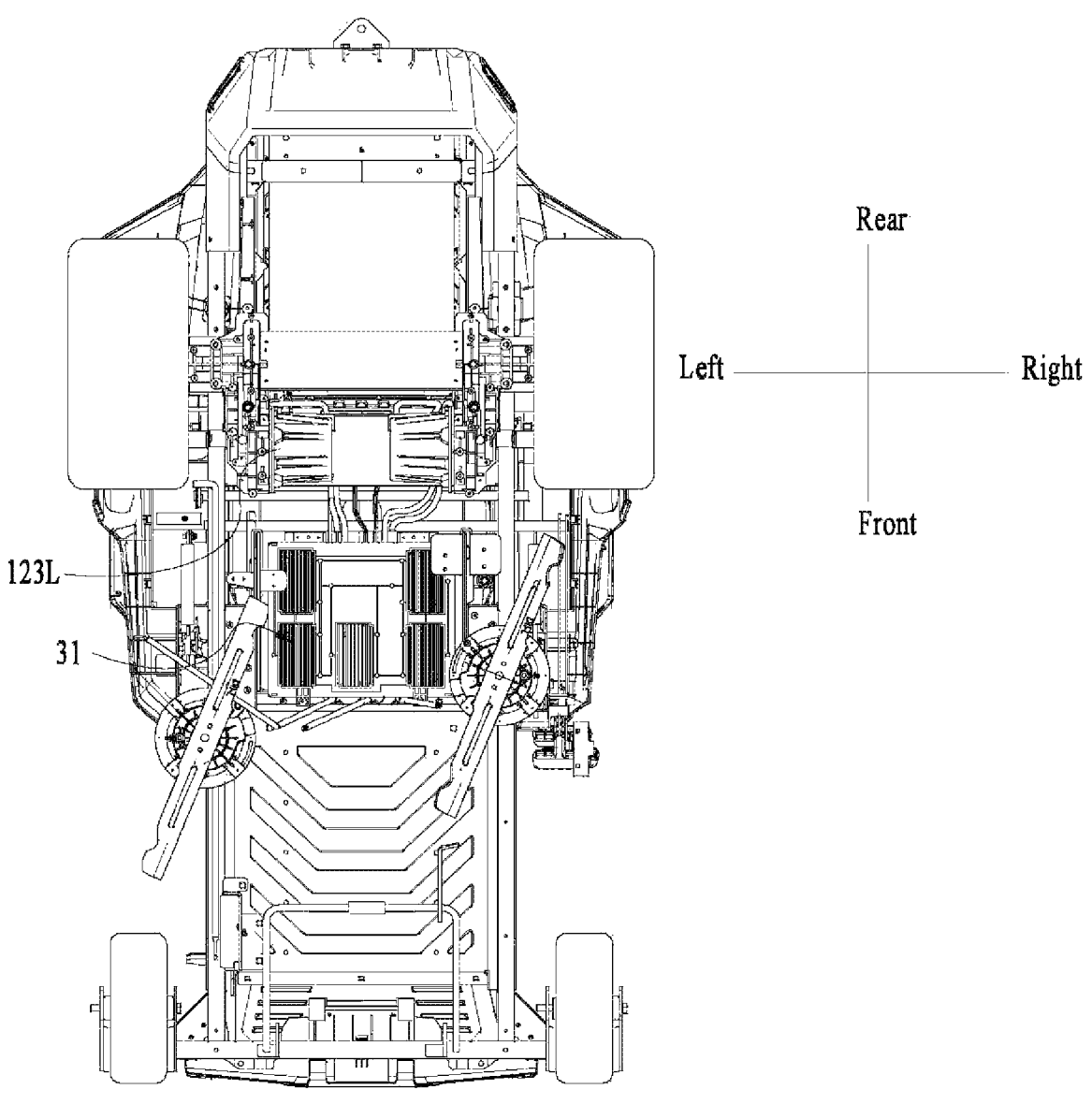
FIG. 8 is a structural diagram of the riding lawn mower from another perspective.

Referring to FIGS. 5 and 6, a left cutting control module 113L is provided with a left cutting motor interface 114L and a communication interface 115L, which are respectively used for connecting the left cutting motor 112L and the bus modules 18. Similarly, the right cutting control module 113R is provided with a right cutting motor interface 114R and a communication interface 115R, which are respectively used for connecting the right cutting motor 112R and the bus module 18.

The left walking control module 124L is provided with a left walking motor interface 125L and a communication interface 126L, which are respectively used for connecting the left cutting motor 123L and the bus module 18. The right cutting control module 124R is provided with a right cutting motor interface 125R and a communication interface 126R, which are respectively used for connecting the right cutting motor 123R and the bus module 18. The lighting control module 172 is provided with an interface 173 for connecting the illuminating light 171.

The power supply management module 142 is provided with a plurality of battery pack interfaces 143 for connecting with the plurality of battery packs 141. The power supply management module 142 is also provided with a bus positive output terminal, which is connected to the power supply positive junction box 25, and a plurality of positive output terminals are branched out through the power supply positive junction box 25. The plurality of positive output terminals are used to connect with the power ports of other modules to provide electric power to other modules. The power supply management module 142 is also provided with a communication interface for connecting the bus module 18 through a communication wire.

The bus module 18 is also provided with multiple interfaces, including a communication interface for connecting each module and a positive power terminal. For example, the bus module 18 is provided with a communication interface 133L for connecting the left operation sensing module 132L and a communication interface 133R for connecting the right operation sensing module 132R. The bus module 18 has a plurality of communication interfaces for connecting with the above-mentioned modules through communication wires. Optionally, the communication interface is a type-C interface to facilitate insertion and assembly.

In this way, each module can be connected to other external modules or components through an interface, so that the modules can be connected to each other through a wire and without complicated circuit design and layout, making the structure of the electric control system of the riding lawn mower 100 more compact, reliable, and simple, and making the modules easy to replace, repair and assemble.

When the interface group is provided with multiple interfaces, each interface can be connected to wires of different colors or lengths, which can effectively prevent the wires from being connected incorrectly and damaging the electrical components.

Optionally, the plurality of circuit boards and the plurality of modules are arranged under the seat 15. This has the advantage of saving space, lowering the center of gravity of the whole machine, and making the operation of the riding lawn mower safer and more stable. In this example, the left cutting control module 113L, the right cutting control module 113R, the left walking control module 124L, the right walking control module 124R, the bus module 18, and the lighting control module 172 are arranged under the seat 15, and the left operation sensing module 132L is arranged near the left operating mechanism 131L, and the right operation sensing module 132R is arranged near the right operating lever 131R.

Optionally, the power supply management module 142 may be arranged on the lower rear side of the seat 15, at a position close to the front of the battery compartment 144, to save space.

Figure 9A:
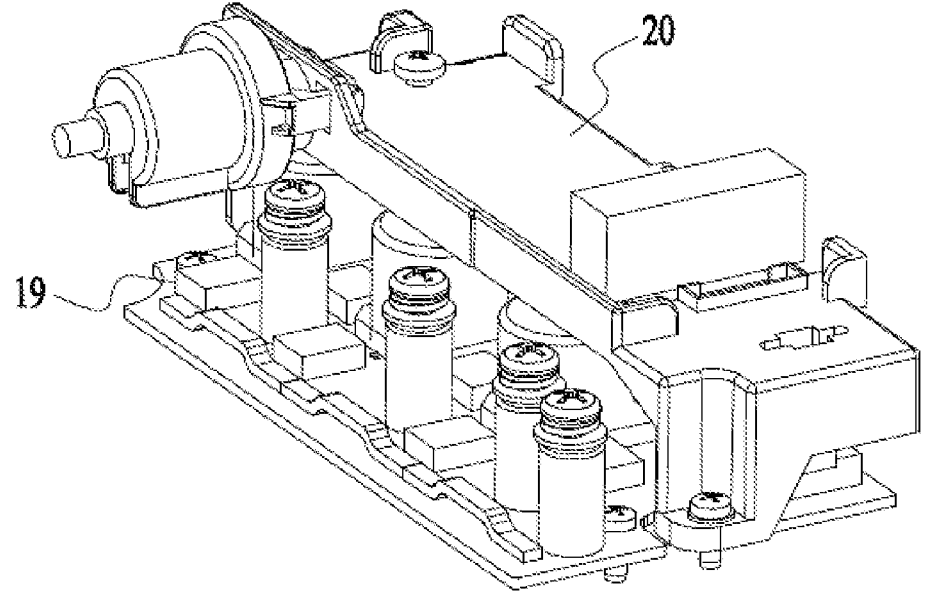
FIG. 9A is a structural diagram of a circuit board including a cover from a perspective.
Figure 9B:
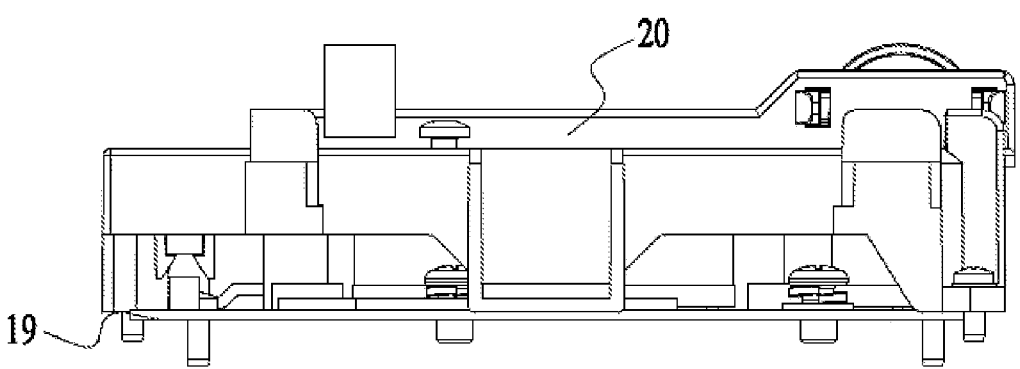
FIG. 9B is a structural diagram of the circuit board including the cover from another perspective.
Figures 10, 11:
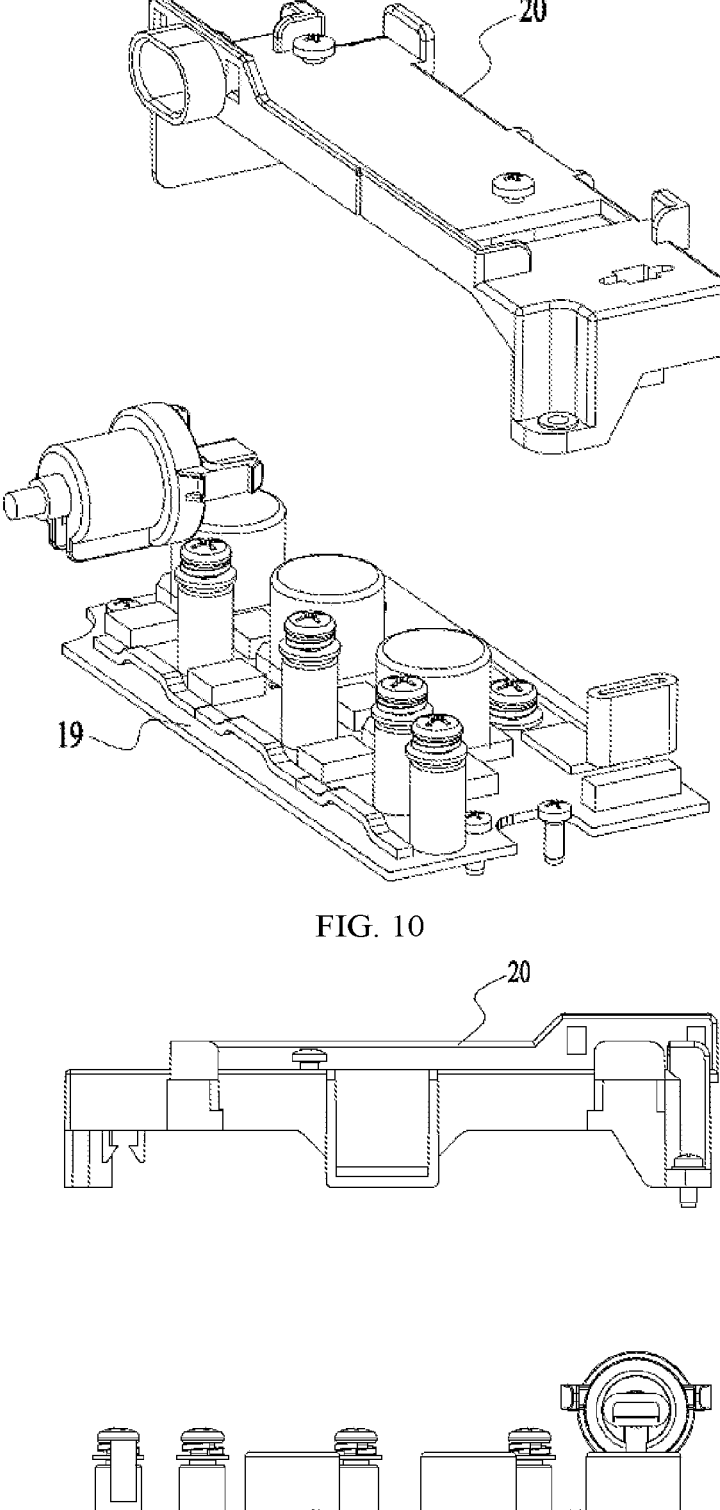
FIG. 10 is a structural diagram of the circuit board and the cover separated from each other from a perspective.
FIG. 11 is a structural diagram of the circuit board and the cover separated from each other from another perspective.

Referring to FIGS. 9-11, optionally, a detachable cover 20 is provided on the circuit board 19, the cover 20 is at least partially located above the core components on the circuit board, for example, above the controller to protect the components on the circuit board. Optionally, the cover 20 is provided in a semi-open form. In other words, the cover is not completely closed, so that external airflow can flow through the electronic components on the circuit board, which improves the cooling effect of the control module and the components.

Optionally, the riding lawn mower 100 further includes a metal plate 21, which is disposed on the lower side of at least one of the cutting control module 113, the walking control module 124, and the power supply management module 142. The negative terminal of at least one of the cutting control module 113, the walking control module 124, and the power management module 142 is connected to the metal plate.

In an optional example, the cutting control module 113 includes a left cutting control module 113L and a right cutting control module 113R, and the walking control module 124 includes a left walking control module 124L and a right walking control module 124R. The left cutting control module 113L and the left walking control module 124L share a metal plate, the right cutting control module 113R and the right walking control module 124R share a metal plate, and the bus module 18 and the lighting control module 172 share a metal plate. The power supply management module 142 uses a metal plate alone. The above-mentioned left cutting control module 113L, right cutting control module 113R, left walking control module 124L, right walking control module 124R, bus module 18, and lighting control module 172 can all share a metal plate, that is, the negative terminals of the above modules are all connected to the same metal plate.

Optionally, the metal plate is made of aluminum material. The advantage is that the negative terminal of each module can be connected through the metal plate 21, thereby reducing the wiring, simplifying the wiring difficulty, reducing the cost, and facilitating maintenance.

Referring to FIGS. 5-8, the riding lawn mower 100 includes a heat sink for cooling the electrical control system. Optionally, the riding lawn mower 100 includes a first heat sink 31, which is located close to the cutting control module 113 and/or the walking control module 124 and faces the ground, which is mainly used to cool the controller in the control module and the electronic components that generate heat.

The first heat sink 31 includes a plurality of cooling fins, and the plurality of cooling fins are vertically arranged at the bottom of the circuit board of the cutting control module 113 and/or the walking control module 124 to increase the cooling area. The cooling fins are arranged in parallel with the front and rear direction of the riding lawn mower. When the riding lawn mower 100 is walking, the airflow flows through the cooling fins, creating a good cooling effect.

In an alternative example, the cutting control module 113 includes a left cutting control module 113L and a right cutting control module 113R, the walking control module 124 includes a left walking control module 124L and a right walking control module 124R, and the first heat sink 31 includes a left cutting heat sink 311L, a right cutting heat sink 311R, a left walking heat sink 312L and a right walking heat sink 312R, wherein the left cutting heat sink 311L is disposed on the lower side of the left cutting control module 113L, and the right cutting heat sink 311R is disposed on the lower side of the right cutting control module 113R, the left walking heat sink 312L is disposed on the lower side of the left walking control module 124L, and the right cutting heat sink 311R is disposed on the lower side of the right walking control module 124R.

Optionally, the first heat sink 31 further includes a lighting control heat sink 313, which is disposed on the lower side of the lighting control module 172 for cooling the lighting control module 172.

The first heat sink 31 is disposed facing the ground. In the example with the metal plate 21, the first heat sink 31 is disposed on the lower side of the metal plate 21. When the riding lawn mower 100 is walking, the airflow flows through the first heat sink 31 to take away the heat of the first heat sink 31 and the above-mentioned control module, creating a good cooling effect. The number of first heat sinks 31 of the riding lawn mower 100 can be configured according to actual cooling requirements.

Optionally, the riding lawn mower 100 includes a second heat sink 32, and the second heat sink 32 is disposed close to the power supply management module 142 and facing the front of the riding lawn mower 100.

The second heat sink 32 includes a plurality of cooling fins, and the plurality of cooling fins are vertically arranged at the bottom of the circuit board of the power supply management module 142 facing the front of the riding lawn mower 100 to increase the cooling area. The cooling fins are arranged substantially in parallel with the up and down direction of the riding lawn mower. When the riding lawn mower 100 is walking, the airflow flows through the cooling fins, creating a good cooling effect.

The second heat sink 32 is used for cooling the power supply management module 142 and is mainly used for the controller in the power supply management module and the electronic components that are prone to generate heat. When the riding lawn mower 100 travels forward, the airflow from the front of the riding lawn mower 100 flows through the second heat sink 32, taking away the heat from the power supply management module 142 and the second heat sink 32, creating a good cooling effect.

Figure 12:
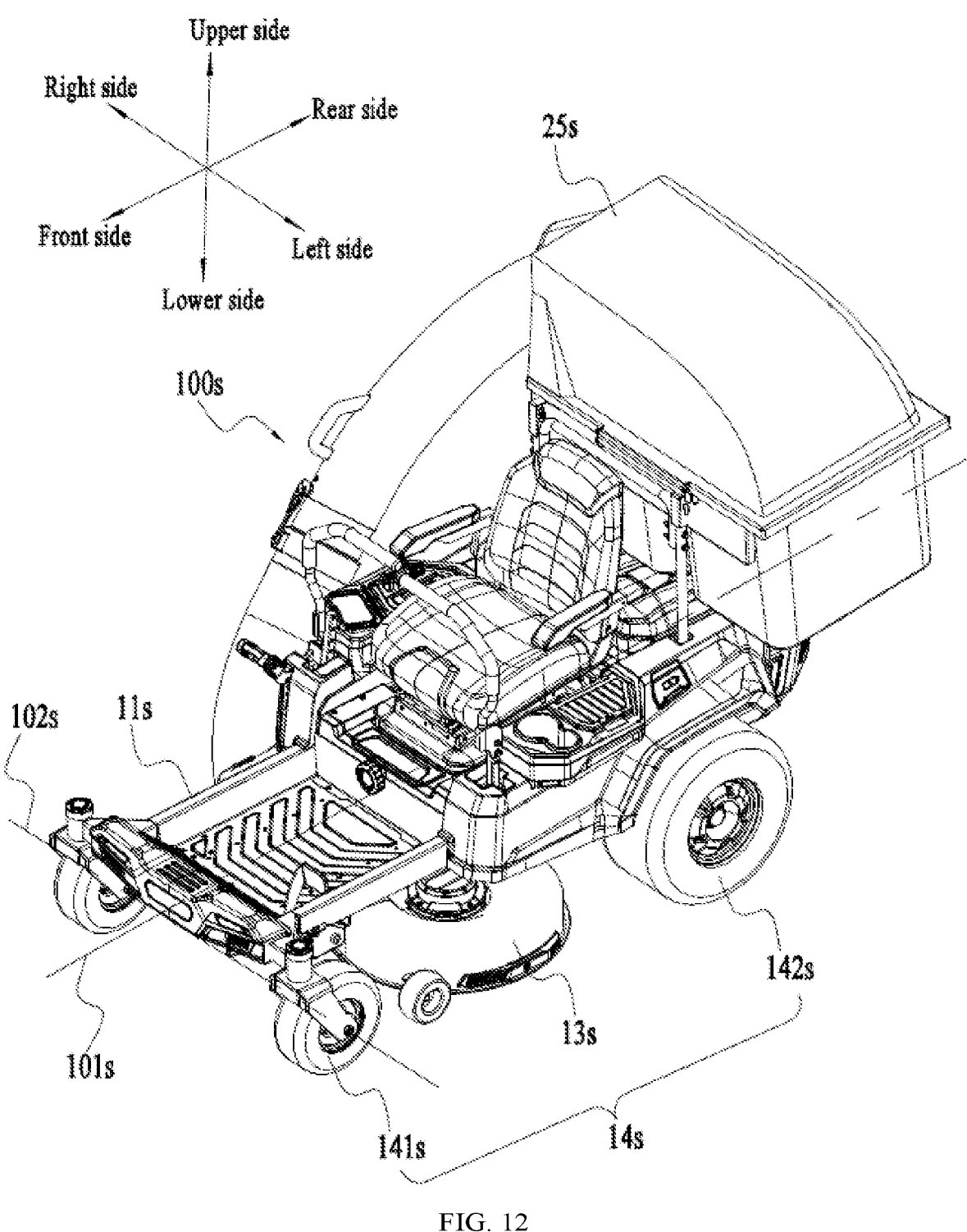
FIG. 12 is a perspective view of a riding mower.

An electric riding machine shown in FIG. 12 may be an electric machine for working indoors or outdoors. In this example, a riding mower 100s is taken as an example of the electric riding machine. A user can sit on the riding mower 100s to control the riding mower 10 to trim, for example, a lawn and vegetation.

It is to be understood that the electric riding machine may also be a tool of another type. The electric riding machine may be an electric riding vehicle, for example, an all-terrain vehicle or a golf cart. Alternatively, the electric riding machine may be an electric riding tool with its function implemented through outputting a certain form of power, for example, a riding snowplow or a riding agricultural machine. Of course, it is to be understood that the electric riding machine may be a tool for other purposes, for example, a riding mopping vehicle or a riding forklift. In fact, as long as including the substantive content of the description hereinafter in the present application, these tools all fall within the scope of the present application.

To facilitate the description of technical solutions in the present application, a riding mower is taken as an example. Moreover, a front side, a rear side, a left side, a right side, an upper side, and a lower side shown in FIG. 12 are further defined.

As shown in FIG. 12, the riding mower 100s includes a main frame 11s, a seat 12s, a power output assembly 13s, a traveling assembly 14s, an operating assembly 15s, and a power supply apparatus 16s.

The main frame 11s is configured to carry the seat 12s, the power output assembly 13s, the traveling assembly 14s, the operating assembly 15s, and the power supply apparatus 16s. The main frame 11s at least partially extends in the direction of a first straight line 101s parallel to the front and rear direction. The preceding assemblies and apparatuses are reasonably distributed to various parts of the main frame.

The power output assembly 13s includes an output member configured to output power to implement the mechanical function. For example, in this example, the output member may be a mowing element. The power output assembly 13s is further connected to the main frame 11s. In this example, the power output assembly 13s is mounted on the lower side of the main frame 11s. The power output assembly 13s further includes a first motor and a chassis. The mowing element is configured to implement the mowing function. The first motor is configured to drive the mowing element to rotate at a high speed. The chassis is formed with an accommodation space configured to accommodate at least part of the motor and part of the mowing element. The power output assembly may include more than one mowing element. Correspondingly, the number of first motors may correspond to the number of mowing elements.

The traveling assembly 14s is configured to enable the riding mower 100s to travel on the lawn. The traveling assembly 14s may include first traveling wheels 141s and second traveling wheels 142s. In the front and rear direction, the first traveling wheels 141s are disposed on the front side of the second traveling wheels 142s. In this example, the number of the first traveling wheels 141s is two, and the number of the second traveling wheels 142s is also two. In the direction of the first straight line 101s, the power output assembly 13s is at least partially disposed between the first traveling wheels 141s and the second traveling wheels 142s. Moreover, in the direction of the first straight line 101s, the seat 12s is also at least partially disposed between the first traveling wheels 141s and the second traveling wheels 142s. In this case, the center of gravity of the entire mower is located between the first traveling wheels 141s and the second traveling wheels 142s and in the direction of the first straight line 101s, thereby improving the balance performance of the entire mower. A first traveling wheel 141 may be an Omni wheel rotatable around a first axis 102s and has a first diameter. The traveling assembly 14s further includes a second motor configured to drive the second traveling wheels 142s to rotate around a second axis. The number of second motors is also two. In this case, when the two second motors drive the corresponding second traveling wheels 142s to rotate at different rotational speeds, a speed difference is generated between the two second traveling wheels 142s, thereby causing the riding mower 100s to turn. A second traveling wheel 142 has a second diameter. The second diameter of a second traveling wheel 142 is greater than the first diameter of a first traveling wheel 141.

The operating assembly 15s is configured to be operated by the user to control the riding mower 100s to travel and output power. The operating assembly 15s may include a first operating element 151s and a second operating element 152s. The first operating element 152 is configured to be operated manually by the user to start the motors so as to control the mowing element to mow the grass and control the riding mower 100s to travel on the lawn. The second operating element 152s is for the user to press down so as to control the running state of the mower.

Figure 13:
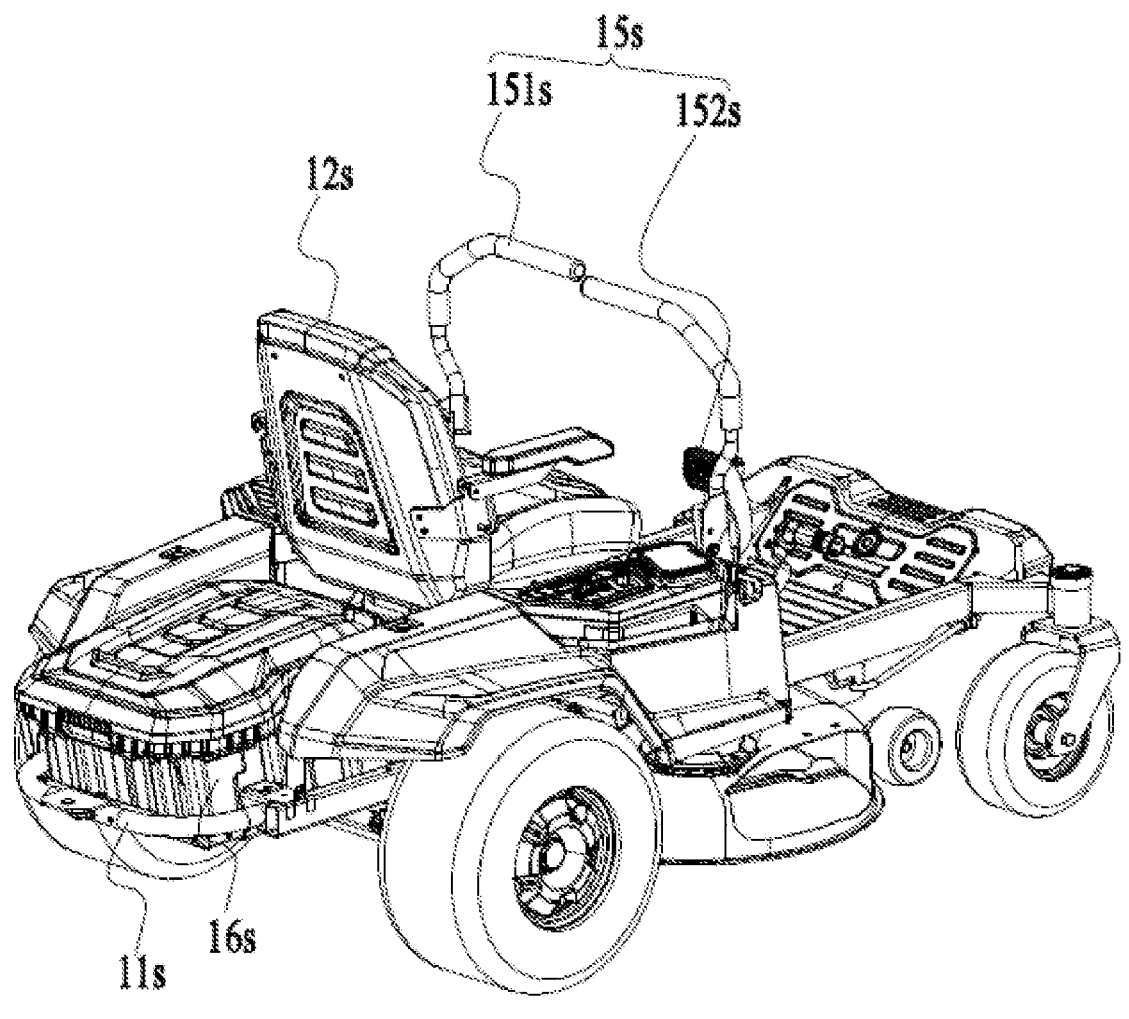
FIG. 13 is a perspective view taken from another angle to illustrate the riding mower of FIG. 12 without a grass catcher.
Figure 14:
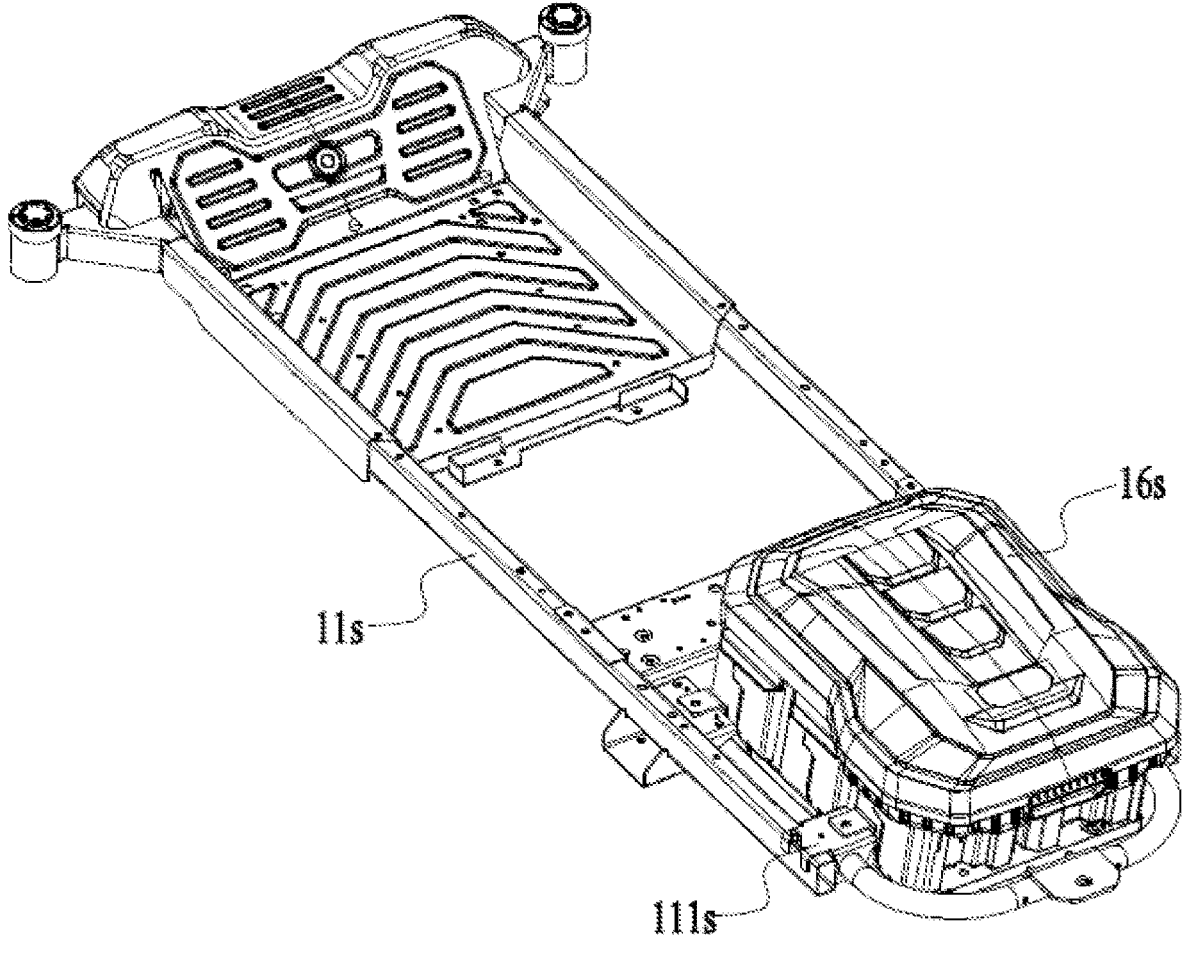
FIG. 14 is a perspective view illustrating a power supply apparatus of the riding mower of FIG. 1 is disposed on a main frame of the riding mower of FIG. 12

As shown in FIGS. 13 and 14, the power supply apparatus 16s is configured to supply power to the power output assembly 13s and the traveling assembly 14s. The power supply apparatus 16s is disposed on the main frame 11s and is detachable from the main frame 11s. In some examples, the power supply apparatus 16s is disposed in the rear of the main frame 11s. The power supply apparatus 16s matches other components disposed in the front and middle of the main frame 11s so that the center of gravity of the riding mower 100s is located between the first traveling wheels 141s and the second traveling wheels 142s and in the direction of the first straight line 101s. Accordingly, the center of gravity of the riding mower 100s is more stable, preventing the riding mower 100s from overturning when extending through a steep uphill or downhill.

Figure 15:
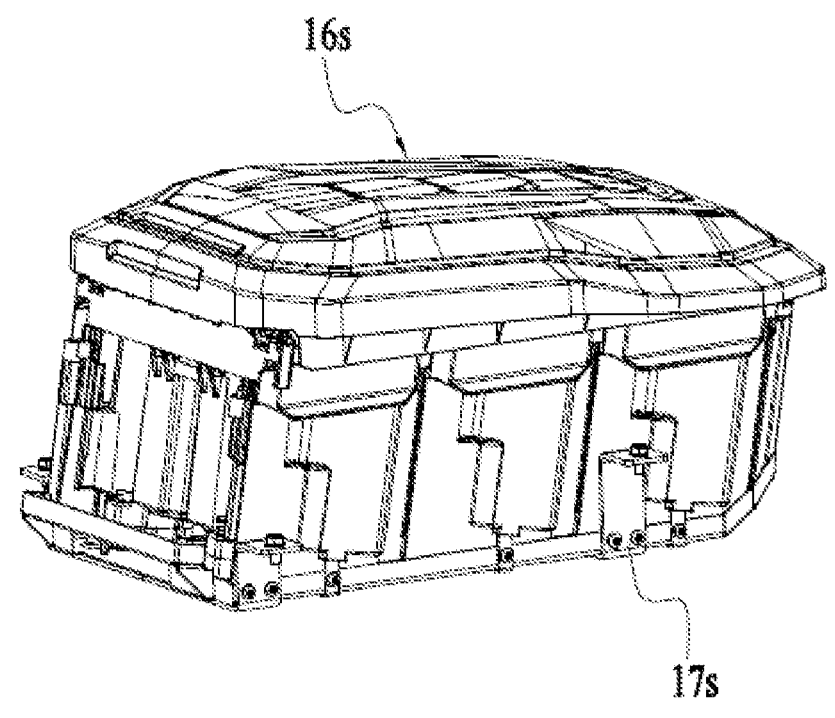
FIG. 15 is a perspective view of the power supply apparatus of the riding mower of FIG. 12.
Figure 16:
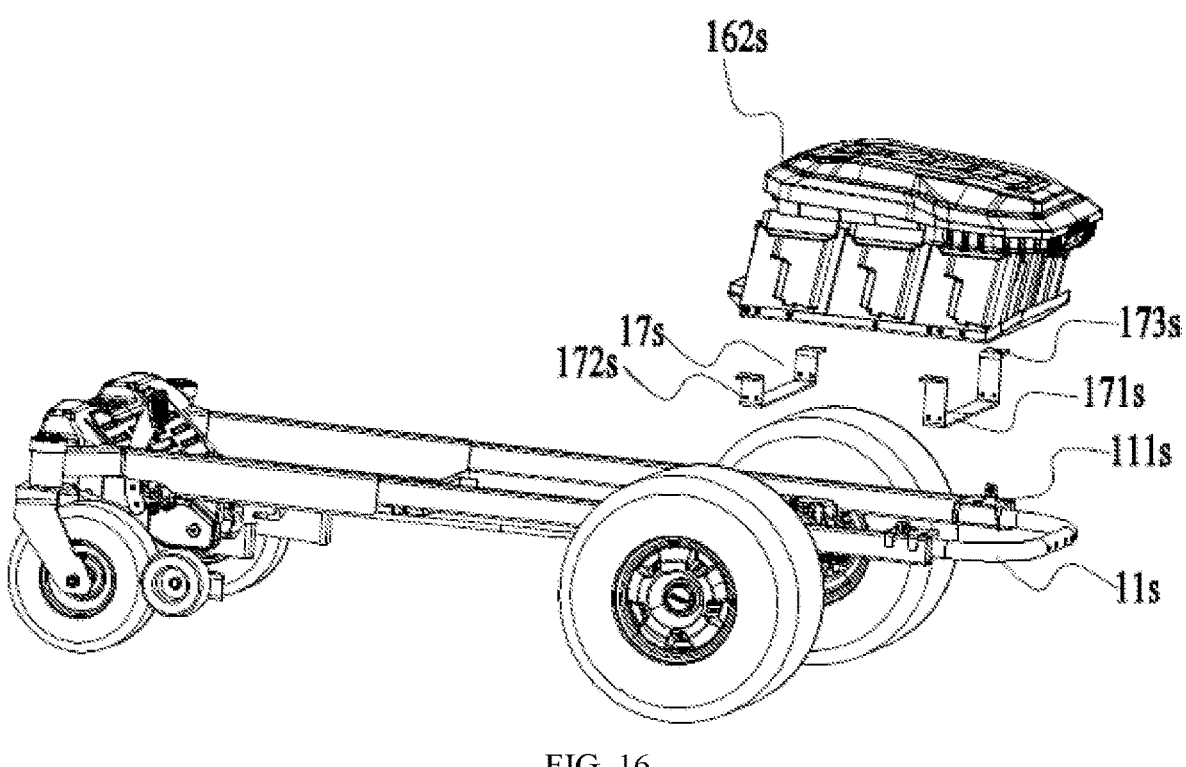
FIG. 16 is an exploded view of the connection relationship between the power supply apparatus of the riding mower of FIG. 14 and the main frame of the riding mower of FIG. 14.

As shown in FIGS. 15 and 16, the power supply apparatus 16s is connected to the main frame 11s by a group of support bases 17. A support base 17s includes a support portion 171s configured to support the power supply apparatus 16s, a first connection portion 172s, and a second connection portion 173s. The first connection portion 172s is configured to connect the power supply apparatus 16s. The second connection portion 173s is configured to connect the main frame 11s. The first connection portion 172s is connected to a bottom end of the power supply apparatus 16s through a connector. The second connection portion 173s is connected to the main frame 11s through a connector. Optionally, the main frame 11s is further provided with a connection mechanism 111s. The connection mechanism 111s serves as an intermediate member disposed on the main frame 11s, protecting the structural strength of the main frame 11s and guaranteeing the stability of the connection between the power supply apparatus 16s and the main frame 11s. It is to be understood that the main frame 11s may be provided with no connection mechanism and directly connected to the main frame 11s. In an alternative example, each connector may be a screw, and the first connection portion 172s and the second connection portion 173s may be each provided with a screw hole. It is to be understood that the first connection portion 172s and second connection portion 173s may be disposed in any manner as long as the power supply apparatus 16s can be detachably connected to the main frame 11s and a stable connection can be ensured.

During the running process of the riding mower, when the road condition is relatively complicated, the riding mower generates a relatively large vibration. When such vibration is transmitted to the main frame 11s and when the main frame 11s transmits the vibration to a connection piece of a battery pack 161s, it is easy to cause a poor contact between the battery pack 161s and the connection piece of the battery pack 161s, thereby causing a potential hazard of bad ignition. In order to avoid the existence of bad ignition, the power supply apparatus 16s is provided with a certain buffer function which can basically absorb the vibration from the main frame 11s. A buffer 112s is disposed in junctions between the support bases 17 and the main frame 11s so that the power supply apparatus 16s adapts to relatively violent vibration. The buffer 112s greatly mitigates the relative movement between the power supply apparatus 16s and the support bases 17. In some examples, the buffer 112s is disposed between second connection portions 173s and the main frame 11s, effectively absorbing the vibration from the main frame 11s and preventing the vibration from the main frame 11s from being transmitted to the power supply apparatus 16s. In another alternative example, the buffer 112s may be also disposed in any junction between the power supply apparatus 16s and the main frame 11s, as long as the vibration from the main frame 11s can be absorbed and prevented from being transmitted to the battery pack 161s. The buffer 112s may be an elastic member 1675s, a rubber member, or another component with the buffer function. When the buffer 112s is provided, the buffer function required by the power supply apparatus 16s is greatly weakened. This arrangement simplifies the structure of the power supply apparatus 16s and reduces the assembly requirements of the power supply apparatus 16s.

Figure 17:
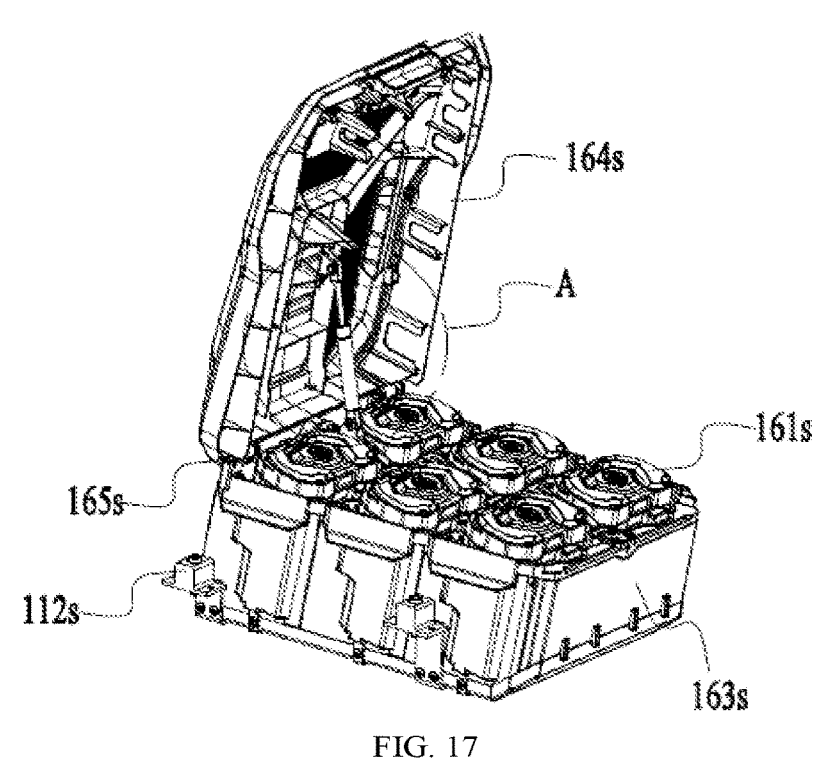
FIG. 17 is a perspective view illustrating that a compartment cover of the power supply apparatus of the riding mower of FIG. 15 is opened.
Figure 18:
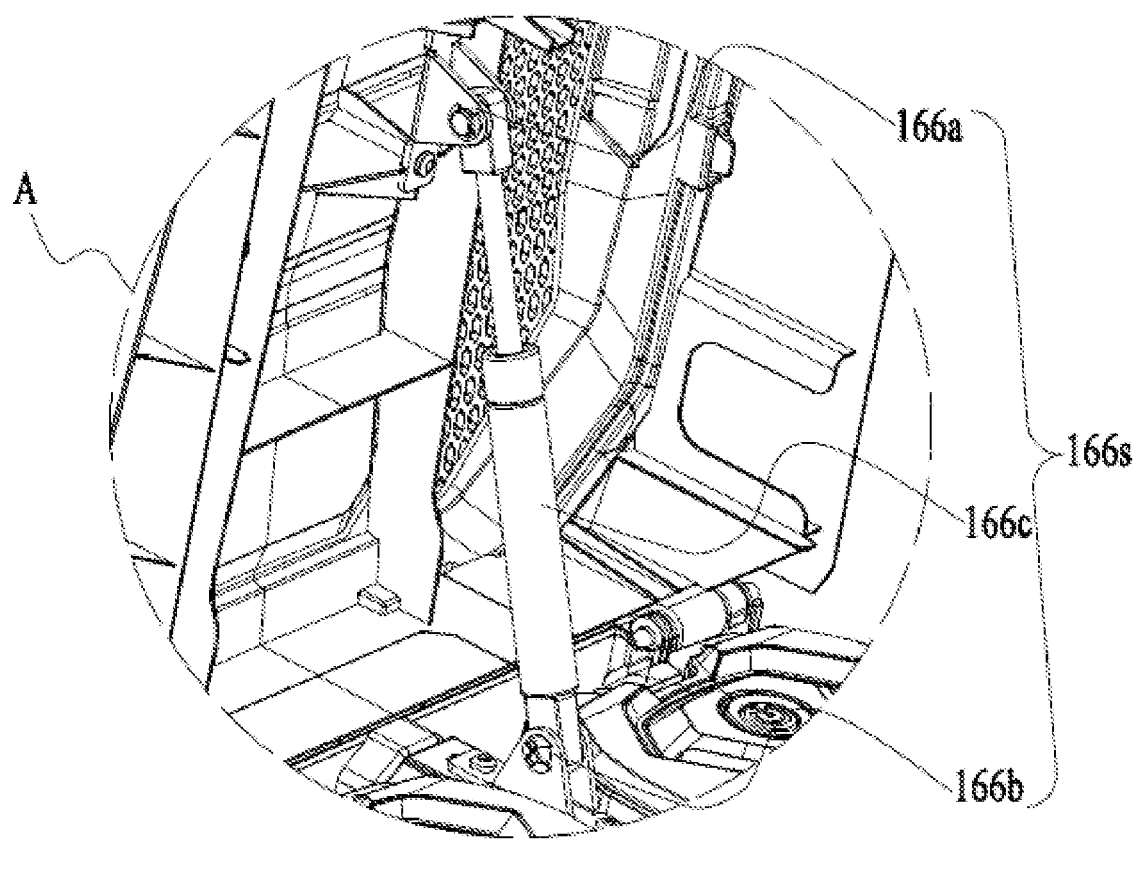
FIG. 18 is a partial enlarged view of position A of the riding mower of FIG. 17.
Figure 19:
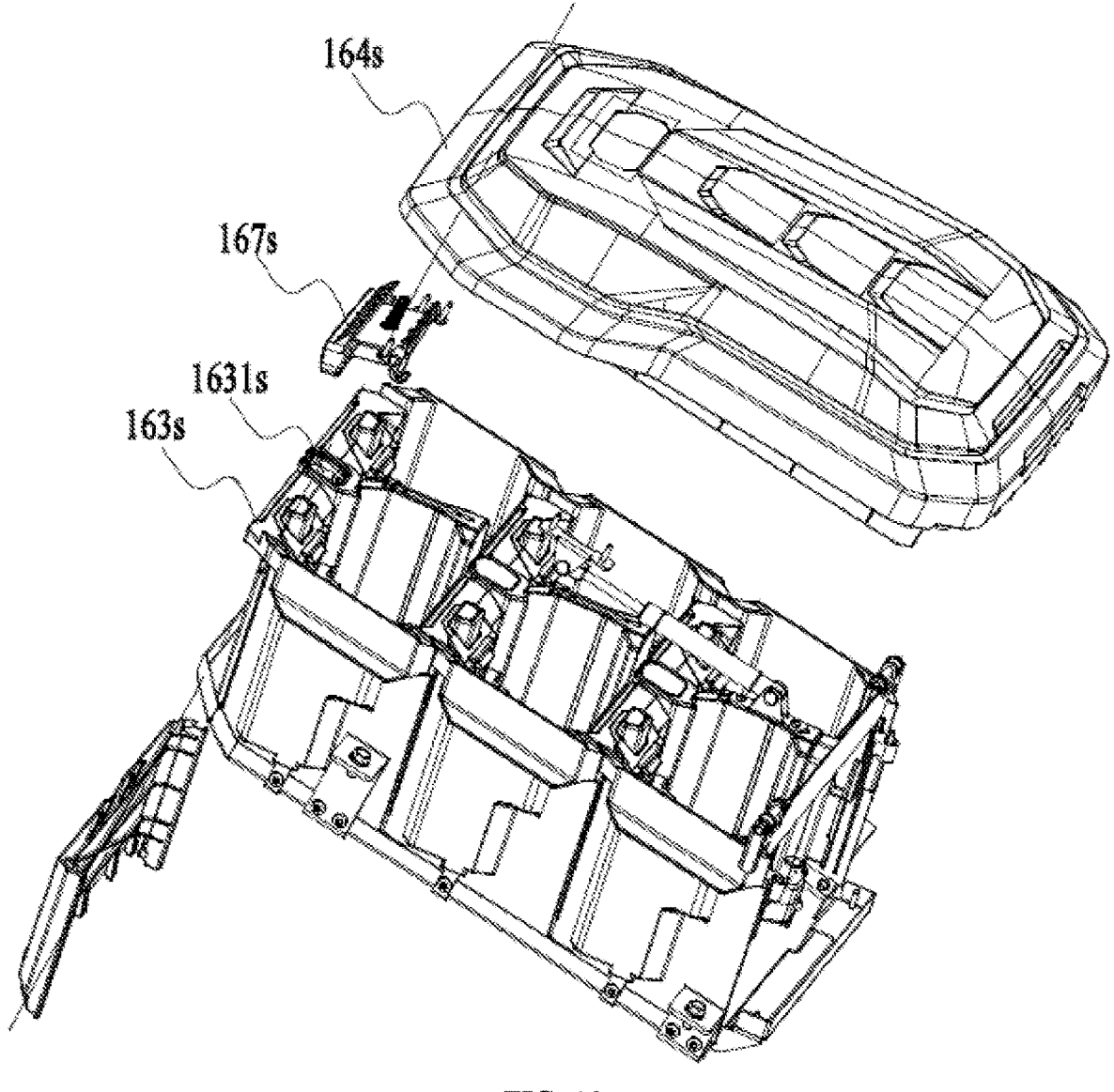
FIG. 19 is an exploded view of the power supply apparatus of the riding mower of FIG. 17.
Figure 20:
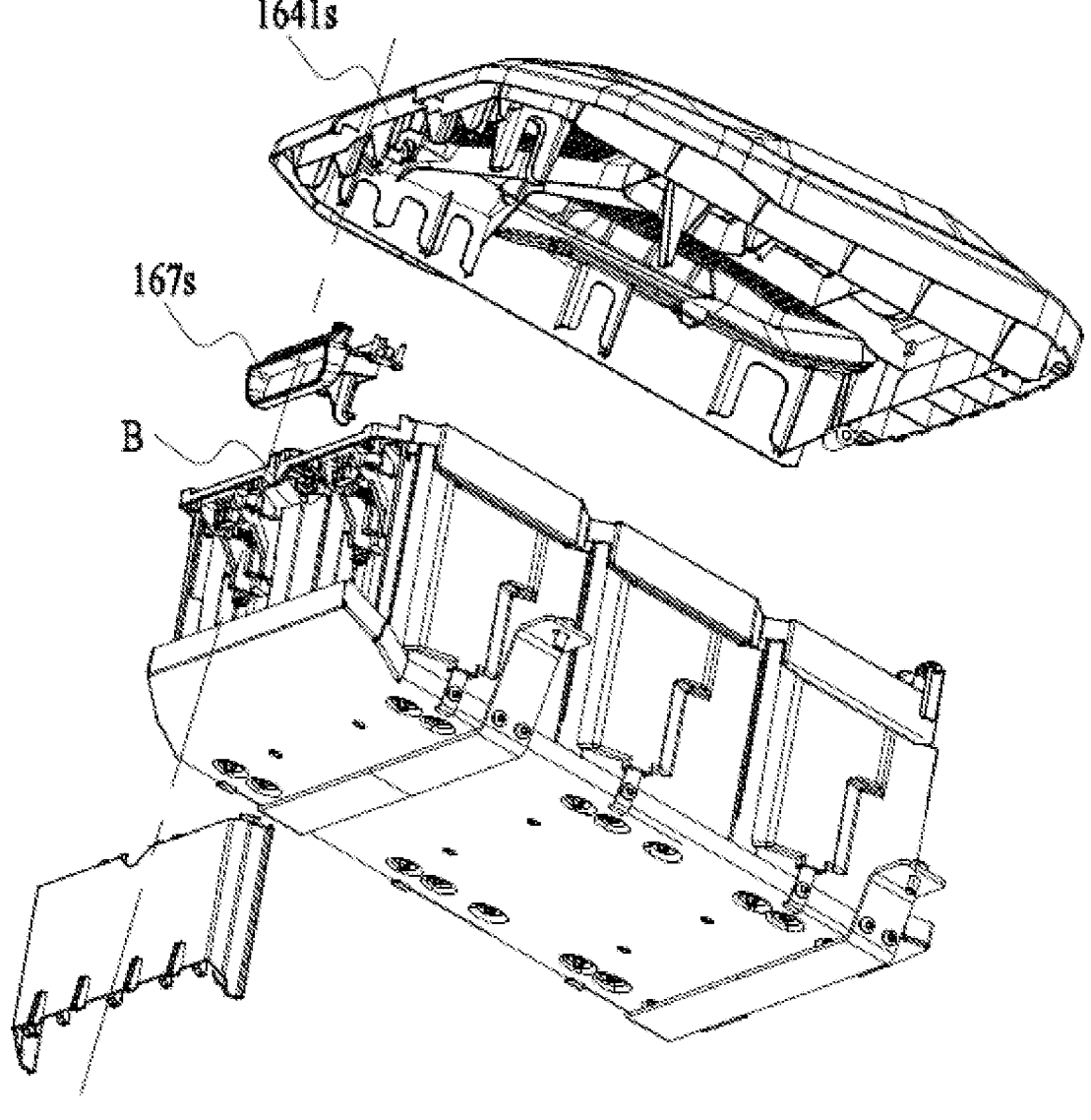
FIG. 20 is an exploded view of the power supply apparatus of the riding mower of FIG. 19 from another perspective.
Figure 21:
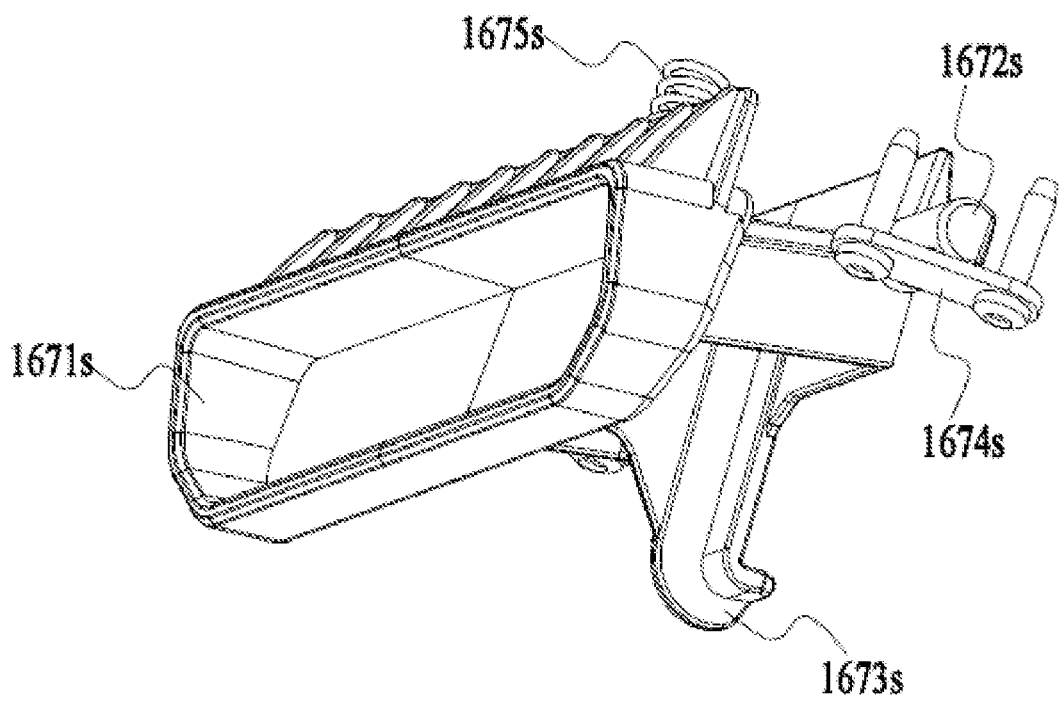
FIG. 21 is a perspective view of a fastener of the power supply apparatus of the riding mower of FIG. 20.
Figure 22:
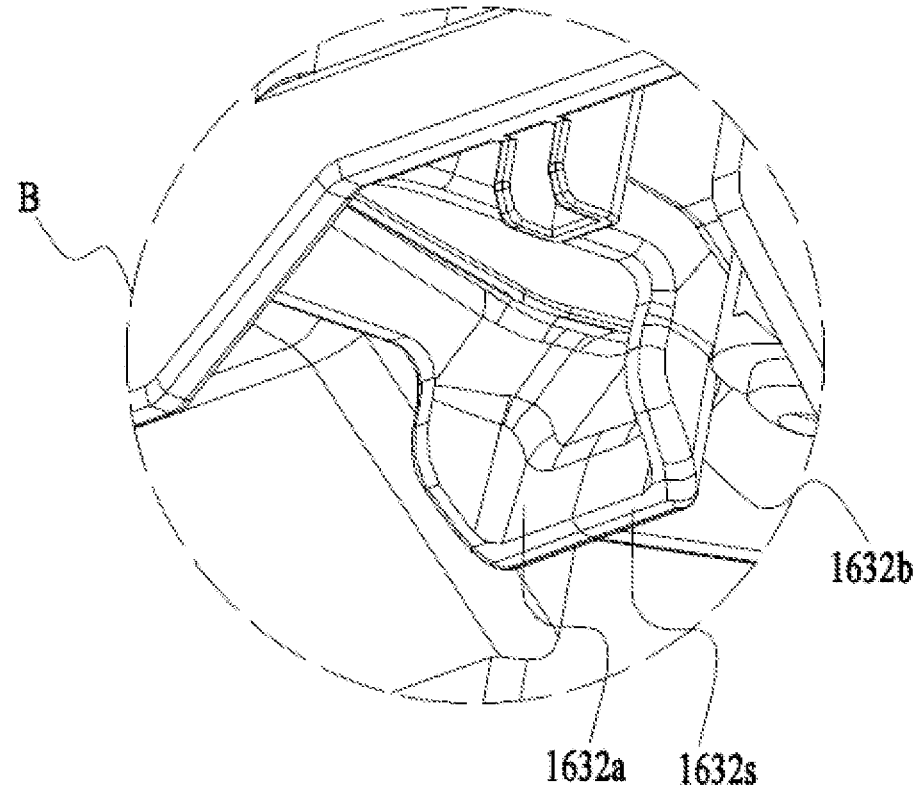
FIG. 22 is a partial enlarged view of position B of the riding mower of FIG. 20.
Figure 23:
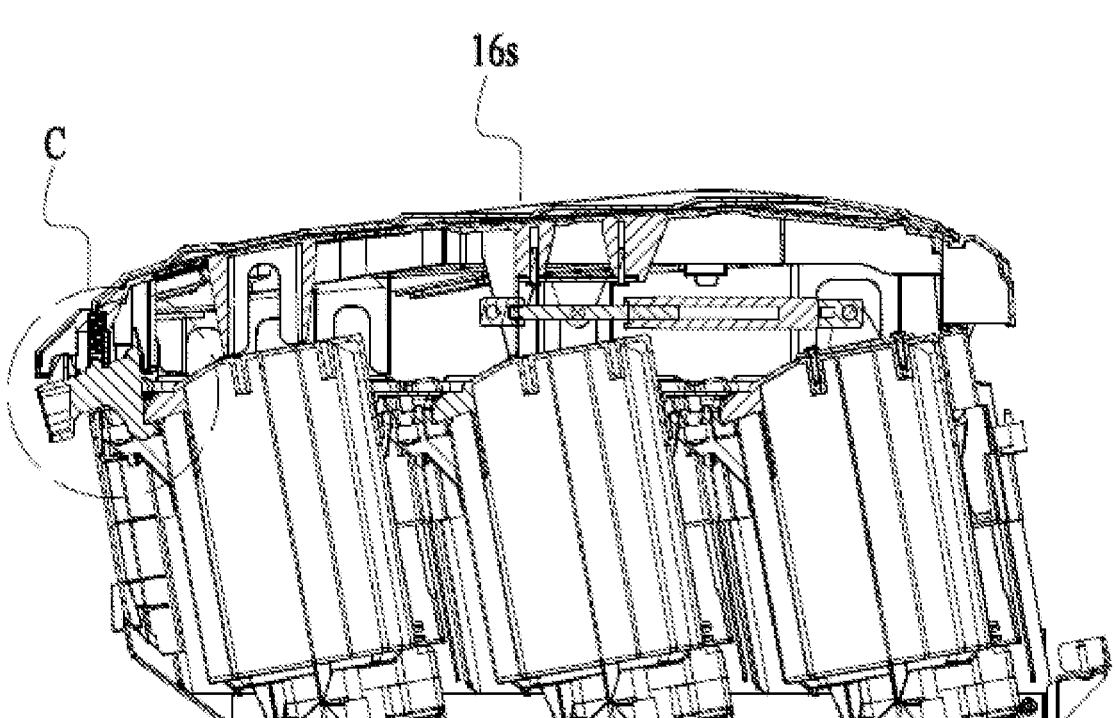
FIG. 23 is a section view of the power supply apparatus of the riding mower of FIG. 15.
Figure 24:
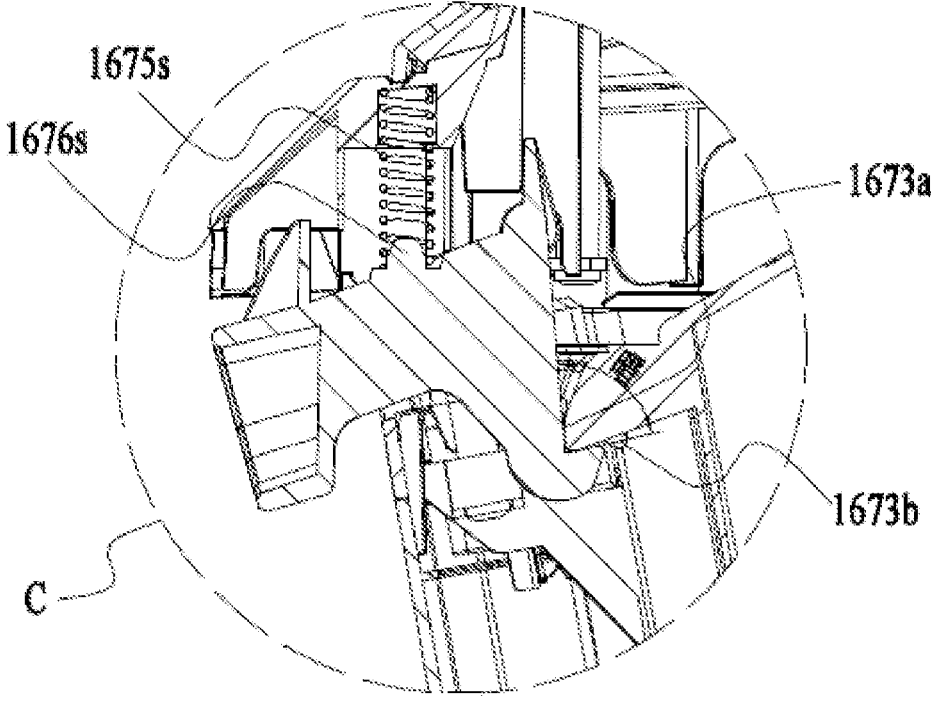
FIG. 24 is a partial enlarged view of position C of the riding mower of FIG. 23.

As shown in FIGS. 17 and 18, the power supply apparatus 16s includes the battery pack 161s and a battery compartment 162s. The battery compartment 162s is formed with an accommodation space configured to accommodate the battery pack 161s. The battery compartment 162s includes a main compartment 163s and a compartment cover 164s. The main compartment 163s is formed with the accommodation space configured to accommodate the battery pack 161s. The compartment cover 164s is configured to be rotatably connected to the main compartment 163s and is able to at least partially enclose the main compartment 163s. In some examples, the compartment cover 164s and the main compartment 163s include a first connector 165s and a second connector 166s. The first connector 165s is disposed on an end of the compartment cover 164s and on an end of the main compartment 163s. The compartment cover 164s is able to rotate around the first connector 165s. The second connector 166s includes a first connection end 166a and a second connection end 166b. The first connection end 166a is disposed in the middle of the compartment cover 164s. The second connection end 166b is disposed on the side of the main compartment 163s facing the first connector 165s. A gas spring 166c is disposed between the first connection end 166a and the second connection end 166b. The gas spring 166c can rotate around the first connection end 166a and the second connection end 166b. The gas spring 166c is pre-charged with gas. When the compartment cover 164s is lifted to a preset angle, the gas spring 166c outputs a thrust so as to support the compartment cover 164s to automatically rotate around the first connector 165s to a fully open state. In this case, the battery pack 161s can be detached or mounted. When the compartment cover 164s is closed to a preset angle, the gas spring 166c outputs a thrust so as to support the compartment cover 164s to make the compartment cover 164s to automatically rotate around the first connector 165s until the compartment cover 164s is fully closed. In fact, the second connector 166s has a stop of a thrust that cannot be output. When the user opens or closes the compartment cover 164s, the user needs to manually push the compartment cover 164s across the stop so that the gas spring 166c can automatically output a thrust.

As shown in FIGS. 19 to 24, in an example, the compartment cover 164s is further provided with a fastener 167s configured to lock the compartment cover 164s to the main compartment 163s. In some examples, the fastener 167s includes an operating portion 1671s, a pivot portion 1672s, and a locking portion 1673s. The operating portion 1671s is disposed between the pivot portion 1672s and the locking portion 1673s and is configured to be operated by the user to open or close the compartment cover 164s. The pivot portion 1672s is configured to connect the fastener 167s to the compartment cover 164s and is for the fastener 167s to rotate around. The locking portion 1673s is configured to lock the compartment cover 164s to the main compartment 163s. In some examples, the compartment cover 164s is provided with an accommodation recess 1641s. The accommodation recess 1641s is configured to accommodate at least part of the pivot portion 1672s and enable the pivot portion 1672s to rotate in the accommodation recess 1641s. The pivot portion 1672s is secured to the accommodation recess 1641s through a group of connection assemblies 1674s. In some examples, a connection assembly 1674s includes a pair of screws and a connection piece. The screws are configured to secure the connection piece to the compartment cover 164s and restrict the pivot portion 1672s from sliding out of the accommodation recess 1641s when the pivot portion 1672s is mounted onto the accommodation recess 1641s. The locking portion 1673s is a locking hook extending from the fastener 167s. The main compartment 163s is further formed with a through hole 1631s and a stop portion 1632s. The through hole 1631s is for the locking portion 1673s to extend through. The stop portion 1632s matches the locking hook. In some examples, the locking portion 1673s includes an inner side edge and an outer side edge. The inner side edge abuts the stop portion 1632s and includes a first edge 1673a and a second edge 1673b. The first edge 1673a and the second edge 1673b obliquely intersect each other and form an included angle. The included angle α between the first edge 1673a and the second edge 1673b may be an acute angle. In some examples, the included angle α is greater than or equal to 60° and less than or equal to 90°. In a preferred example, when the included angle α between the first edge 1673a and the second edge 1673b is 90°, the locking effect of the locking portion 1673s is relatively sound. The stop portion 1632s extends out of the through hole 1631s and is formed with a channel and a protrusion. The channel is for the locking portion 1673s to go through. The protrusion engages with the locking portion 1673s. In fact, the stop portion 1632s includes a first surface 1632a and a second surface 1632b. After extending through the through hole 1631s, the locking portion 1673s has a first position matching the stop portion 1632s and a second position away from the stop portion 1632s. When the locking portion 1673s is at the first position, the locking hook abuts the stop portion 1632s and is able to hook the stop portion 1632s. In this case, the locking hook slides from the first surface 1632a of the stop portion 1632s to the second surface 1632b of the stop portion 1632s and is at least partially held on the second surface 1632b, thereby enabling the compartment cover 164s to be locked to the main compartment 163s. When the locking portion 1673s is at the second position, the locking hook is disengaged from the stop portion 1632s. In this case, the locking hook is disengaged from the second surface 1632b of the stop portion 1632s to the first surface 1632a of the stop portion 1632s and is disengaged from the through hole 1631s of the main compartment 163s, and the compartment cover 164s is rotatable around the first connector 165s to any open position.

In an alternative example, the fastener 167s is further provided with an elastic member 1675s configured to provide an elastic force when the locking portion 1673s is at the second position so that the locking portion 1673s can be held at the second position, thereby enabling the compartment cover 164s to be locked to the main compartment 163s. In some examples, the fastener 167s is formed with a stop protrusion 1676s. One end of the elastic member 1675s is sleeved on the stop protrusion 1676s. The other end of the elastic member 1675s is disposed in the accommodation recess 1641s of the compartment cover 164s. In some examples, the elastic member 1675s is disposed on the end of the fastener 167s facing away from the locking portion 1673s and matches the locking portion to form a lever structure. That is, when the elastic member 1675s applies a downward elastic force to the fastener 167s, the fastener 167s takes the position of the through hole 1631s on the main compartment 163s as a pivot so that the locking portion 1673s applies an upward force to the stop portion 1632s, thereby enabling the locking portion 1673s to be locked to the stop portion 1632s.

When the user operates the operating portion 1671s, the elastic force of the elastic member 1675s is overcome first so that the locking portion 1673s is disengaged from the stop portion 1632s and slides from the second surface 1632b to the first surface 1632a. The operating portion is operated so that the fastener 167s is disengaged from the through hole 1631s of the main compartment 163s and the second connector 166s extends across the stop, thereby enabling the second connector 166s to directly drive the compartment cover 164s to automatically rotate to the fully open state. When the compartment cover 164s needs to be closed, the user operates the compartment cover 164s to make the compartment cover 164s extend across the stop so that the second connector 166s enables the compartment cover 164s to be automatically reset to the closed position. In this case, the locking portion 1673s extends through the through hole 1631s on the main compartment 163s and slides from the first surface 1632a of the stop portion 1632s to the second surface 1632b of the stop portion 1632s. Under the action of the elastic member 1675s, the compartment cover 164s is locked by the fastener 167s to the stop portion 1632s of the main compartment 163s.

Figure 25:
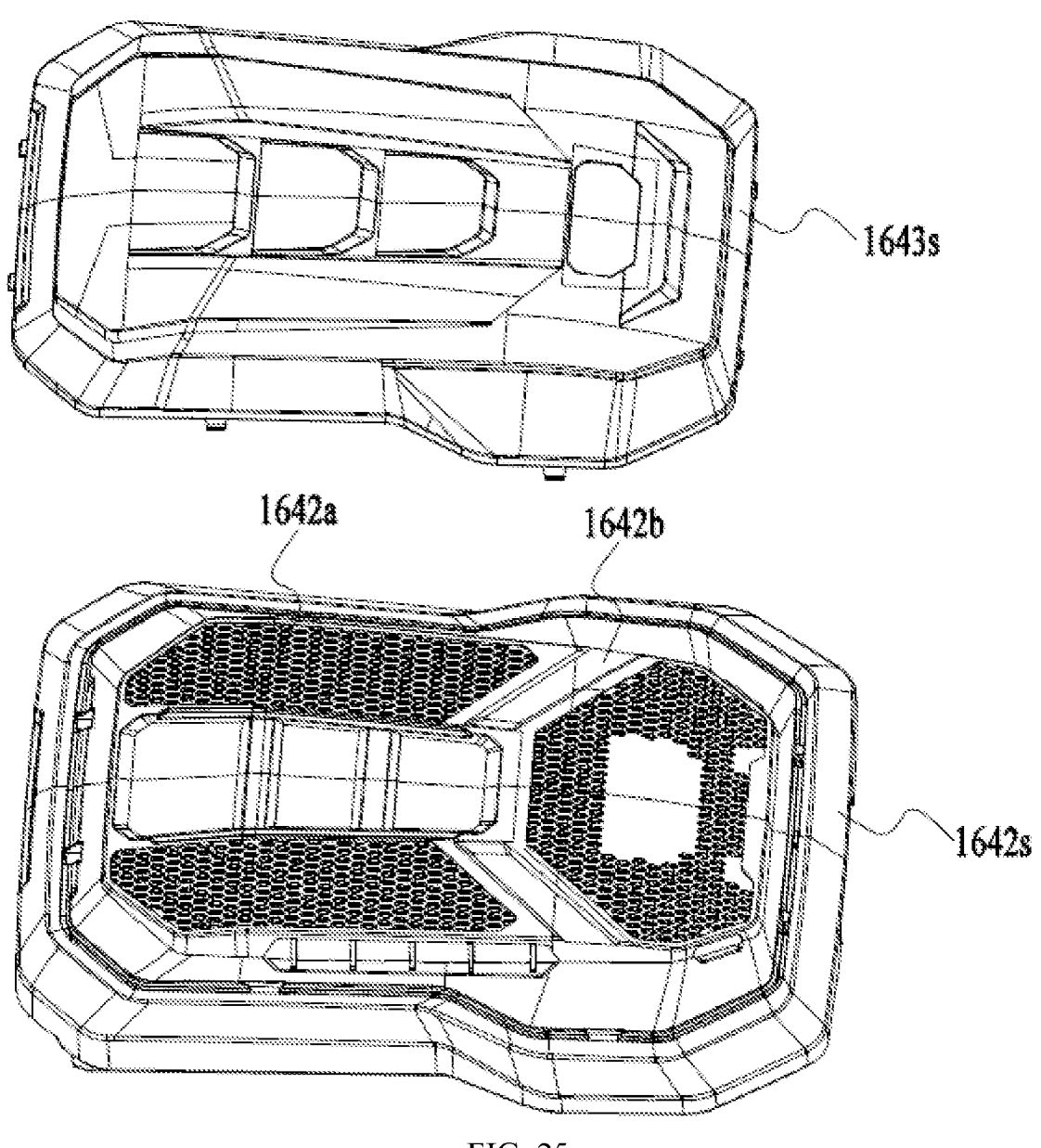
FIG. 25 is an exploded view of the compartment cover of the power supply apparatus of the riding mower of FIG. 19.

As shown in FIG. 25, the compartment cover 164s includes a first cover 1642s and a second cover 1643s. The first cover 1642s is disposed on the side of the first cover 1642s facing the main compartment 163s. The second cover 1643s is disposed on the side of the first cover 1642s facing away from the main compartment 163s. The first cover 1642s is provided with a grid structure 1642a. On one hand, the battery pack 161s disposed in the main compartment 163s generates certain heat when working. The grid structure 1642a can effectively dissipate the heat in the main compartment 163s. On the other hand, when the riding mower works in the sun, optical radiation causes the temperature in the main compartment 163s to rise. In this case, the grid structure 1642a can block most of the optical radiation, thereby mitigating the temperature rise in the main compartment 163s. As an optional example, the grid structure 1642a may be formed by through holes 1631 disposed on the first cover 1642s. In the front and rear direction, the first cover 1642s has a Y-shaped body 1642b. The body 1642b plays a certain supporting role and can effectively maintain the structural strength of the first cover 1642s. The grid is disposed outside the body 1642b and connects the body 1642b and the edge of the first cover 1642s. The shape of the second cover 1643s fits the shape of the first cover 1642s and at least partially covers the first cover 1642s. In fact, the second cover 1643s is a transparent member and may be made of transparent material. On one hand, the second cover 1643s helps the user observe the situation in the main compartment 163s through the grid structure 1642a. On the other hand, the combination of the second cover 1643s and the first cover 1642s enhances the structural strength of the entire compartment cover 164s. In an example, the arrangement of the first cover 1642s and the second cover 1642 enhances the structural strength of the compartment cover 164s so that the compartment cover 164s better protects the battery pack 161s. Moreover, such a double-layer design enables different functions of the compartment cover 164s to be distributed to different cover bodies so that the first cover 1642s and the second cover 1643s generate different functions. In some examples, the combination of the first cover 1642s and the second cover 1643s implements the combination of different functions between different cover bodies. Moreover, different functions between different cover bodies do not affect each other.

Figure 26:
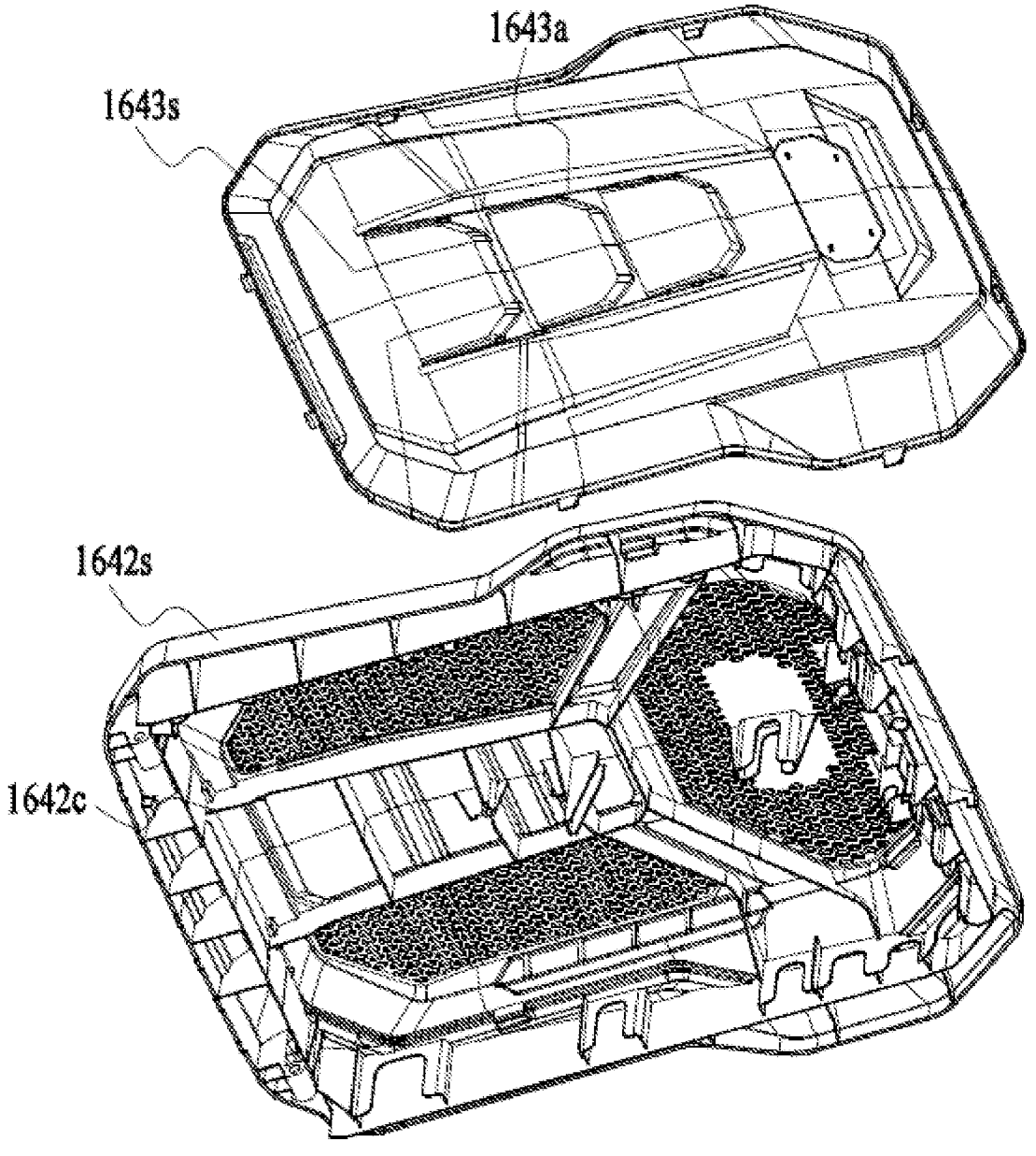
FIG. 26 is an exploded view taken from another angle to illustrate the compartment cover of the power supply apparatus of the riding mower of FIG. 25.

As shown in FIG. 26, a first reinforcing rib 1642c is formed on the side of the first cover 1642s facing the main compartment 163s. The first reinforcing rib 1642c is mainly distributed in the body 1642b of the first cover 1642s. In some examples, the first reinforcing rib 1642c is disposed above the main compartment 163s to effectively enhance the structural strength of the compartment cover 164s so that the battery pack 161s disposed in the main compartment 163s can be effectively protected by the compartment cover 164s and is not damaged due to being exposed to the outside. Moreover, the arrangement of the first reinforcing rib 1642c helps effectively reduce the overall weight of the compartment cover 164s so that the compartment cover 164s is lighter as the strength increases. In an example, a second reinforcing rib 1643a is disposed on the side of the second cover 1643s facing the main compartment 163s. The second reinforcing rib 1643a can enhance the strength of the second cover 1643s and make the second cover 1643s lighter. When the second cover 1643s and the first cover 1642s are combined, the second cover 1643s and the first cover 1642s have a higher strength and become lighter.

Figure 27:
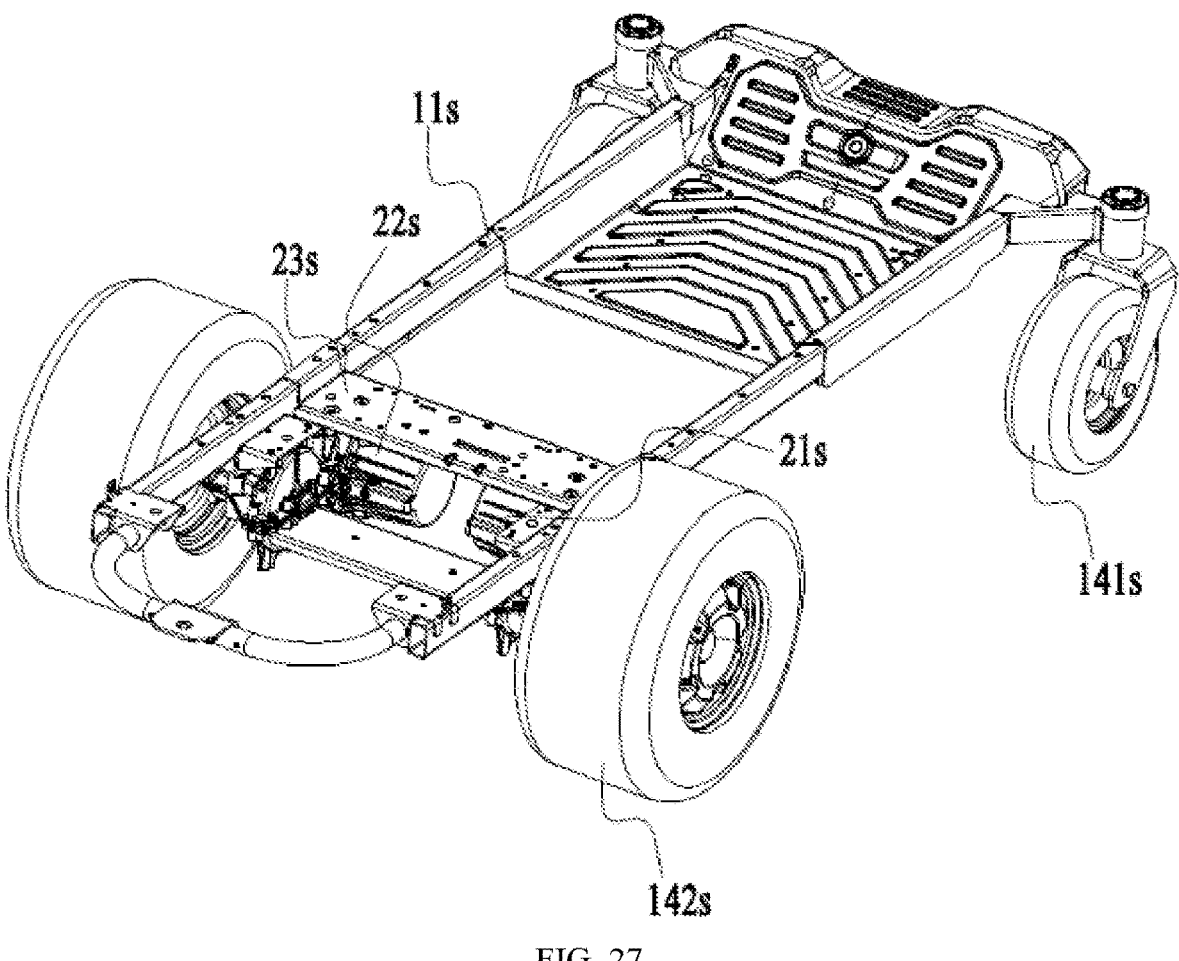
FIG. 27 is a perspective view illustrating the main frame of the riding mower of FIG. 12 is connected to a traveling assembly of the riding mower of FIG. 12.

As shown in FIG. 27, the traveling assembly 14s may include first traveling wheels 141s and second traveling wheels 142s. In the front and rear direction, the first traveling wheels 141s are disposed on the front side of the second traveling wheels 142s. The traveling assembly 14s further includes a first drive assembly 21s and a second drive assembly 22s that are configured to drive the second traveling wheels 142s to rotate. In this case, when the first drive assembly 21s and the second drive assembly 22s drive the corresponding second traveling wheels 142s to rotate at different rotational speeds, a speed difference is generated between the two second traveling wheels 142s, thereby causing the riding mower to turn. In some examples, in a symmetry plane extending in the direction of the first straight line 101s, the first drive assembly 21s and the second drive assembly 22s are disposed symmetrically about the symmetry plane.

Figure 28:
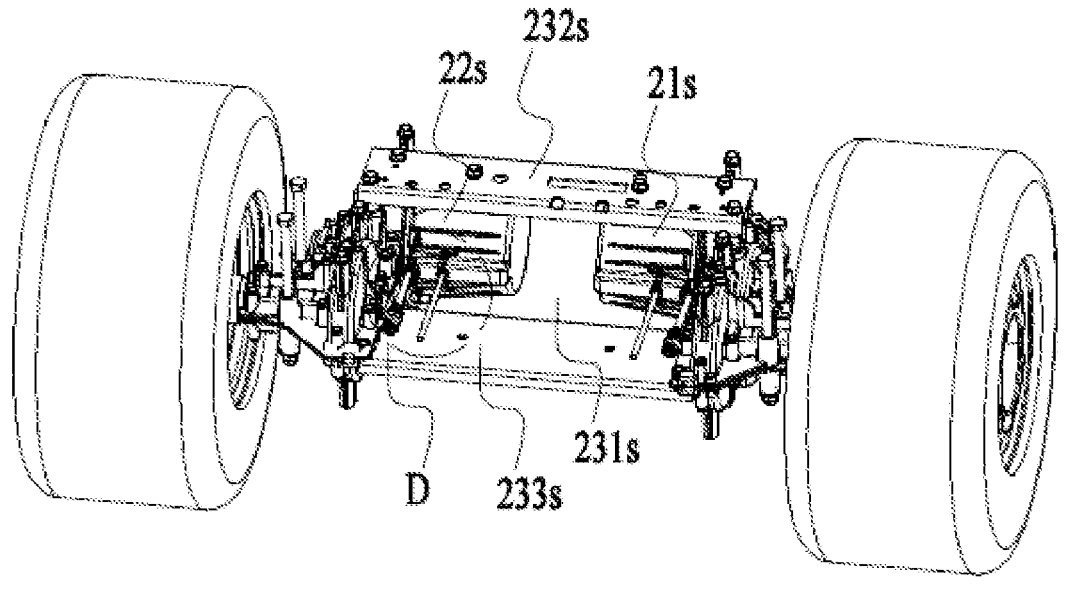
FIG. 28 is a perspective view of second traveling wheels of the riding mower of FIG. 27 and drive assemblies disposed on the second traveling wheels.
Figure 29:
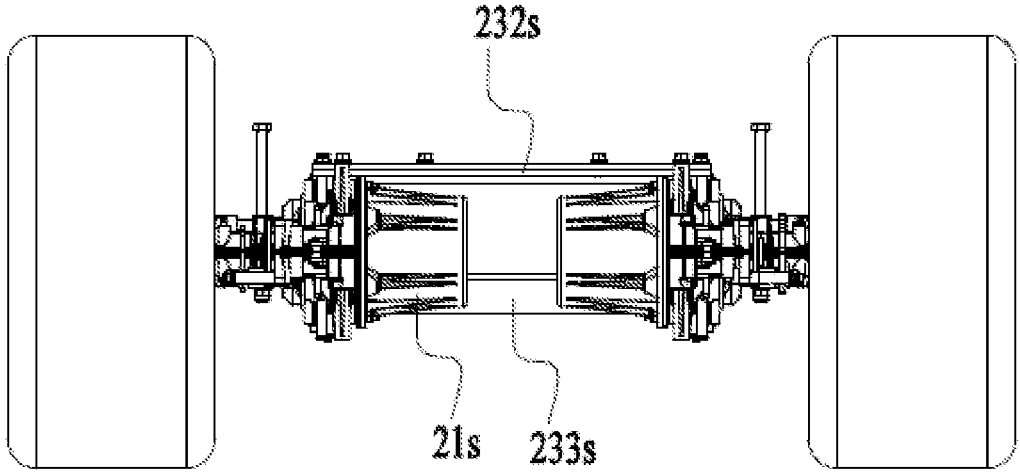
FIG. 29 is a rear view of the second traveling wheels of the riding mower of FIG. 28 and the drive assemblies disposed on the second traveling wheels.

As shown in FIGS. 27 to 29, the first drive assembly 21s and the second drive assembly 22s are disposed on the main frame 11s by a connector. Since the traveling assembly 14s connected to the main frame 11s carries all the weight from the main frame 11s, the second traveling wheels 142s disposed on the rear side carry most of the weight from the main frame 11s. Moreover, the second traveling wheels 142s are connected to the main frame 11s through the first drive assembly 21s and the second drive assembly 22s. Accordingly, the load from the main frame 11s is transmitted to the second traveling wheels 142s through the first drive assembly 21s and the second drive assembly 22s. The first drive assembly 21s and the second drive assembly 22s that are disposed on the main frame 11s serve as two independent assemblies and each bear the load from the main frame 11s to make the junction between the second drive assembly 22s and the main frame 11s. In an example, a connection plate assembly 23s connecting the first drive assembly 21s and the second drive assembly 22s is provided. Optionally, when the connection plate assembly 23s is connected to the first drive assembly 21s and the second drive assembly 22s, an accommodation space 231s that separates at least part of the upper space of the main frame 11s from at least part of the lower space of the main frame 11s and is located on the lower side of the main frame 11s is formed. The first drive assembly and the second drive assembly are disposed in the accommodation space 231s. In this case, the upper space of the main frame 11s is effectively separated from the lower space of the main frame 11s so as to prevent the first drive assembly 21s and the second drive assembly 22s from interfering with related components in the upper space of the main frame 11s.

In some examples, the connection assembly 23 includes a first connection plate 232s and a second connection plate 233s. The first connection plate 232s is disposed on the upper side of the first drive assembly 21s and the upper side of the second drive assembly 22s. The second connection plate 233s is disposed on the lower side of the first drive assembly 21s and the lower side of the second drive assembly 22s. In some examples, the first connection plate 232s and the second connection plate 233s are each connected to a gearbox 211s of the first drive assembly 21s and a gearbox 211s of the second drive assembly 22s. As an optional example, the first connection plate 232s and the second connection plate 233s are disposed in parallel in an up and down direction perpendicular to the first straight line 101s. Optionally, the first connection plate 232s and the second connection plate 233s may also be staggered in a straight-line direction perpendicular to the first straight line 101s. Accordingly, the separation of the upper space of the main frame 11s from the lower space of the main frame 11s is implemented in a relatively large range. The arrangement of the first connection plate 232s and the second connection plate 233s enables the first drive assembly 21s and the second drive assembly 22s to be connected to the main frame 11s to form a whole, thereby significantly enhancing the stiffness in the junction between the first drive assembly 21s and the main frame 11s and the stiffness in the junction between the second drive assembly 22s and the main frame 11s. Moreover, because the first drive assembly 21s and the second drive assembly 22s are connected to form a whole in this case, the stiffness of the first drive assembly 21s and the second drive assembly 22s is also enhanced. Accordingly, on the basis of not strengthening the original first drive assembly 21s and the second drive assembly 22s, the structural strength of the first drive assembly 21s and the second drive assembly 22s can be enhanced significantly so that the first drive assembly 21s and the second drive assembly 22s can bear heavier loads. Additionally, due to the arrangement of the first connection plate 232s and the second connection plate 233s, the accommodation space 231s that separates the upper space of the main frame 11s from the lower space of the main frame 11s is formed between the first connection plate 232s and the second connection plate 233s. The gearbox 211s of the first drive assembly 21s and the gearbox 211s of the second drive assembly 22s are at least partially enclosed in the space between the first connection plate 232s and the second connection plate 233s, preventing an external object from damaging a gearbox 211s and thus effectively extending the service life of the first drive assembly 21s and the service life of the second drive assembly 22s. Moreover, such an arrangement also increases the complexity of the working environment that the riding mower 100s is able to adapt to. In some examples, the arrangement of the first connection plate 232s and the second connection plate 233s also plays a good positioning role for the first drive assembly 21s and the second drive assembly 22s so that the first driving assembly 21 and the second driving assembly 22 have good coaxiality and can be effectively secured to a preset position.

Figure 30:
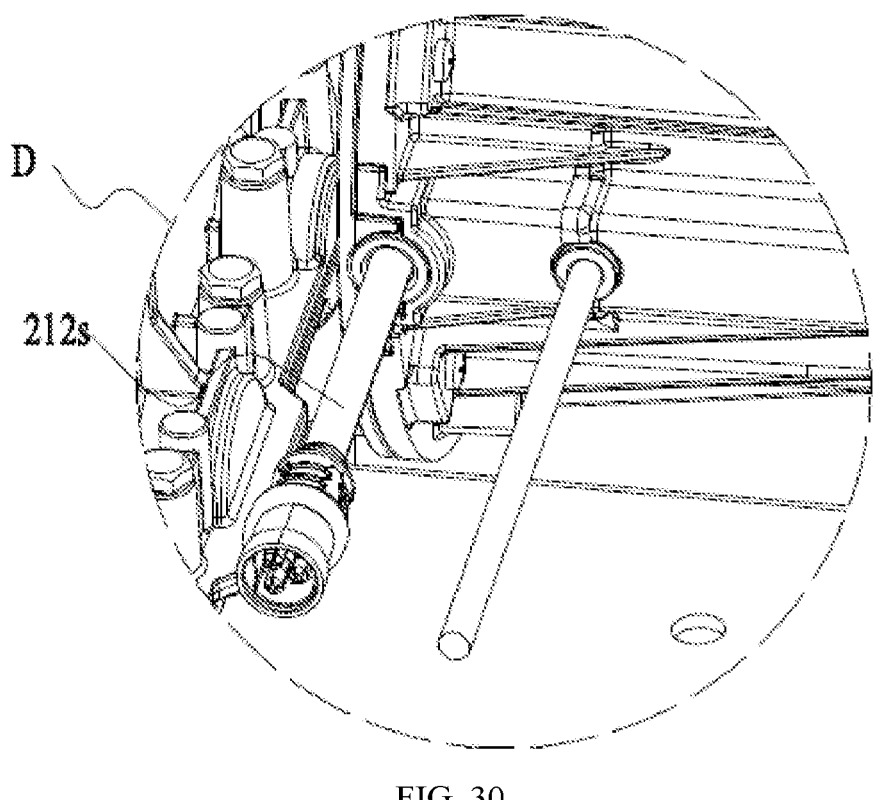
FIG. 30 is a partial enlarged view of position D of the riding mower of FIG. 28.
Figure 31:
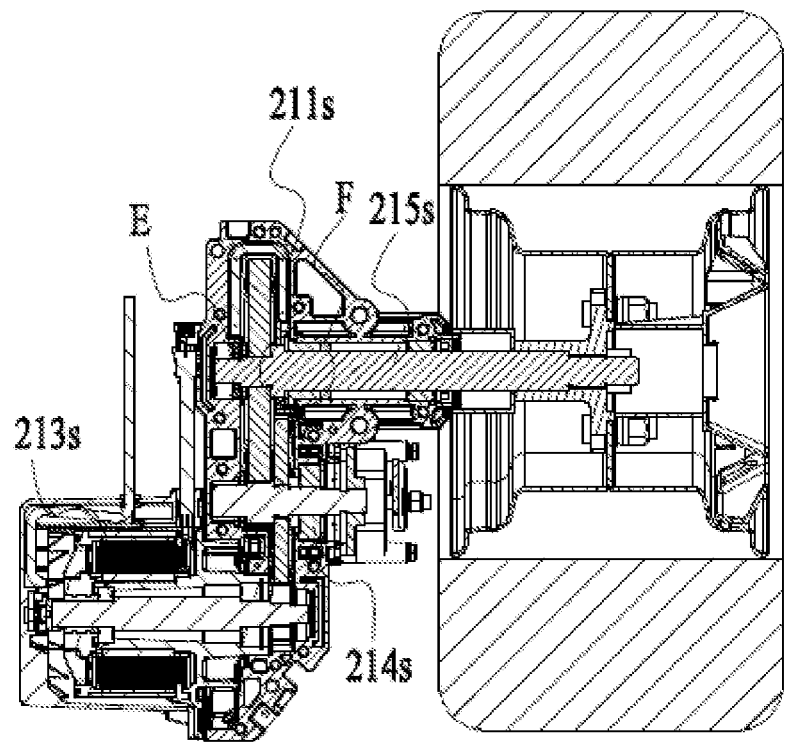
FIG. 31 is a section view of part of a second traveling wheel of the riding mower of FIG. 28 and part of the drive assemblies disposed on the second traveling wheel.
Figure 32:
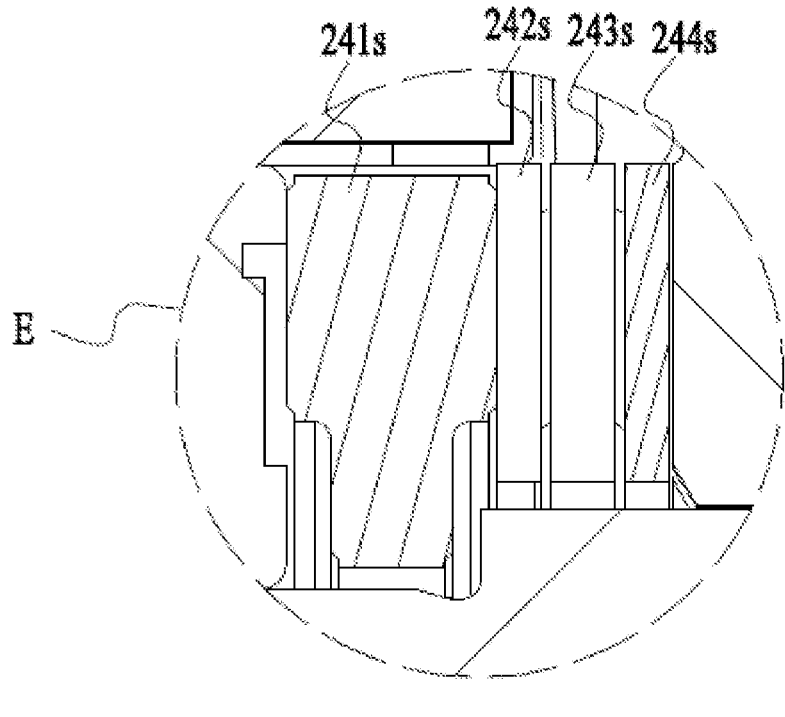
FIG. 32 is a partial enlarged view of position E of the riding mower of FIG. 31.
Figure 33:
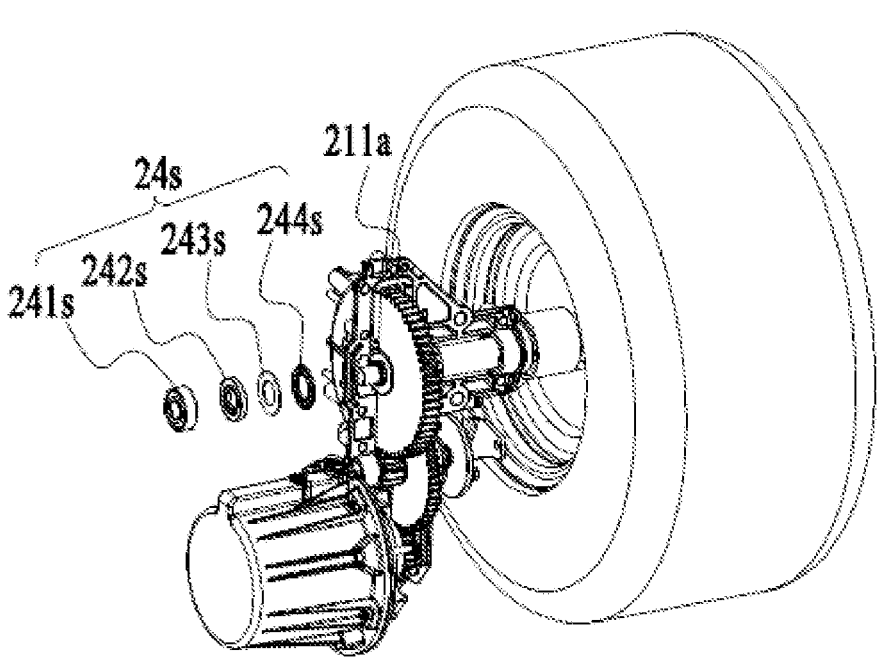
FIG. 33 is an exploded view of part of a second traveling wheel of the riding mower of FIG. 28 and part of the drive assemblies disposed on the second traveling wheel.

As shown in FIG. 30, with an aim of effectively controlling the first drive assembly 21s and the second drive assembly 22s, the first drive assembly 21s and the second drive assembly 22s are further provided with a control circuit connected to the outside through a connection line 212s. In this example, the connection line 212s is disposed on the rear side of the first drive assembly 21s and on the rear side of the second drive assembly 22s and is located in the accommodation space 231s between the first connection plate 232s and the second connection plate 233s. The arrangement in which the connection line 212s is disposed on the rear side of the first drive assembly 21s and on the rear side of the second drive assembly 22s and is located in the accommodation space 231s between the first connection plate 232s and the second connection plate 233s, on one hand, enables the connection line 212s to be away from the power output assembly, prevents the connection line 212s from interfering with the power output assembly, and prevents the broken grass from being wound onto the connections line 212 and interfering with the connection line 212s in the working state. On the other hand, the arrangement in which the connection line 212s is disposed between the first connection plate 232s and the second connection plate 233s protects the connection line 212s, prevents the connection line 212s from being exposed to the outside, and makes full use of the space on the rear side of the first drive assembly 21s and on the rear side of the second drive assembly 22s so that the arrangement of the entire mower is more reasonable. Finally, the arrangement in which the connection line 212s is disposed on the rear sides also facilitates detachment and maintenance with no need of detaching a front-end structure.

As shown in FIGS. 31 to 34, the first drive assembly 21s is taken as an example. The first drive assembly 21s includes a drive motor 213s, a gear mechanism 214s, and an output shaft 215s. The drive motor 213s outputs power to the gear mechanism 214s. The gear mechanism 214s transmits the power from the drive motor 213s to the output shaft 215s and drives the output shaft 215s to rotate. A second traveling wheel 142 is disposed on the output shaft 215s and rotates synchronously with the output shaft 215s. When the riding mower 100s is in the working process, the first drive assembly 21s and the second drive assembly 22s are used for driving the riding mower 100s to travel forward or backward. When a differential is formed through the first drive assembly 21s and the second drive assembly 22s to implement a turning or when the riding mower 100s encounters a slope, the second traveling wheel 142 connected to the output shaft 215s transmits a relatively large axial force to the output shaft 215s. The axial force presses the output shaft 215s to move axially or causes the second traveling wheel 142 to generate the force of being disengaged from the output shaft 215s.

Figure 34:
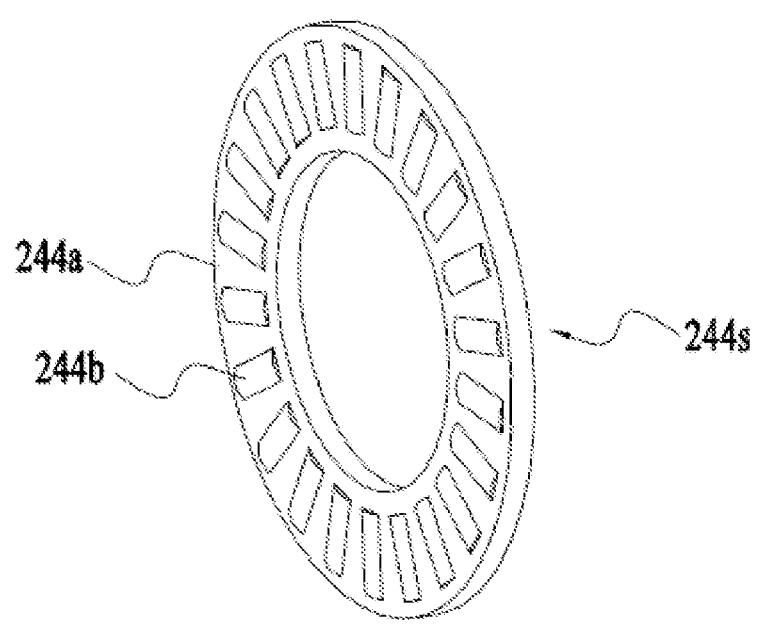
FIG. 34 is a perspective view of a retainer of the riding mower of FIG. 33.

In order to prevent the axial force from pressing the output shaft 215s and causing severe wear in the junction between the output shaft 215s and the gearbox 211s under the action of the axial force, a first connection assembly 24s is further disposed in the junction between the output shaft 215s and the gearbox 211s. The first connection assembly 24s may include a first bearing 241s, a first gasket 242s, a second gasket 243s, and a retainer 244s. The first bearing 241s, the first gasket 242s, the second gasket 243s, and the retainer 244s are arranged sequentially in the direction of the output shaft 215s and are sleeved on the output shaft 215s. The first bearing 214 is configured to support the end of the output shaft 215s facing away from the second traveling wheel 142. In fact, the gearbox 211s further includes a second bearing configured to support the output shaft 215s and disposed on the end facing the second traveling wheel 142. The first gasket 242s is disposed between the first bearing 241s and the second gasket 243s and is configured to secure the first bearing 241s and enable the first bearing 241s to have a preset distance relative to a transmission gear 211a on the output shaft 215s. The retainer 244s is disposed between the second gasket 243s and the transmission gear 211a and configured to provide a reaction force opposite to the direction of the axial force so as to offset the wear of the transmission gear 211a, the first gasket 242s, and the second gasket 243s when the axial force acts on the transmission gear 211a and the first bearing 241s, that is, the first gasket 242s and the second gasket 243s. The retainer 244s may be arranged as a thrust bearing and another component that can provide axial sliding friction. As an optional example, the retainer 244s is a circular piece with thrust rollers 244b. As shown in FIG. 34, the retainer 244s is a ring 244a structure disposed around a central axis. The cylindrical rollers 244b are disposed on two sides of the ring 244a and around the central axis. In fact, the rollers 244b are embedded in the retainer 244s and at least partially exposed outside the surface of the ring 244a. It is to be understood that surfaces of the rollers 244b are smooth and continuous so that the rollers 244b are freely rotatable in the retainer 244s, converting the static friction between the retainer 244s and the second gasket 243s or the static friction between the retainer 244s and the transmission gear 211a into sliding friction. Additionally, because the rollers 244b protrude from the plane where the ring 244a of the retainer 244s is located, the rollers 244b convert the static friction caused by the axial force of the output shaft 215s acting on the second gasket 243s or the transmission gear 211a into sliding friction, thereby effectively preventing the worn second gasket 243s and the worn retainer 244s from entering a gap between the transmission gear 211a, jamming the transmission gear 211a, and disabling the traveling function of the riding mower 100s. Alternatively, it prevents the transmission gear 211a from being worn so as to affect the service life of the riding mower 100s. In some examples, the arrangement of the retainer 244s effectively resolves the effect of the axial force along the output shaft 215s generated when the riding mower 100s turns or encounters an oblique road condition, thereby effectively extending the service life of the gearbox 211s.

Figure 35:
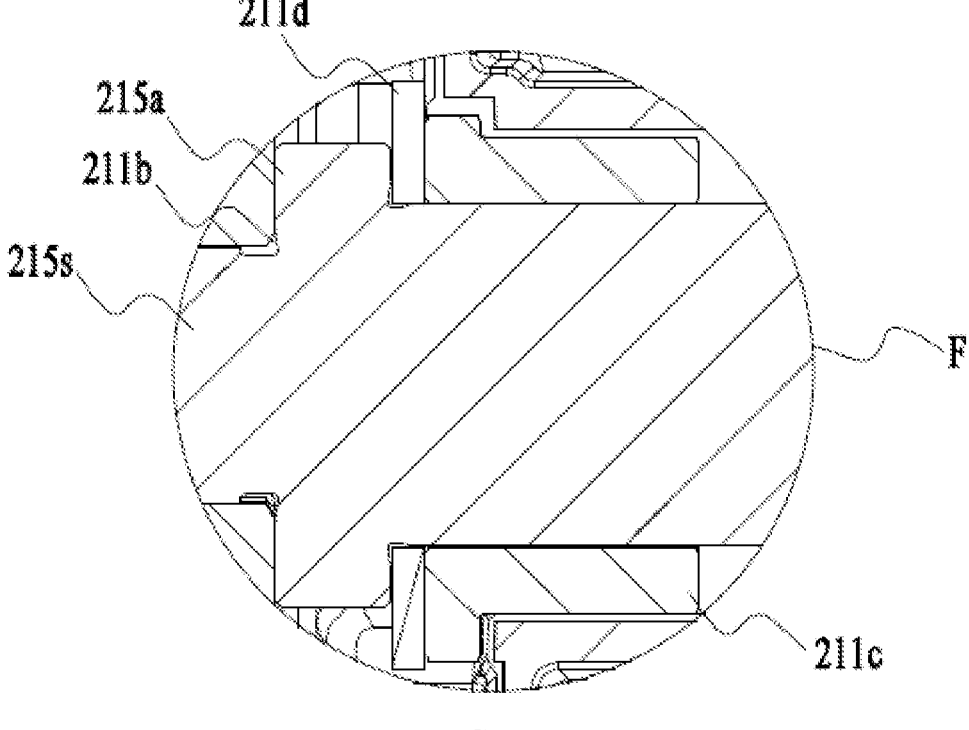
FIG. 35 is a partial enlarged view of position F of the riding mower of FIG. 33.
Figure 36:
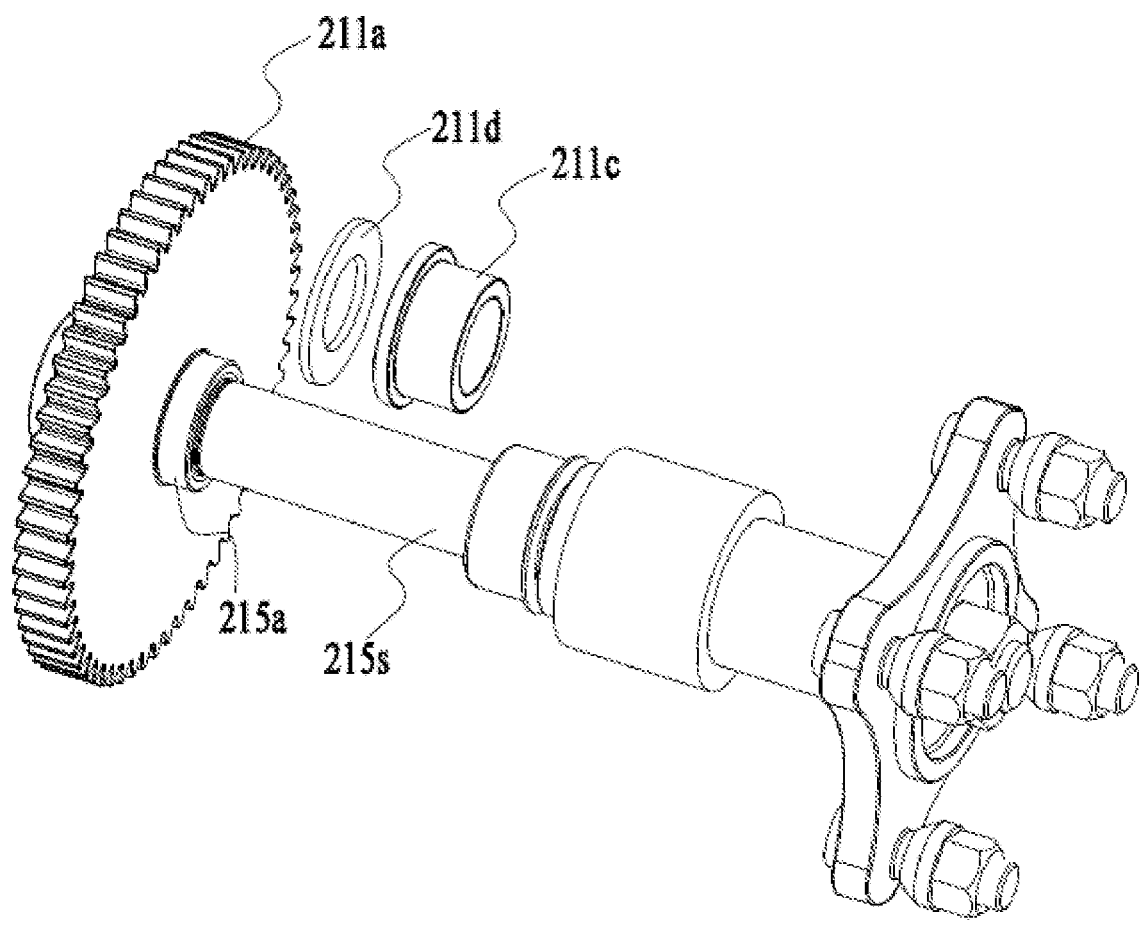
FIG. 36 is an exploded view of an output shaft of the riding mower of FIG. 33.
Figure 37:
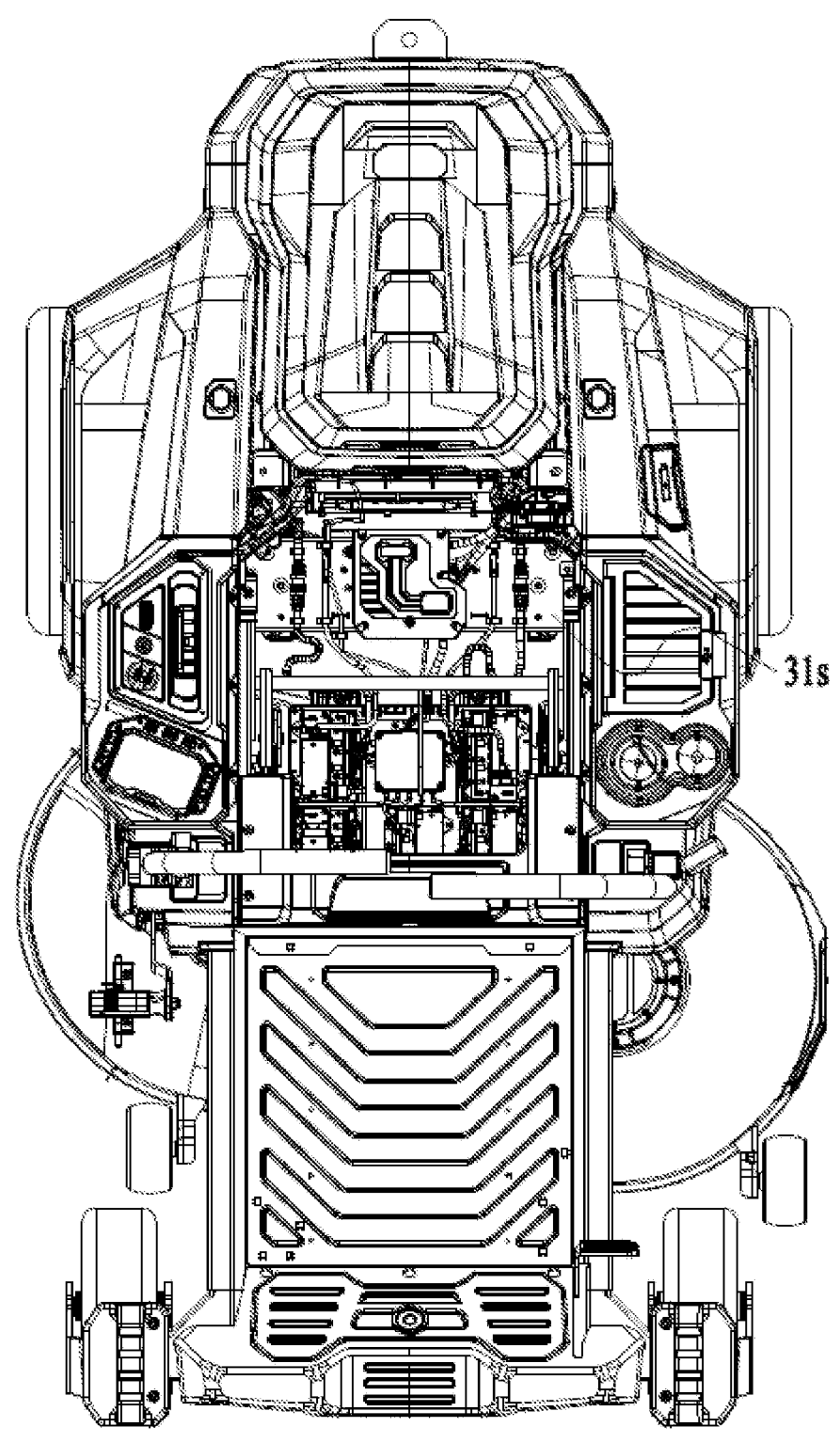
FIG. 37 is a top view of the riding mower of FIG. 12 with a seat and part of a cover excluded.
Figure 38:
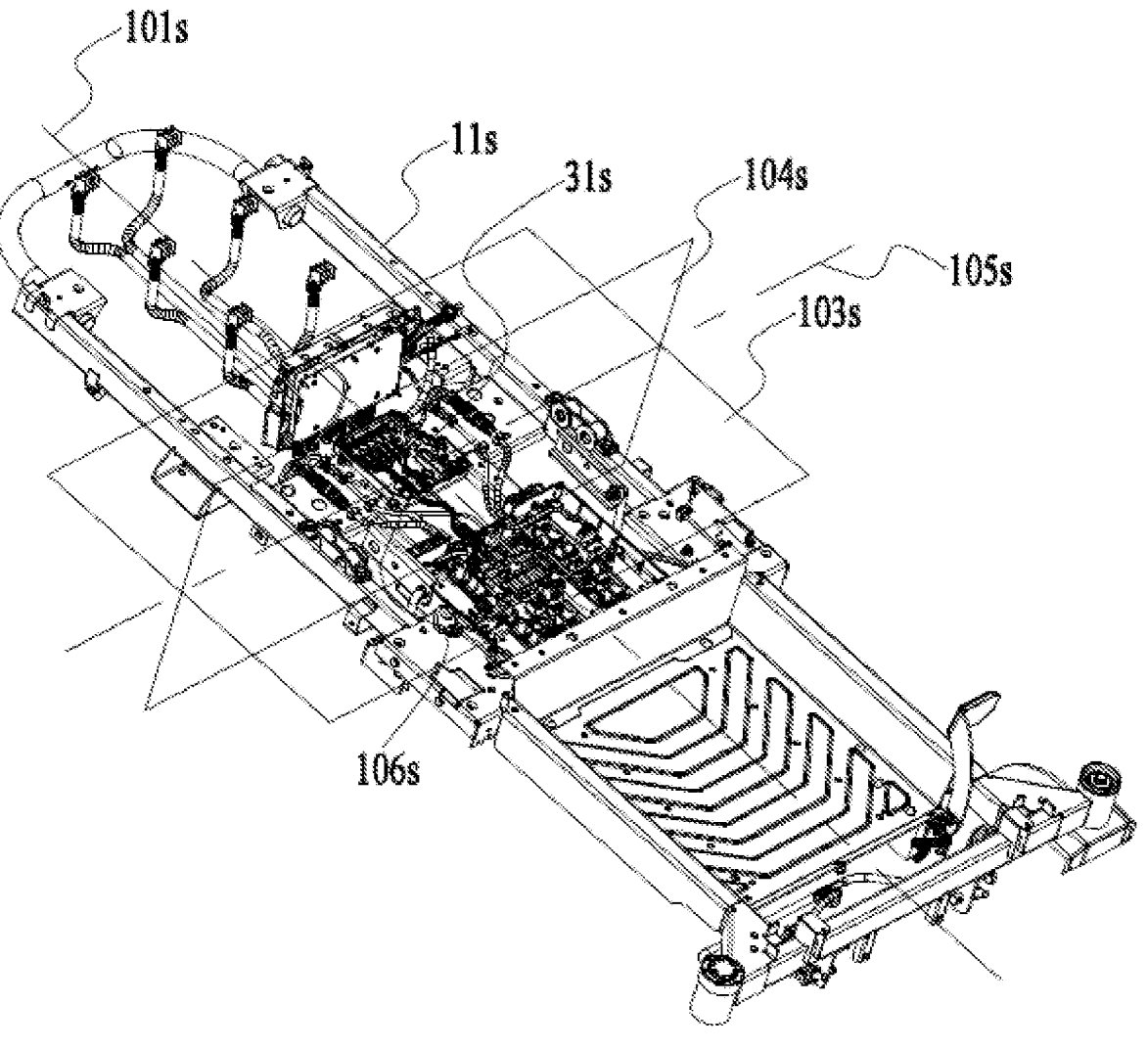
FIG. 38 is a perspective view illustrating a control module is mounted on the main frame of the riding mower of FIG. 37.
Figure 39:
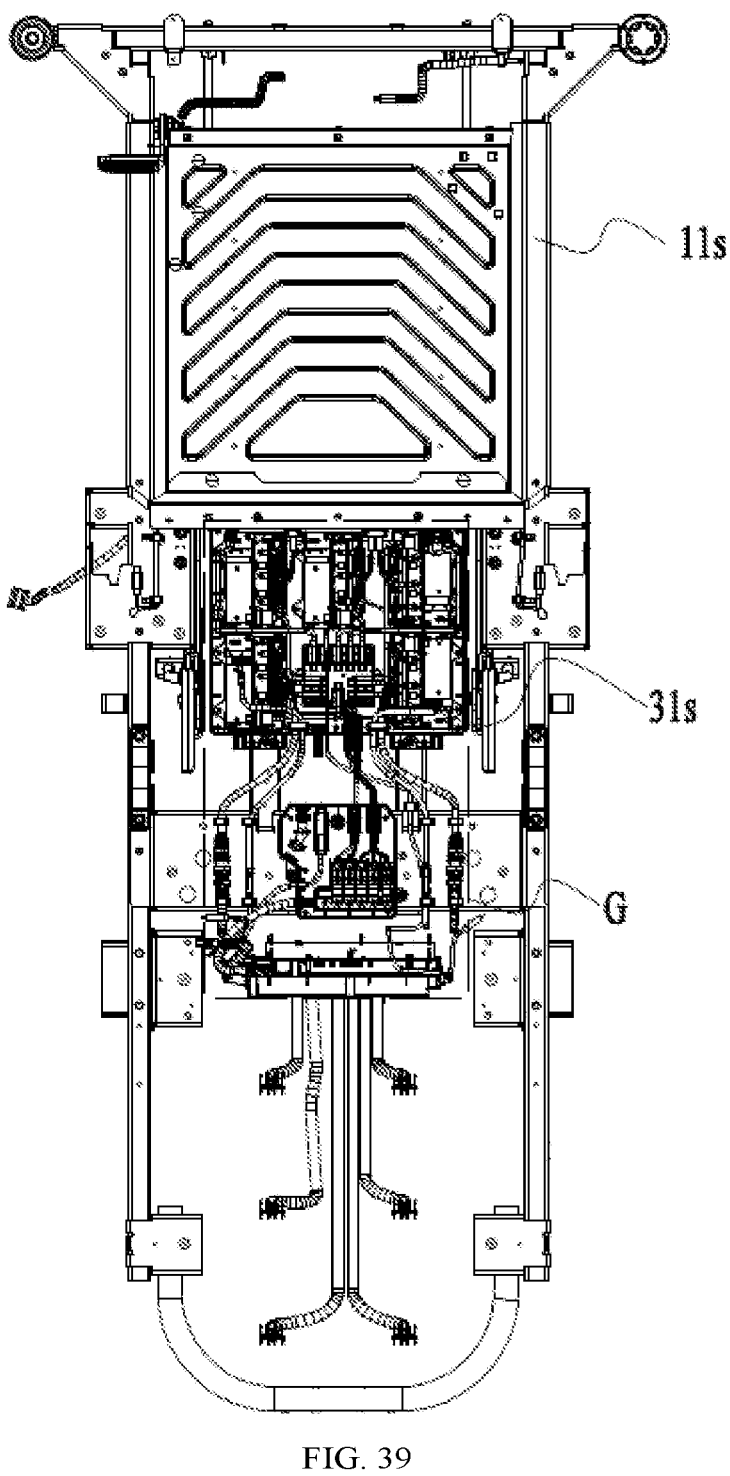
FIG. 39 is a top view illustrating the control module is mounted on the main frame of the riding mower of FIG. 33.
Figure 40:
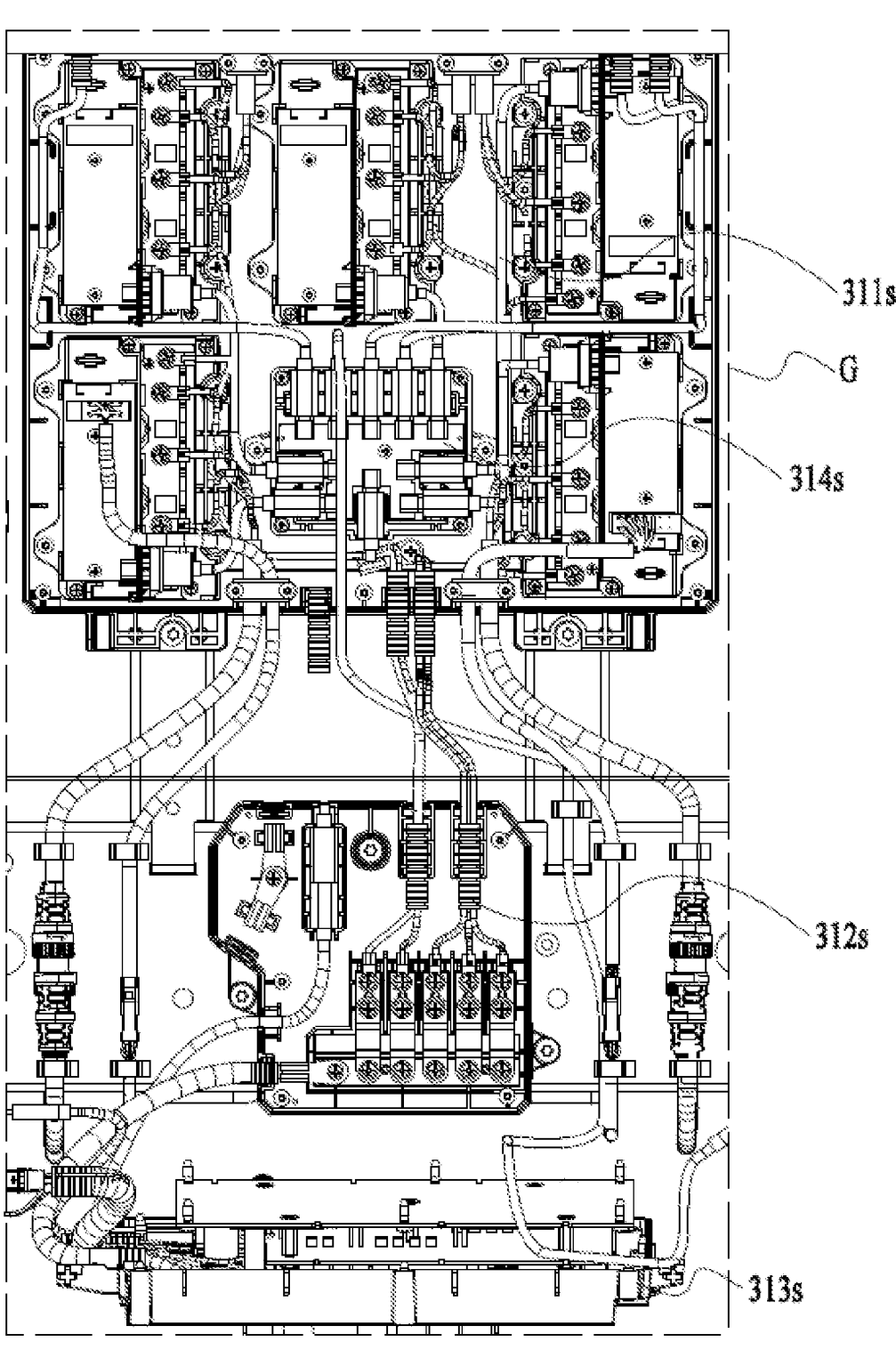
FIG. 40 is a partial enlarged view of position G of the riding mower of FIG. 39.

As shown in FIGS. 35 and 36, the output shaft 215s is further formed with a protrusion portion 215a. The protrusion portion 215a is disposed around the circumference of the output shaft 215s. The diameter of the circumference where the protrusion portion 215a of the output shaft 215s is located is greater than the diameter of another portion of the output shaft 215s. In an example, the gearbox 211s is formed with an accommodation recess 211b configured to accommodate the protrusion portion 215a. The protrusion portion 215a basically fits the accommodation recess 211b and is limited within the range where the accommodation recess 211b is located. One end of the output shaft 215s is connected to the gearbox 211s, and the other end is connected to the second traveling wheel 142. When the output shaft 215s encounters a slope, due to the action of the second traveling wheel 142, the relatively large axial force is applied to the output shaft 215s and causes a tendency for the output shaft 215s to be away from the gearbox 211s. When the axial force is excessively large, driven by the second traveling wheel 142, the output shaft 215s may be disengaged from the gearbox 211s, thereby causing the entire second traveling wheel 142 to be disengaged from the main frame 11s and thus causing a great potential safety hazard. In this case, the existence of the protrusion portion 215a offsets most of the axial force from the second traveling wheel 142, thereby effectively preventing the output shaft 215s from being disengaged from the gearbox 211s. To avoid relatively large friction between the protrusion portion 215a and the gearbox 211s, a sleeve 211c is disposed on the side of the protrusion portion 215a facing away from the transmission gear 211a. The sleeve 211c effectively restricts the axial displacement of the output shaft 215s. In some examples, a third gasket 211d is disposed between the protrusion portion 215a of the output shaft 215s and the sleeve 211c. The third gasket 211d effectively prevents the protrusion portion 215a and the sleeve 211c from being worn under the action of the axial force.

As shown in FIG. 12, the first traveling wheels 141s, the operating assembly, the power output assembly, the seat, the second traveling wheels 142s, the power supply apparatus, and a grass catcher 25s are sequentially disposed on the riding mower 100s from the front side to the rear side. It is to be understood that the first traveling wheels 141s and the second traveling wheels 142s are mainly configured to support the main frame 11s and other components disposed on the main frame 11s and enable the riding mower 100s to travel. Each first traveling wheel 141 is disposed on the front end of the main frame 11s. Each second traveling wheel 142 is disposed on the rear end of the main frame 11s. The operating assembly, the power output assembly, and the seat are disposed between the first traveling wheels 141s and second traveling wheels 142s.

Such an arrangement helps maintain the balance of the entire mower effectively, makes the coordination of various components more balanced, and facilitates the user in operating the riding mower 100s. Two first operating elements 151 are included in the operating assembly and are basically symmetrically disposed on two sides of the main frame 11s. In some examples, the first operating elements 151 are disposed at intermediate positions distributed in the front and rear direction and may be disposed on two sides of the seat. The second operating element in the operating assembly is disposed on the front side of the main frame 11s and may be located on the left side of the main frame 11s so that the user can control the riding mower 100s with just one foot. In an example, the arrangement in which the second operating element is disposed on the front side of the main frame 11s and located on the left side of the main frame 11s reserves a relatively large space on the front side of the main frame 11s, thereby enabling the user to move his leg freely.

As an optional example, the power supply apparatus and the grass catcher 25s are disposed on the rear side of the main frame 11s. In some examples, the power supply apparatus is disposed at a rear-side position adjacent to the second traveling wheels 142s, and the grass catcher 25s is disposed on the upper side of the power supply apparatus. In this example, since the power supply apparatus is provided with multiple battery packs, the power supply apparatus occupies a certain volume and has a certain mass. Because being provided with components including a cutting head and the drive motor 213s, the power output assembly disposed between the first traveling wheels 141s and the second traveling wheels 142s has a certain volume and mass and is disposed on the lower side of the main frame 11s. The power supply apparatus is disposed on the rear side adjacent to the second traveling wheels; accordingly, in a plane intersecting an extension plane of the main frame 11s, the power supply apparatus and the power output assembly are disposed symmetrically about the plane. Such an arrangement effectively adjusts the counterweight of the riding mower 100s, makes the ratio of the weight in the front and rear direction of the entire mower to the weight in the up and down direction of the entire mower more balanced, further stabilizes the riding mower 100s, and effectively improves the stability and security in the operating process.

Additionally, the grass catcher 25s is disposed on the upper side of the power supply apparatus and at least partially extends to the rear side of the power supply apparatus so that the upper space of the power supply apparatus and the rear space of the power supply apparatus are utilized effectively. Under the premise of not interfering with other components of the riding mower 100s, the space of the entire mower is utilized to the utmost extent. In an example, the grass catcher 25s is connected to the main frame 11s through a group of connection rods. Such an arrangement enables the grass catcher 25s to make full use of the stereoscopic space on the upper side of the power supply apparatus and on the rear side of the power supply apparatus, not to contact the power supply apparatus, and not to squeeze the battery compartment 162s of the power supply apparatus. Moreover, the power supply apparatus and the grass catcher 25s are disposed in different stereoscopic space ranges, facilitating the user in adjusting or maintaining the power supply apparatus or the grass catcher 25s separately. In some optional examples, the riding mower 100s includes a grass catching mode and a grass discharging mode. When the riding mower 100s is in the grass catching mode, the grass catcher 25s is mounted on the upper side of the power supply apparatus. When the riding mower 100s is in the grass discharging mode, the grass catcher 25s is detached. In an example, when the riding mower 100s is in the grass discharging mode, a sunshade may be disposed between the seat and the power supply apparatus. Through the connection rods, the sunshade is connected between the seat and the power supply apparatus. Accordingly, when the user operates the riding mower 100s, the sunshade plays a relatively sound shielding role; moreover, the gap space between the seat and the power supply apparatus is better utilized.

As shown in FIGS. 37 to 40, the riding mower 100s further includes a control module 31s. The control module 31s is disposed on the lower side of the seat and serves as a control center to control the operation of the entire riding mower 100s and the operation of components electrically connected to the control module 31s. The main frame 11s extends in a first plane 103s. The first straight line 101s is located in the first plane 103s. The main frame 11s is basically symmetrical about the first straight line 101s. In the direction of a second straight line 105s extending in the left and right direction and parallel to the first axis 102s, the main frame 11s is further basically symmetrical about the second straight line 105s. The second straight line 105s is also located in the first plane 103s. On a second plane 104s extending through the second straight line 105s and perpendicular to the first plane 103s, the seat is disposed on the main frame 11s and at least partially extends through the second plane 104s. The first straight line 101s and the second straight line 105*s* have an intersection 106*s*. The control module 31*s* is basically located in the range of the intersection 106*s* between the first straight line 101*s* and the second straight line 105*s*. That is, the control module 31*s* is basically disposed in the middle of the main frame 11*s* so that the wiring distance of a connection line connecting various components to the control module 31*s* is reduced. In some examples, the control module 31*s* includes a drive control board 311*s*, a fuse 312*s*, and a power supply management module 313*s*. The drive control board 311*s* is configured to control components including the power output assembly and the traveling assembly 14*s*. The power output assembly is disposed between the first traveling wheels 141*s* and the second traveling wheels 142*s* and adjacent to the intersection 106*s* between the first straight line 101*s* and the second straight line 105*s*. The arrangement in which the drive control board 311*s* configured to control the power output assembly is disposed above the power output assembly helps effectively reduce the length of a connection line connecting the drive control board 311*s* and the power output assembly. On one hand, such an arrangement effectively simplifies wiring arrangement, fully utilizes the space, and reduces wiring complexity; on the other hand, such an arrangement facilitates maintenance. It is to be understood that a fault can be positioned rapidly on a relatively short connection line, thereby greatly shortening maintenance time and increasing the continuity of the user's operation of the riding mower 100*s*.

The fuse 312*s* is connected between the drive control board 311*s* and the power supply management module 313*s*. The fuse 312*s* is configured to protect a drive circuit and prevent a current overload from burning out, for example, a circuit or a motor. In some examples, the fuse 312*s* is at least partially located on the lower side of the seat and between the drive control board 311*s* and the power supply management module 313*s*, thereby facilitating the user in maintenance or repair. In some examples, the power supply management module 313*s* is disposed on the rear side of the main frame 11*s*, and the drive control board 311*s* is disposed on the lower side of the seat and is at least partially located at the intersection 106*s* between the first straight line 101*s* and the second straight line 105*s*. Accordingly, the arrangement in which the fuse 312*s* is disposed between a power supply control module 31*s* and the drive control board 311*s* effectively reduces the length of a connection line between the fuse 312*s* and the power supply control module 31*s* and the length of a connection line between the fuse 312*s* and the drive control board 311*s*, facilitating the user in maintenance or repair.

The power supply management module 313*s* is disposed on the rear side of the seat and is located between the seat and the power supply apparatus. The arrangement in which the power supply management module 313*s* has the closest position to the power supply apparatus enables the space between the seat and the power supply apparatus to be fully utilized and effectively reduces the length of a connection line between the power supply apparatus and the power supply management module 313*s*, thereby simplifying the wiring arrangement of the entire control module 31*s* and effectively reducing the complexity of assembly and maintenance.

The control module 31*s* further includes a junction box 314*s* configured to connect a connection line from each component and connected to the drive control board 311*s* through the junction box 314*s*. In some examples, the junction box 314*s* is disposed on the upper side of the drive control board 311*s*, facilitating the electrical connection between the drive control board 311*s* and the power supply management module 313*s* and fully utilizing the space on the upper side of the drive control board 311*s*. Through such a stereoscopic interactive design, under the premise of no interference between the junction box 314*s* and the drive control board 311*s*, the space on the lower side of the seat can be effectively utilized, simplifying the assembly process, optimizing the design of wiring arrangement, and thereby greatly facilitating the user in use and maintenance.

Figure 41:
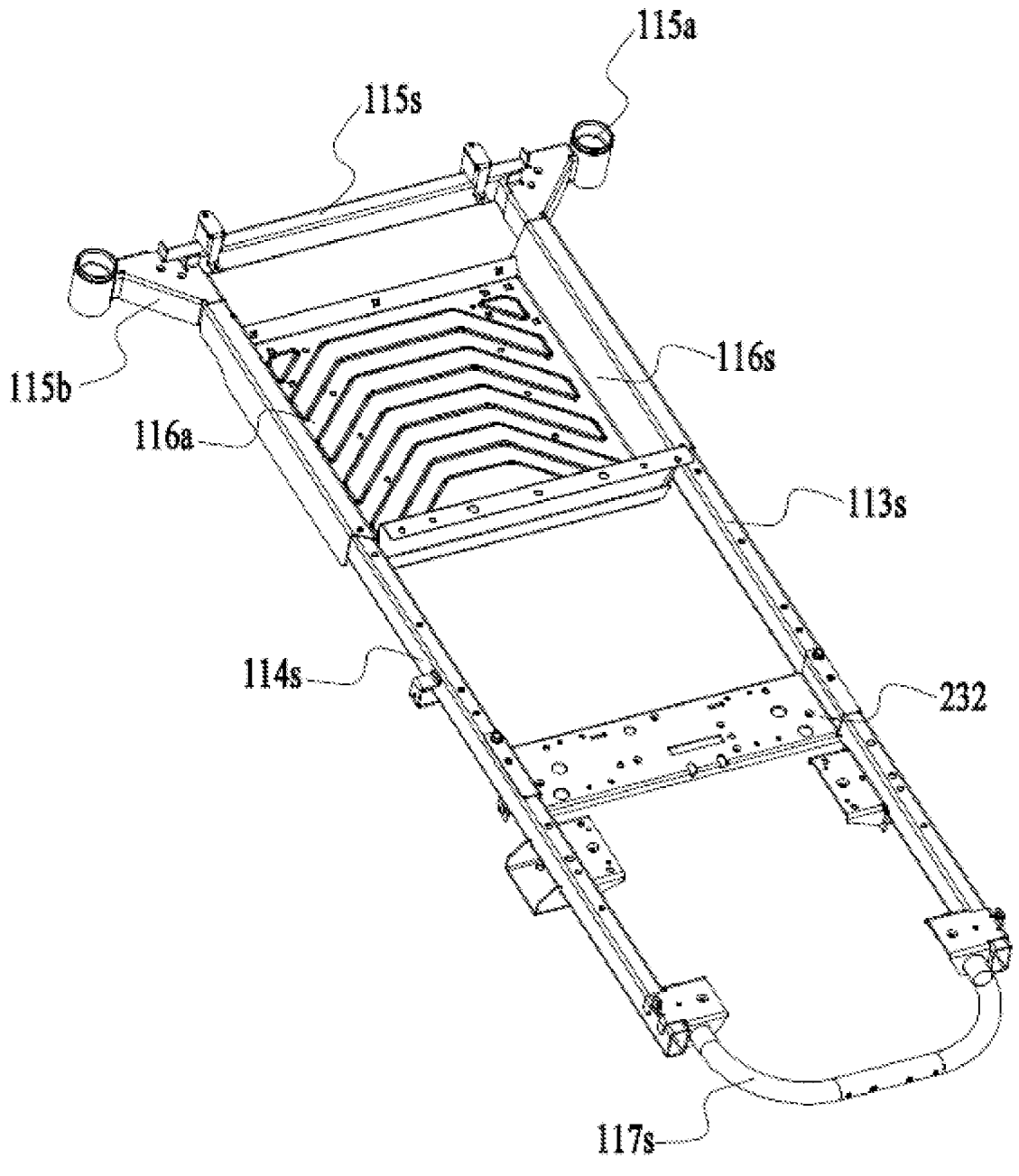
FIG. 41 is a perspective view of the main frame of the riding mower of FIG. 37.

As shown in FIG. 41, the main frame 11*s* extends in the front and rear direction. In a projection plane perpendicular to the up and down direction, the projection of the main frame 11*s* in the up and down direction in the projection plane is basically rectangular. In some examples, the main frame 11*s* extends basically in a plane and is an integrated structure. The arrangement in which the main frame 11*s* extends in a plane effectively lowers the center of gravity of the main frame 11*s* and enables the center of gravity of the entire mower to be at a relatively low position when the main frame 11*s* is provided with various components. Additionally, the arrangement in which the main frame 11*s* is an integrated structure enhances the structural strength of the main frame 11*s* and reduces assembly steps. The main frame 11*s* also adopts a modular design and thus can meet the needs of different platforms.

In some examples, the main frame 11*s* includes a first rod 113*s*, a second rod 114*s*, and a third rod 115*s*. The first rod 113*s* and the second rod 114*s* are parallel to each other and are parallel to the direction of the first straight line 101*s*. The third rod 115*s* connects the first rod 113*s* and the second rod 114*s* and is located on the front side of the main frame 11*s*. The first rod 113*s*, the second rod 114*s*, and the third rod 115*s* are securely connected or integrally formed. As an optional example, the third rod 115*s* is provided with a connection hole 115*a* configured to connect the first traveling wheels 141*s*. The connection hole 115*a* and the third rod 115*s* are securely connected or integrally formed. The junction between the third rod 115*s* and the first rod 113*s* and the junction between the third rod 115*s* and the second rod 114*s* are each provided with a reinforcing portion 115*b*. The reinforcing portion 115*b* may be a connection block in the shape of a right triangle and can increase the connection area between the third rod 115*s* and the first rod 113*s* and the connection area between the third rod 115*s* and the second rod 114*s*, thereby enhancing the structural strength of the main frame 11*s*. It is to be understood that the first rod 113*s*, the second rod 114*s*, and the third rod 115*s* may be securely connected or integrally formed. A third connection plate 116*s* is disposed between the first rod 113*s* and the second rod 114*s*. The third connection plate 116*s* is disposed on the front side of the main frame 11*s* and is parallel to or intersects the second connection plate 233*s*. The third connection plate 116*s* can match the first connection plate 232*s* and the second connection plate 233*s*, making the main frame 11*s* more stable, enhancing the structural strength of the main frame 11*s*, and enabling the main frame 11*s* to form a stable whole. The third connection plate 116*s* extends in a plane and is formed with a pedal portion 116*a* configured for being pressed down. An anti-collision rod 117*s* is disposed on the rear side of the first rod 113*s* and on the rear side of the second rod 114*s*. The cross section of the anti-collision rod 117*s* is circular. When the power supply apparatus is mounted on the main frame 11*s*, the anti-collision rod 117*s* is configured to surround the space where the power supply apparatus is located and is at least partially located outside the space where the power supply apparatus is located. In this case, when an external object impacts the riding mower 100$s$, especially the power supply apparatus, the anti-collision rod 117$s$ effectively avoids the direct impact of the external object and bears most of the kinetic energy, preventing the power supply apparatus, when being impacted, from being damaged and causing a certain potential safety hazard.

The main frame 11$s$ is an enclosed frame structure surrounded by pipes with a rectangular section. The arrangement of the rectangular pipes enables each component connected to the pipes to have a relatively large connection surface with the main frame 11$s$, thereby making the connection between each component and the main frame more stable. Moreover, such an arrangement facilitates the welding of the main frame 11$s$ so that the main frame 11$s$ has a large welding surface, thereby ensuring the overall stiffness of the main frame 11$s$.

Figure 42:
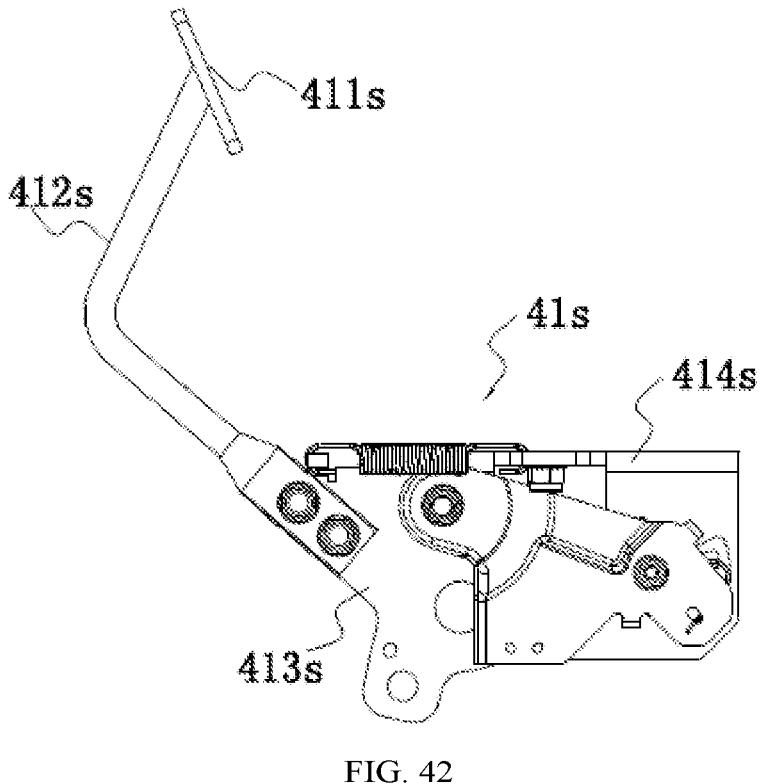
FIG. 42 is a front view of a parking system of the riding mower of FIG. 12.
Figure 43:
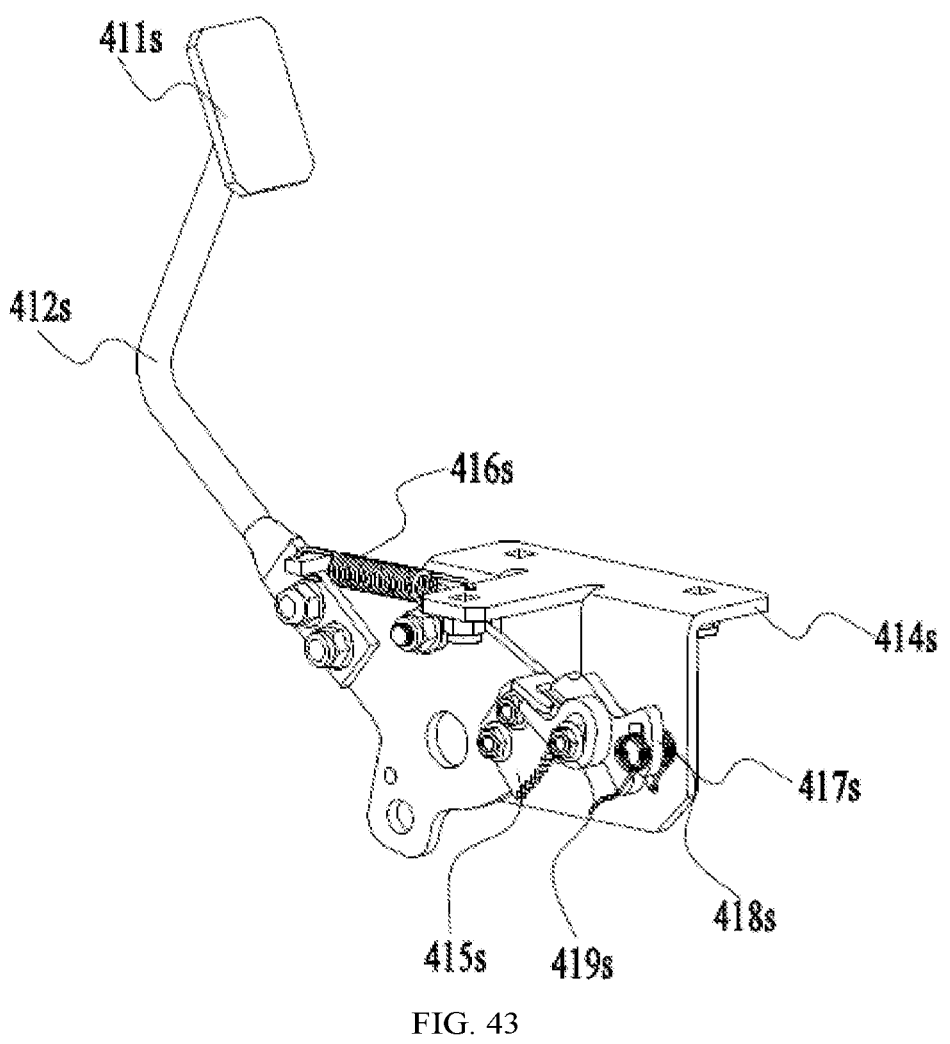
FIG. 43 is a front view of a parking system of the riding mower of FIG. 42.
Figure 44:
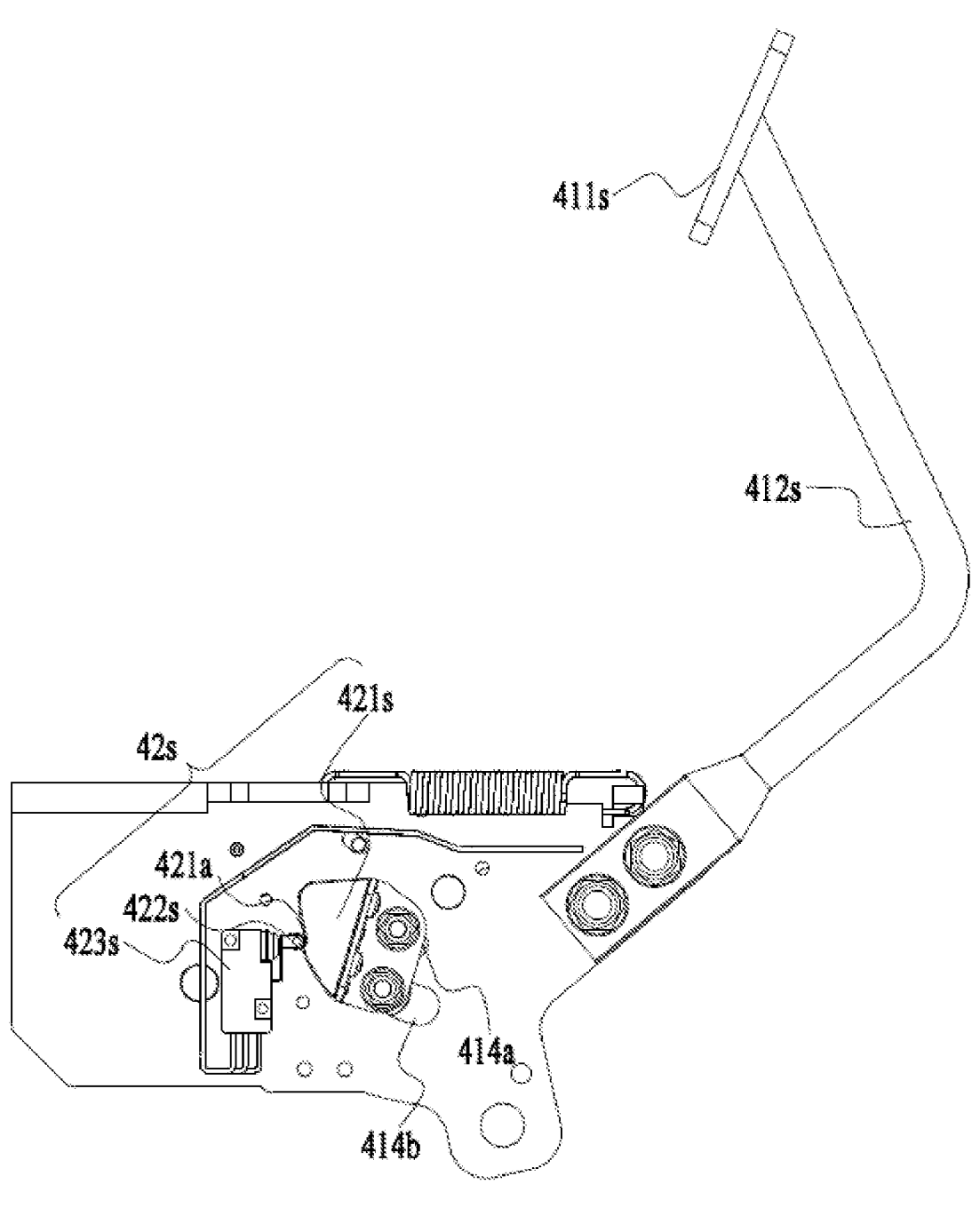
FIG. 44 is a front view of a rotation stop system of the riding mower of FIG. 12.

As shown in FIG. 42, in this example, the riding mower 100$s$ further includes a parking system. The parking system 41$s$ includes a pedal 411$s$, a pedal arm 412$s$, a first rotatable member 413$s$, a base 414$s$, a ratchet 415$s$, a first elastic member 416$s$, a second elastic member 417$s$, a second rotatable member 418$s$, and a third rotatable member 419$s$. The pedal 411$s$, the pedal arm 412$s$, and the first rotatable member 413$s$ constitute a pedal assembly. In this example, the pedal assembly is the second operating element. The pedal arm 412$s$ includes two running sections. When the pedal 411$s$ enables the pedal arm 412$s$ to be in the first section, the riding mower 100$s$ is in the non-parking state. When the pedal 411$s$ enables the pedal arm 412$s$ to be in the second section, the riding mower 100$s$ is in the parking state.

As shown in the figure, a rotation stop system 42$s$ matching the parking is disposed on the right side of the base 414$s$. In some examples, the rotation stop system 42$s$ includes a triggering member 421$s$, a contact member 422$s$, and a rotation stop switch 423$s$. The triggering member 421$s$ and the first rotatable member 413$s$ are configured to rotate synchronously. In the rotation process of rotating with the first rotatable member 413$s$, when rotating to the preset position, the triggering member 421$s$ triggers the contact member 422$s$. The contact member 422$s$ triggers the rotation stop switch 423$s$. The rotation stop switch 423$s$ controls a second motor to stop rotation so that the power of the second traveling wheels 142$s$ is cut. The second traveling wheels 142$s$ are only subject to the braking action and thus can be braked quickly. It is to be explained here that the rotation stop switch 423$s$ only controls the second motor to stop rotation in the triggered state. The rotation stop switch 423$s$ does not control the rotation of the second motor in the case where the rotation stop switch 423$s$ is not triggered or in the case where the contact member 422$s$ is reset after the rotation stop switch 423$s$ is triggered; that is, the rotation stop switch 423$s$ can only pause the second motor. The triggering member 421$s$ is formed with or is connected to a triggering portion 421$a$ disposed at the preset position. In this example, the triggering member 421$s$ has a first section and a second section. The triggering portion 421$a$ is disposed on the second section. In fact, the entire second section can trigger the triggering member 421$s$; that is, the second section can be considered as the triggering portion 421$a$. The triggering member rotates in the first section and does not trigger the triggering contact 422. In some optional examples, the triggering portion 421$a$ is disposed at a critical position for the riding mower 100$s$ entering the parking state from the non-parking state. In fact, the triggering portion 421$a$ may further be arranged before the riding mower 100$s$ enters the parking state, thereby facilitating the user in braking.

In some examples, the base 414$s$ is further formed with a slide rail extending through the base 414$s$ in the left and right direction. The triggering member 421$s$ is securely connected to the first rotatable member 413$s$ by a fastening piece. The triggering member 421$s$ rotates synchronously with the first rotatable member 413$s$ and is within the range of the slide rail. In some optional examples, the slide rail includes a first slide rail 414$a$ and a second slide rail 414$b$ that are located in different rotation radii. The first slide rail 414$a$ and the second slide rail 414$b$ are each an arc centered on a point where the first central axis 102 extends through the base 414$s$. The first slide rail 414$a$ is closer to the preceding center compared with the second slide rail 414$b$. Therefore, the length of the first slide rail 414$a$ is less than the length of the second slide rail 414$b$. The arrangement of two slide rails can make the connection between the triggering member 421$s$ and the first rotatable member 413$s$ more stable. In the rotation process of rotating with the first rotatable member 413$s$, the triggering member 421$s$ has no relative displacement from the first rotatable member 413$s$.

What is claimed is:

1. A riding mower, comprising:
   a seat for a user to sit on;
   a main frame configured to support the seat;
   a power output assembly configured to mow vegetation;
   a traveling assembly configured to enable the riding mower to travel;
   an operating assembly configured to be operated by the user;
   a control module configured to control the riding mower; and
   a power supply apparatus configured to supply power to the riding mower, and disposed on a rear side of the main frame,
   wherein at least a portion of the control module is disposed on a lower side of the seat, the control module comprises a drive control board for controlling the power output assembly and the traveling assembly, a fuse, and a power supply management module disposed on a rear side of the seat and between the seat and the power supply apparatus.

2. The riding mower of claim 1, wherein the main frame extends in a first straight line, the main frame extends in a first plane, the first straight line is in the first plane, the main frame is symmetrical about the first straight line, the first plane further comprises a second straight line perpendicular to the first straight line, the main frame is symmetrical about the second straight line; and
   wherein on a second plane extending through the second straight line and perpendicular to the first plane, the seat is disposed on the main frame and at least partially extends through the second plane; the first straight line and the second straight line have an intersection; and the control module is at least partially disposed in a range of the intersection.

3. The riding mower of claim 1, wherein the control module is disposed in a middle of the main frame.

4. The riding mower of claim 1, wherein the drive control board for controlling the power output assembly is disposed above the power output assembly.

5. The riding mower of claim 1, wherein the fuse is connected between the drive control board and the power supply management module.

6. The riding mower of claim 1, wherein the fuse is at least partially located on the lower side of the seat.

7. The riding mower of claim 1, wherein the fuse is located between the drive control board and the power supply management module.

8. The riding mower of claim 1, wherein drive control board is disposed on the lower side of the seat.

9. The riding mower of claim 1, wherein the control module further comprises a junction box configured to connect a connection line from each component.

10. The riding mower of claim 9, wherein the junction box is disposed on an upper side of the drive control board.

11. The riding mower of claim 1, further comprising a grass catcher, wherein the grass catcher is at least partially disposed on an upper side of the power supply apparatus.

12. The riding mower of claim 1, wherein the traveling assembly comprises a first traveling wheel and a second traveling wheel, the first traveling wheel is disposed on a front side of the main frame, the second traveling wheel is disposed on a rear side of the main frame, the power output assembly is disposed between the first traveling wheel and the second traveling wheel and is at least partially located on a lower side of the main frame, and the power supply apparatus is disposed on a rear side of the second traveling wheel and is located on an upper side of the main frame.

13. The riding mower of claim 1, wherein the main frame extends in a first straight line, the drive control board, the fuse, and the power supply management module are arranged in the first straight line.

14. A riding mower, comprising:

a seat for a user to sit on;

a main frame configured to support the seat;

a power output assembly configured to mow vegetation;

a traveling assembly configured to enable the riding mower to travel;

an operating assembly configured to be operated by the user;

a control module configured to control the riding mower; and a power supply apparatus configured to supply power to the riding mower, and disposed on a rear side of the main frame, wherein at least a portion of the control module is disposed on a lower side of the seat, and the control module comprises a drive control board for controlling the power output assembly and the traveling assembly and a power supply management module for controlling the power supply apparatus, the power supply management module disposed on the rear side of the seat and between the seat and the power supply apparatus.

15. The riding mower of claim 14, wherein the control module is disposed in a middle of the main frame.

16. The riding mower of claim 14, wherein the drive control board is disposed on the lower side of the seat.

17. The riding mower of claim 14, wherein the power supply management module is disposed on a rear side of the seat.

\* \* \* \* \*